US008417533B2

(12) United States Patent
Clawson

(10) Patent No.: US 8,417,533 B2
(45) Date of Patent: Apr. 9, 2013

(54) METHOD AND SYSTEM FOR THE FIRE RESPONSE DISPATCH PROTOCOL OF AN EMERGENCY DISPATCH SYSTEM

(76) Inventor: Jeffrey J. Clawson, Salt Lake City, UT (US)

( * ) Notice: Subject to any disclaimer, the term of this patent is extended or adjusted under 35 U.S.C. 154(b) by 159 days.

(21) Appl. No.: 10/255,901

(22) Filed: Sep. 25, 2002

(65) Prior Publication Data

US 2007/0055559 A1 Mar. 8, 2007

Related U.S. Application Data

(60) Provisional application No. 60/325,152, filed on Sep. 25, 2001.

(51) Int. Cl.
*G06Q 50/00* (2012.01)
(52) U.S. Cl.
USPC ............................................ 705/1.1; 379/45
(58) Field of Classification Search .................. 705/1.1; 379/45
See application file for complete search history.

(56) References Cited

U.S. PATENT DOCUMENTS

| | | | |
|---|---|---|---|
| 3,799,147 A | 3/1974 | Adolph et al. ............ 128/2.05 S |
| 4,130,881 A | 12/1978 | Haessler et al. | |
| 4,164,320 A | 8/1979 | Irazoqui et al. | |
| 4,237,344 A | 12/1980 | Moore | |
| 4,290,114 A | 9/1981 | Sinay ............................. 364/900 |
| 4,338,493 A | 7/1982 | Stenhuis et al. | |
| 4,360,345 A | 11/1982 | Hon ............................... 434/262 |
| 4,455,548 A * | 6/1984 | Burnett ........................ 340/293 |
| 4,489,387 A | 12/1984 | Lamb et al. | |
| 4,731,725 A | 3/1988 | Suto et al. ..................... 364/415 |
| 4,839,822 A | 6/1989 | Dormond et al. | |
| 4,858,121 A | 8/1989 | Barber et al. | |
| 4,865,549 A | 9/1989 | Sonsteby | |
| 4,922,514 A | 5/1990 | Bergeron et al. ................. 379/6 |
| 4,926,495 A | 5/1990 | Comroe et al. ................. 455/54 |
| 4,945,476 A | 7/1990 | Bodick et al. | |
| 4,967,754 A | 11/1990 | Rossi | |
| 5,063,522 A | 11/1991 | Winters ......................... 395/51 |
| 5,065,315 A | 11/1991 | Garcia | |
| 5,072,383 A | 12/1991 | Brimm et al. | |
| 5,077,666 A | 12/1991 | Brimm et al. | |
| 5,086,391 A | 2/1992 | Chambers ................ 364/413.02 |
| 5,109,399 A | 4/1992 | Thompson ..................... 379/45 |
| 5,122,959 A | 6/1992 | Nathanson et al. ........... 364/436 |
| 5,193,855 A | 3/1993 | Shamos | |
| 5,228,449 A | 7/1993 | Christ et al. .................. 128/691 |
| 5,253,164 A | 10/1993 | Holloway et al. | |
| 5,255,187 A | 10/1993 | Sorensen | |
| 5,291,399 A | 3/1994 | Chaco | |

(Continued)

OTHER PUBLICATIONS

999 United Emergency services share life-saving role to boost response by Best, May 1999, Western Daily Press, WDP Severside ed, p. 18.*

(Continued)

*Primary Examiner* — Kira Nguyen
(74) *Attorney, Agent, or Firm* — John R. Thompson; Stoel Rives LLP

(57) ABSTRACT

A method and system for receiving, processing, responding and managing firefighter request calls is described. A consistent, standard and systematic process is provided which in combination with adequate training, supervision and quality assurance service to provide a technique for classifying the criticality of calls into various determinate levels for appropriate response.

25 Claims, 50 Drawing Sheets

U.S. PATENT DOCUMENTS

| | | | | |
|---|---|---|---|---|
| 5,323,444 A | 6/1994 | Ertz et al. | | 379/45 |
| 5,339,351 A | 8/1994 | Hoskinson et al. | | 379/45 |
| 5,348,008 A | 9/1994 | Bornn et al. | | 128/642 |
| 5,379,337 A | 1/1995 | Castillo et al. | | 379/45 |
| 5,404,292 A | 4/1995 | Hendrickson | | 364/413.02 |
| 5,410,471 A | 4/1995 | Alyfuku et al. | | |
| 5,423,061 A | 6/1995 | Fumarolo et al. | | 455/54.1 |
| 5,438,996 A | 8/1995 | Kemper et al. | | 128/661.02 |
| 5,441,047 A | 8/1995 | David et al. | | |
| 5,462,051 A | 10/1995 | Oka et al. | | 128/630 |
| 5,471,382 A | 11/1995 | Tallman et al. | | 364/406 |
| 5,502,726 A | 3/1996 | Fischer | | 370/94.1 |
| 5,513,993 A | 5/1996 | Lindley et al. | | 434/319 |
| 5,516,702 A | 5/1996 | Senyei et al. | | 436/510 |
| 5,521,812 A | 5/1996 | Feder et al. | | 364/400 |
| 5,536,084 A | 7/1996 | Curtis et al. | | |
| 5,544,649 A | 8/1996 | David et al. | | 128/630 |
| 5,554,031 A | 9/1996 | Moir et al. | | 434/111 |
| 5,590,269 A | 12/1996 | Kruse et al. | | 395/209 |
| 5,594,638 A | 1/1997 | Iliff | | 395/203 |
| 5,594,786 A | 1/1997 | Chaco et al. | | |
| 5,596,994 A | 1/1997 | Bro | | |
| 5,630,125 A | 5/1997 | Zellweger | | 395/614 |
| 5,636,873 A | 6/1997 | Sonsteby | | |
| 5,650,995 A | 7/1997 | Kent | | 455/508 |
| 5,660,176 A | 8/1997 | Iliff | | 128/630 |
| 5,675,372 A | 10/1997 | Aguayo, Jr. et al. | | 348/12 |
| 5,682,419 A | 10/1997 | Grube et al. | | 379/60 |
| 5,684,860 A | 11/1997 | Milani et al. | | 379/59 |
| 5,689,229 A | 11/1997 | Chaco et al. | | |
| 5,719,918 A | 2/1998 | Serbetciouglu et al. | | 379/58 |
| 5,722,418 A | 3/1998 | Bro | | 128/732 |
| 5,724,983 A | 3/1998 | Selker et al. | | 118/696 |
| 5,734,706 A | 3/1998 | Windsor et al. | | 379/142 |
| 5,745,532 A | 4/1998 | Campana, Jr. | | 375/347 |
| 5,748,907 A | 5/1998 | Crane | | |
| 5,754,960 A | 5/1998 | Downs et al. | | 455/508 |
| 5,759,044 A | 6/1998 | Redmond | | 434/307 R |
| 5,761,278 A | 6/1998 | Pickett et al. | | 379/90.01 |
| 5,761,493 A | 6/1998 | Blakeley et al. | | 395/604 |
| 5,787,429 A | 7/1998 | Nikolin, Jr. | | |
| 5,805,670 A | 9/1998 | Pons et al. | | 379/45 |
| 5,809,493 A | 9/1998 | Ahamed et al. | | 206/52 |
| 5,822,544 A | 10/1998 | Chaco et al. | | |
| 5,823,948 A | 10/1998 | Ross, Jr. et al. | | |
| 5,826,077 A | 10/1998 | Blakeley et al. | | 395/604 |
| 5,832,187 A | 11/1998 | Pedersen et al. | | 395/50 |
| 5,842,173 A | 11/1998 | Strum et al. | | |
| 5,844,817 A | 12/1998 | Lobley et al. | | 364/578 |
| 5,857,966 A | 1/1999 | Clawson | | 600/300 |
| 5,901,214 A | 5/1999 | Shaffer et al. | | 379/220 |
| 5,902,234 A | 5/1999 | Webb | | |
| 5,910,987 A | 6/1999 | Ginter et al. | | 380/24 |
| 5,912,818 A | 6/1999 | McGrady et al. | | |
| 5,915,019 A | 6/1999 | Ginter et al. | | 380/4 |
| 5,926,526 A | 7/1999 | Rapaport et al. | | 379/88.25 |
| 5,933,780 A | 8/1999 | Connor et al. | | 455/519 |
| 5,961,446 A | 10/1999 | Beller et al. | | |
| 5,962,891 A | 10/1999 | Arai | | |
| 5,964,700 A | 10/1999 | Tallman et al. | | 600/300 |
| 5,986,543 A | 11/1999 | Johnson | | 340/426 |
| 5,989,187 A | 11/1999 | Clawson | | 600/300 |
| 5,991,730 A | 11/1999 | Lubin et al. | | |
| 5,991,751 A | 11/1999 | Rivette et al. | | 707/1 |
| 6,004,266 A | 12/1999 | Clawson | | 600/300 |
| 6,010,451 A | 1/2000 | Clawson | | 600/300 |
| 6,022,315 A | 2/2000 | Iliff | | |
| 6,035,187 A | 3/2000 | Franza | | 455/404 |
| 6,040,770 A | 3/2000 | Britton | | 340/539 |
| 6,052,574 A | 4/2000 | Smith, Jr. | | 455/404 |
| 6,053,864 A | 4/2000 | Clawson | | 600/300 |
| 6,058,179 A | 5/2000 | Shaffer et al. | | 379/220 |
| 6,074,345 A | 6/2000 | van Oostrom et al. | | 600/300 |
| 6,076,065 A | 6/2000 | Clawson | | 705/2 |
| 6,078,894 A | 6/2000 | Clawson et al. | | 705/11 |
| 6,106,459 A | 8/2000 | Clawson | | 600/300 |
| 6,112,083 A | 8/2000 | Sweet et al. | | 455/426 |
| 6,115,646 A | 9/2000 | Fiszman et al. | | 700/181 |
| 6,117,073 A | 9/2000 | Jones et al. | | 600/300 |
| 6,118,866 A | 9/2000 | Shtivelman | | 379/309 |
| 6,127,975 A | 10/2000 | Maloney | | 342/457 |
| 6,134,105 A | 10/2000 | Lueker | | 361/683 |
| 6,292,542 B1 | 9/2001 | Bilder | | |
| 6,370,234 B1 | 4/2002 | Kroll | | |
| 6,535,121 B2 * | 3/2003 | Matheny | | 340/506 |
| 6,607,481 B1 | 8/2003 | Clawson | | |
| 6,879,819 B2 | 4/2005 | Brooks | | |
| 6,901,397 B1 | 5/2005 | Moldenhauer et al. | | |
| 6,931,112 B1 | 8/2005 | McFarland et al. | | |
| 6,968,375 B1 | 11/2005 | Brown | | |
| 7,106,835 B2 | 9/2006 | Saalsaa | | |
| 2002/0004729 A1 | 1/2002 | Zak et al. | | |
| 2002/0106059 A1 | 8/2002 | Kroll et al. | | |
| 2003/0028536 A1 | 2/2003 | Singh et al. | | |
| 2003/0212575 A1 | 11/2003 | Saalsaa et al. | | |
| 2006/0178908 A1 | 8/2006 | Rappaport | | |
| 2007/0055559 A1 | 3/2007 | Clawson | | |
| 2007/0116189 A1 | 5/2007 | Clawson | | |

OTHER PUBLICATIONS

Wireless technology keeps public safety a step ahead by Poellmitz, Apr. 1998, Nation's City Weekly, v21,n17,p. 5.*

Learning from CAD System Implementation by Crowley, Aug. 1992, Communicatins v29 n8 p. 38-47.*

CBS web page News Story titled "911 Operator It's got to be Hell", Mar. 31, 2006 (excerpts from 911 operators actions during the attacks on Sep. 11, 2001).*

Emergency Medicine, Aug. 1995, by Marie Nordberg, "Dispatch Disaster", 10 pages.*

Radosevich, Lynda, "Network holds sway on life, death," Computerworld, v27 n21, May 24, 1993, 2 pgs.

Harris, Roger, "Updated 911 Phone System Top Concern of Residents," Business First-Louisville, v9 n19 s1, Dec. 1992, 3 pgs.

"Geac Completes Software Install," Wireless Week, Nov. 18, 1996, 3 pgs.

"Dictaphone introduces Windows-based Computer-Aided Dispatch (CAD) system," Business Wire, Apr. 23, 1996, 2 pgs. (in commercial use in 1995).

Holroyd, Brian, et al., "Medical Control; Quality Assurance in Prehospital Care," JAMA, the Journal of American Medical Association, v256, n8, Aug. 1986, p. 1027-1031.

Anonymous, "Suburban Chicago towns centralize 911 services," Communications News, v31 n10, Oct. 1994, 2 pgs.

Office Action Summary from USPTO for U.S. Appl. No. 10/255,905 mailed May 19, 2004, 7 pgs.

Office Action Summary from USPTO for U.S. Appl. No. 10/255,905 mailed May 26, 2005, 5 pgs.

Office Action Summary from USPTO for U.S. Appl. No. 10/255,905 mailed Feb. 9, 2006, 8 pgs.

Advisory Action Before the Filing of an Appeal Brief from USPTO for U.S. Appl. No. 10/255,905 mailed Aug. 11, 2006, 3 pgs.

Office Action Summary from USPTO for U.S. Appl. No. 10/255,905 mailed Jan. 30, 2007, 7 pgs.

Notice of Non-Compliant Amendment (37 CFR 1.121) from USPTO for U.S. Appl. No. 10/255,905 mailed Jul. 9, 2007, 4 pgs.

Office Action Summary from USPTO for U.S. Appl. No. 10/255,905 mailed Oct. 5, 2007, 7 pgs.

Office Action Summary from USPTO for U.S. Appl. No. 09/685,697 mailed Jul. 18, 2003, 8 pgs.

Office Action Summary from USPTO for U.S. Appl. No. 09/685,697 mailed Feb. 3, 2004, 5 pgs.

Office Action Summary from USPTO for U.S. Appl. No. 09/685,697 mailed Jan. 4, 2005, 5 pgs.

Office Action Summary from USPTO for U.S. Appl. No. 09/685,697 mailed Oct. 4, 2005, 7 pgs.

Advisory Action Before the Filing of an Appeal Brief from USPTO for U.S. Appl. No. 09/685,697 mailed Mar. 13, 2006, 4 pgs.

Office Action Summary from USPTO for U.S. Appl. No. 09/685,697 mailed Jun. 26, 2006, 8 pgs.

Office Action Summary from USPTO for U.S. Appl. No. 09/685,697 mailed Apr. 10, 2007, 9 pgs.

Office Action Summary from USPTO for U.S. Appl. No. 09/685,697 mailed Oct. 9, 2007, 11 pgs.
Office Action Summary from USPTO for U.S. Appl. No. 10/140,635 mailed Oct. 3, 2003, 9 pgs.
Office Action Summary from USPTO for U.S. Appl. No. 10/140,635 mailed Jul. 16, 2004, 11 pgs.
Office Action Summary from USPTO for U.S. Appl. No. 10/140,635 mailed Apr. 19, 2005, 11 pgs.
Office Action Summary from USPTO for U.S. Appl. No. 10/140,635 mailed Jan. 17, 2006, 13 pgs.
Office Action Summary from USPTO for U.S. Appl. No. 10/140,635 mailed Sep. 20, 2006, 15 pgs.
Office Action Summary from USPTO for U.S. Appl. No. 10/140,635 mailed Jun. 21, 2007, 15 pgs.

* cited by examiner

500

| ENTRY QUESTIONS | | |
|---|---|---|
| 1. What's the address of the emergency? | ✓ | |
|     House/Apartment/Business/Intersection | | |
| 2. What's the phone number you are calling from? | ✓ | |
|     MUTUAL AID | 63 | |
|     Alarm Company | 52 | |
| 3. What's the problem, tell me exactly what happened? | | |
|   a. (Not obvious) Do you see any flames? | | |
|     i. (No) Do you see or smell any smoke? | | |
| 4. Is everyone (including you) safe and out of danger? | | |
|     Yes | FC | |
|   a. (No) Is anyone trapped or unable to get to safety? | | |
|     No | ❀ | ?-D-0 |
|     i. (Yes) How many? | | |
|     ii. (Yes) Exactly where are you (they) located? | | |
|     ENTRAPMENT | | |
|       Assist/Service Calls | ❀ | 53-E-1 |
|       Confined Space/Structure Collapse | ❀ | 54-E-1 |
|       Trench Collapse | ❀ | 54-E-2 |
|       Electrical Hazard | ❀ | 55-E-1 |
|       Extrication | ❀ | 58-E-1 |
|       Extrication | ❀ | 58-E-2 |
|       Structure Fire | ❀ | 67-E-1 |
|       Train/Subway/Commuter Rail | ❀ | 68-E-1 |
|       Vehicle Fire | ❀ | 69-E-1 |

NATIONAL ACADEMY
Fire priority dispatch system

❀ POST-DISPATCH INSTRUCTIONS a. (DELTA Zero/ECHO) I'm sending the fire department to help you now.

If it's safe to do so, stay on the line so I can monitor your situation and I'll tell you what to do next.

b. (Electrical Hazard with ENTRAPMENT) Do not leave the vehicle (house).

c. (Confined Space/Structure Collapse) If it's safe to do so, turn off all equipment except the ventilation.

d. (Extrication with ENTRAPMENT) If it's safe to do so, turn off all equipment.

✱ See Critical EFD Information on AI.

| FLS | ✱ Link to: | ❀ |
|---|---|---|
| | Trapped in structure fire | Y-1 |
| | People on fire | Y-2 |
| | Possible Danger – Not Trapped | ▽ X-4 |

| ENTRAPMENT | Rules | Critical EFD Information |
|---|---|---|
| A situation involving a prevention of escape in which there is an immediate threat of death, increased injury or illness to a victim. | 1. Always verify the incident's address and the caller's phone number regardless of ANI/ALI information. | ✱ For ENTRAPMENT, code as ECHO on Fire Complaints 53, 54, 55, 58, 67, 68, or 69 and initiate dispatch immediately, give PDIs, and go to Fire Complaint when directed by ❀ |
| ECHO Determinant Practice | 2. In MUTUAL AID situations, go immediately to Protocol 63 after determining the address and callback numbers. | ✱ In any hazardous situation, advise the caller not to enter the area unless it's safe to do so. |
| The ECHO level allows early recognition and response initiation when life is jeopardized by ENTRAPMENT. | 3. If something seems like it poses a threat, relay it to responders. | |
| DELTA Zero Response Coding | 4. If at any time the caller expresses that they may be in danger, advise them to get to safety immediately (if safe to do so) and call back. | Axioms |
| When Case Entry identifies a caller as being in danger but not trapped, select the appropriate Fire Complaint's DELTA Zero response, and then provide the X-4 (Case Exit) instructions. If the caller has a portable phone or other information is already known, complete Key Question interrogation, and update the Response Code as appropriate. | 5. Case Entry questioning must always be completed, even when an ECHO determinant has been selected. | 1. When an incident involves both fire and hazardous materials, the incident is first a fire incident. Once the fire is out, it then becomes a HAZMAT incident. |
| Repetitive Persistence Use | 6. Fire Complaint key questioning must always be completed to cover scene safety issues, even when an ECHO determinant has been selected. | 2. An incident involving a victim needing rescue and emergency medical treatment is a fire incident until the victim has been rescued. If the victim needs only medical treatment, this is an EMS incident. |
| When using repetitive persistence to calm a caller, always provide a reason for the instruction (i.e., I need you to tell me the exact location of your son so that the firefighters can find him quickly). | 7. Smoke inside a structure should be coded as a structure fire on Protocol 67. | 3. If you know that traffic will cause delays for responders, provide an alternate route. |
| DeLuca's Law | 8. All questions must be asked unless the answer is completely obvious or already provided by the caller. | 4. Sometimes changes in incident information will come into the communication center that responders don't automatically hear over the radio. Relay these changes to responders as quickly as possible. |
| EFDs will follow all protocols per se, avoiding freelance questioning or information unless it enhances, not replaces, the written protocol questions and scripts. | In 1998, there were 1,755,000 fires in the U.S. in which 4,035 people died and 25,000 were injured. | |

50 CASE ENTRY PROTOCOL

51  AIRCRAFT EMERGENCIES

KEY QUESTIONS
1. What type of aircraft is it?
   LARGE
   SMALL
   Military
2. Describe the aircraft.
   a. (Aircraft visible) Can you see the tail number?
3. Is the aircraft airborne or on the ground?
   a. (Airborne from Tower) When is it scheduled to land?
   b. (Airborne from caller) What direction is it going?
   c. (Ground) Has the aircraft crashed?
      Yes ———
      Is a structure involved?
4. Is the aircraft leaking any fluid?

POST-DISPATCH INSTRUCTIONS
a. (Fire) Do not try to extinguish the fire yourself.
b. This is a potential crime scene. Do not pick up any debris.

* Notify FAA nearest to airport control tower.
* Notify all applicable local authorities (defined by agencies).

FLS   * Link to X-1 unless:
Possible Danger – Not Trapped ——————— X-4
Stay on Line ——————————————— X-2
Urgent disconnect ——————————— X-3

| LEVELS | # | DETERMINANT DESCRIPTORS | CODES | RESPONSES | MODES |
|---|---|---|---|---|---|
| D | 0 | DELTA Zero (caller danger/incomplete information) | 51-D-0 | | |
| | 1 | LARGE AIRCRAFT crash involving structure (confirmed) | 51-D-1 | | |
| | 2 | SMALL AIRCRAFT crash involving structure (confirmed) | 51-D-2 | | |
| | 3 | LARGE AIRCRAFT crash (confirmed) | 51-D-3 | | |
| | 4 | SMALL AIRCRAFT crash (confirmed) | 51-D-4 | | |
| | 5 | LARGE AIRCRAFT fire | 51-D-5 | | |
| | 6 | SMALL AIRCRAFT fire | 51-D-6 | | |
| | 7 | Military aircraft crash/fire | 51-D-7 | | |
| C | 1 | LARGE AIRCRAFT incoming (in trouble) | 51-C-1 | | |
| | 2 | SMALL AIRCRAFT incoming (in trouble) | 51-C-2 | | |
| | 3 | Aircraft leaking fluid (ground) | 51-C-3 | | |
| Ω | 1 | AIRBORNE AIRCRAFT (in trouble) | 51-Ω-1 | | |

LARGE AIRCRAFT
Maximum gross takeoff weight of 41,000 to 255,000 lbs (per FAA). Examples: 747, MD-80

SMALL AIRCRAFT
Maximum gross takeoff weight of 41,000 lbs. or less (per FAA). Examples: Cessna 142, helicopter, balloon, or glider.

AIRBORNE AIRCRAFT
Any report of a problem from a caller (the caller won't know the destination of the aircraft) or a control tower report that doesn't include a specific location that the aircraft will attempt to land.

Incoming
A report received from a control tower including an ETA and a specific location that the aircraft will attempt to land.

Rules
1. Aircraft crashes should also be considered HAZMAT incidents until proven otherwise.
2. Report all aircraft emergencies to the FAA.
3. All military aircraft are assumed to be carrying explosive ordnance (weaponry) until proven otherwise.
4. Get as much of a description of the plane as possible to help FAA officials identify the plane and its intended route.

5. Many victims survive the crash itself, but die of smoke inhalation inside the cabin.

FAA Alert Levels from Tower
Alert priorities include life safety, property preservation, hazard mitigation, and recovery:

* Alert I – Minor Difficulty
  An aircraft approaching the airport having minor difficulty (e.g., feathered propeller, oil leak). The emergency equipment and crews are to standby at the station for further instructions.

* Alert II – Major Difficulty
  An aircraft approaching the airport having major difficulty (e.g., engine on fire, faulty landing gear, no hydraulic pressure). This could mean emergency equipment would proceed to a predetermined location (end of runway, etc.) to await development of the potential emergency.

* Alert III – Accident
  An aircraft involved in an accident on or near the airport and emergency equipment should proceed immediately to the scene.

Types of Aircraft Operations
* Cargo
* Commercial
* Military
* Private

Axioms
1. Most accidents occur during the takeoff, climb, descent, and landing phase of flight.
2. Reports from the public will usually be 51-Ω-1 unless the aircraft has crashed or the eyewitness can identify a general location where the aircraft will try to land or crash. Unless a touchdown location is specified, the incident is referred to the FAA.

First Law of Aerodynamics
What goes up, must come down.

Aviation Accident Statistics
The U.S. National Transportation Safety Board investigates about 2,000 aviation accidents and incidents a year.
18% of these accidents include a fatality.

FAA Alert Info. Received from Tower
When the air traffic control tower (ATC) at the airport calls in an alert, they advise:
* Aircraft type (single-engine, transit, etc.)
* Amount of fuel on board
* Condition (smoke in cockpit, etc.)
* ETA to airport
* Number of people (souls) on board
* Runway of approach

51  AIRCRAFT EMERGENCIES

FIG. 5D

52 ALARMS — 504

KEY QUESTIONS

1. (Not obvious) What type of alarm is it?
   - Burglar
   - Hold up
   - Medical
2. (Not obvious) Is this a residence or a business?

(Private caller)

3. (Not obvious) How many levels or stories are there?
4. (Carbon monoxide) Is anyone sick?
   - Yes
5. What is the exact location of the alarm in the building?
6. Do you know what caused the activation?
7. (Appropriate) Are there any people inside?

POST-DISPATCH INSTRUCTIONS a. Do not reset or silence the alarm.
b. If it's safe to do so, leave the building and close the doors behind you, and wait for the responders.
   (Carbon monoxide) Make sure no one re-enters the area (space).
d. (Alarm Company) Try to contact a responsible party, and call us back with an ETA.

* (Appropriate) Notify law enforcement.
* Advise the caller and responders of potential hazards.

FLS  * Link to ☎ X-1 unless:
Possible Danger – Not trapped ——————— V  X-4
Stay on Line ———————————————— ☎ X-2
Urgent disconnect ———————————— ☎ X-3

| LEVELS | # | DETERMINANT DESCRIPTORS | CODES | RESPONSES | MODES |
|---|---|---|---|---|---|
| C | 1 | HIGH LIFE HAZARD | 52-C-1 | | |
| | 2 | HIGH RISE | 52-C-2 | | |
| | 3 | HIGH OCCUPANCY | 52-C-3 | | |
| | 4 | Waterflow (residential or business) | 52-C-4 | | |
| | 5 | Commercial (business) fire alarm | 52-C-5 | | |
| | 6 | Carbon monoxide with sick patient (business) | 52-C-6 | | |
| | 7 | Carbon monoxide with sick patient (residential) | 52-C-7 | | |
| B | 1 | Single dwelling (residential) | 52-B-1 | | |
| | 2 | Pull (call) box/Pull station | 52-B-2 | | |
| | 3 | Unknown cause | 52-B-3 | | |
| A | 1 | Carbon monoxide with no patient | 52-A-1 | | |

HIGH LIFE HAZARD Locations

Any location that poses multiple life threats due to difficulty exiting or lack of mobility of the inhabitants:
- Churches
- High-rise buildings
- Hospitals
- Lodging locations (hotels)
- Nursing homes
- Schools
- Subway stations

HIGH RISE

A building (structure) that is too tall for adequate fire control from ground-based aerial ladders or elevating platforms or towers.

Local Fire Administration must define and authorize (☒) the actual height of structures constituting HIGH RISE in their area:

☐ _____

*Approval signature of local Fire Administrator    Date approved*

HIGH OCCUPANCY

The general term for a building that can or does contain a large amount of people. An apartment complex would be an example of high occupancy as long as people could easily exit.

Waterflow Detector

A waterflow detector recognizes movement of water within the sprinkler or standpipe system. They are susceptible to false alarms caused by pressure fluctuations within the water supply system.

Sources of Carbon Monoxide Poisoning:
- Car exhaust fumes
- Charcoal barbeques
- Furnaces
- Gas powered engines
- Home water heaters
- Paint remover (containing methylene chloride)
- Pool heaters
- Smoke (from all types of fire)
- Sterno fuel
- Tobacco smoke
- Wood stoves

Smoke Detectors

Thousands of people die each year in homes in which no smoke detectors are present. Although in the U.S. almost 93% of all homes have at least one smoke detector, almost 50% of all house fires and 60% of house fire deaths occur in those 7% with no smoke detectors present.

House fires are readily detected by all common types of smoke detectors in time for sleeping occupants to be awakened and escape.

First Law of Alarms

Every alarm is valid until proven otherwise.

Types of Alarms
- Carbon monoxide
- Halon
- Heat detector
- Local fire alarm system
- Manual pull station
- Monitored
- Smoke detector
- Trouble
- Waterflow (sprinkler)

Axioms

1. Carbon monoxide poisoning can be difficult to diagnose. Its symptoms are similar to the flu and can cause headaches, fatigue, nausea, dizzy spells, confusion, and irritability. Later stages can cause vomiting, loss of consciousness, and eventually brain damage or death.

2. Failure to evacuate immediately may result in prolonged exposure and worsening effects from CO gas. The best initial treatment is fresh air.

3. If a house is equipped with smoke detectors, the chances of someone dying are cut nearly in half.

4. Pull boxes (fire alarm boxes or call boxes) are located on buildings or streets that send signals in the form of flashes and/or bells directly to communication centers when activated.

52 ALARMS

FIG. 5F

53 ASSIST / SERVICE CALLS

KEY QUESTIONS
1. What type of assistance do you need?
   - CITIZEN ASSIST
   - Locked in, out dwelling or vehicle
   - Animal rescue
   - Water problem
   - Assist OUTSIDE AGENCY
2. (Water problem) Are there any electrical hazards present?
3. Does anyone appear to need medical assistance?
   - Yes ──────────────── ○
4. (Vehicle lockin/lockout) Is the vehicle occupied?
   - Yes ──────────────── ○
   - a. (Yes) Is the vehicle running?
     - i. (Yes) Is the air conditioning (heat) on?
5. (Appropriate) Is the door unlocked?
   - a. (No) Is there a spare key available?
     - i. (No) How can we gain entry?

POST-DISPATCH INSTRUCTIONS
(Water problem with electrical hazard) Beware of electrical risks and electrified water. (Do not touch any unconscious people or objects near them.)

(Water problem) If it's safe to do so, turn off the water and/or electrical power.

(Appropriate) If it's safe to do so, remove the child (person) from the vehicle.

✶ (Animal rescue) Notify animal control.
✶ (Water problem) Notify appropriate agencies (Water, Electric).

FLS ✶ Link to ☎ X-1 unless:
Stay on Line ............................................. X-2
Urgent disconnect .................................. ☎ X-3

| LEVELS | / | DETERMINANT DESCRIPTORS | CODES | RESPONSES | MODES |
|---|---|---|---|---|---|
| E | 1 | ENTRAPMENT (confirmed) in vehicle trunk | 53-E-1 | | |
| C | 1 | Water problem with electrical hazard | 53-C-1 | | |
| B | 1 | Locked in vehicle | 53-B-1 | | |
|   | 2 | Locked in dwelling (possible medical assistance) | 53-B-2 | | |
| A | 1 | CITIZEN ASSIST (non-medical assistance) | 53-A-1 | | |
|   | 2 | Locked in/out of dwelling | 53-A-2 | | |
|   | 3 | Animal rescue | 53-A-3 | | |
|   | 4 | Water problem | 53-A-4 | | |
|   | 5 | Assist OUTSIDE AGENCY | 53-A-5 | | |
| Ω | 1 | Locked out of vehicle (unoccupied) | 53-Ω-1 | | |

FIG. 5G

CITIZEN ASSIST
Provide a service to the citizens in circumstances that may not be an emergency, however, due to unusual circumstance, cannot be resolved without intervention and, if left unattended, may become an emergency.

OUTSIDE AGENCY
Any agency other than the actual company where a person is employed.

Rules
1. Any person locked in a trunk (especially a child) should be considered a high-level ENTRAPMENT emergency.
2. Advise caller to beware of electrical risks and electrified water.

First Law of Service Calls
When in doubt, assist.

Axioms
1. ENTRAPMENTS in car trunks can be especially hazardous. Children get in but can't always get out. In very hot weather, heat stroke may result and can lead to permanent disability or even death in a matter of minutes.
2. Skin that touches a car seat surface over 150°F (66°C) can be severely burned in 1 second.
3. Carbon monoxide buildup for a victim entrapped in the trunk may reach toxic levels.

Car Jacking Entrapment
If a person with a cell phone is entrapped within their trunk due to a carjacking, advise victim to pull at the tail and brake light wires. If victim is able to break out a taillight, they can be advised to stick their hand or an object out to call attention. An observer may contact the police as to their location.

Car Interior Color & Inside Temperature
The color of the car's interior can make a difference in interior temperature. If the outside temperature is 79°F (26°C), the inside car temperature can reach:
- WHITE = 135°F (57°C)
- RED = 154°F (68°C)
- BLUE/GREEN = 165°F (74°C)
- BLACK = 192°F (89°C)

Car Interior Temperature Rise
When the outside temperature is 83°F (28°C) and the car window is down 2 inches, the temperature inside the car can reach 109°F (43°C) in 15 minutes.

When the outside temperature is 93°F (34°C), and the car window is down 1-1/2 inches, the temperature inside the car can still reach 125°F (52°C) in just 20 minutes and approximately 140°F (60°C) in 40 minutes.

53 ASSIST / SERVICE CALLS

FIG. 5H

54 CONFINED SPACE / STRUCTURE COLLAPSE — 508

KEY QUESTIONS
1. What type of structure (space) is involved?
2. Are there any hazards present?
   - Chemicals
   - Electrical
   - Fire
   - Liquids/Flowing water
   - Odors
   - Smoke
   - Vapor
3. (Appropriate) What is the structure (space) used for?
4. (Not obvious) Is the situation above or below ground?
5. Where exactly in the structure (space) is the problem?
6. Where was the victim last seen?
7. Is anyone else injured?
   a. (Yes) How many?
      Yes ──────────────── o

POST-DISPATCH INSTRUCTIONS
a. Make sure no one re-enters the area (space).
b. (Appropriate) If it's safe to do so, turn off all machinery, except the ventilation.
c. If a confined space permit is available, please have it ready for the responders.

\* Notify appropriate agencies (OSHA, building inspectors)

FLS       \* Link to X-1 unless:
Possible Danger - Not Trapped ············· ▽ X-4
Stay on Line ·································  X-2
Urgent disconnect ···························  X-3

| LEVELS | # | DETERMINANT DESCRIPTORS | CODES | RESPONSES | MODES |
|---|---|---|---|---|---|
| E | 1 | ENTRAPMENT (confirmed) | 54-E-1 | | |
|  | 2 | Trench collapse | 54-E-2 | | |
| D | 0 | DELTA Zero (caller danger/incomplete information) | 54-D-0 | | |
|  | 1 | ENTRAPMENT (confirmed) with hazards | 54-D-1 | | |
| C | 1 | ENTRAPMENT (unconfirmed) with hazards | 54-C-1 | | |
|  | 2 | ENTRAPMENT (unconfirmed) | 54-C-2 | | |

Add suffix C or S to Determinant Code

CONFINED SPACE
Any enclosed space in the workplace that has three specific features (per OSHA):
- Must have the size and shape to allow a person to bodily enter.
- Must have restricted openings that make it difficult to enter or leave.
- Must be a space not designed for continuous human occupancy.

Avalanche
A mass of snow sliding down a mountainside. The first 24 hours after a heavy snow, high wind, rain, or thaw is the most dangerous period.

Mudslide
Moving river of rock, soil, and water often triggered by storms, volcanic activity, earthquakes, fires, and mismanagement of land.

Methods of Collapse
- Avalanche
- Structure collapse
- Cave-in
- Trench
- Mudslide

Causes of Secondary Collapse
- Heavy machinery
- Traffic
- Unstable primary collapse
- Vibrations
- Weather conditions

Rules
1. Working in a confined space is always considered to be a potentially dangerous activity and is regulated by government agencies (work permit required).
2. Conditions at a structure fire can deteriorate rapidly, sometimes with little or no warning. Be aware of audible signals from distressed firefighters.

First Law of Responders
Don't take more victims to the scene.

Third Law of Responders
If there is more than one unconscious patient on scene, there may be scene safety implications.

Axioms
1. Most confined space injuries and deaths result from asphyxiation due to hazardous atmospheres.
2. Studies and accident reports have shown a high incidence of rescuer death associated with confined space incidents.
3. Risks associated with entering confined spaces include loss of functional capacity, permanent impairment, injury, and death.

4. Initial building collapse may occur as a result of fire, weather conditions, earthquake, or simply because an old or otherwise weak structural component fails.
5. Although a buried victim must immediately receive air, rescue operations depend on making the site as safe as possible by shoring or cribbing to hold back other weakened earth formations.

Confined Space Examples
General:
- Hoppers
- Tanks
- Pits
- Trenches
- Silos
- Vaults
- Storage bins Manufacturing and Industry:
- Aircraft sections
- Manholes
- Boat compartments
- Railroad tank cars
- Furnaces
- Reactor vessels
- Machinery
- Sewers

Structure Collapse Statistics
Structural collapse of a building during firefighting is a leading cause of death of firefighters. Collapse is very difficult to predict and usually occurs without warning. Structural collapse caused 56 (18%) of the 316 U.S. firefighter deaths at structure fires (from 1989 to 1998).

54 CONFINED SPACE / STRUCTURE COLLAPSE

55 ELECTRICAL HAZARD — 510

KEY QUESTIONS
1. Is the power disconnected?
2. (Appropriate) Is water involved with (near) the hazard?
3. Do you see any wires arcing (sparks)?
4. (Appropriate) Are there any strange (unusual) odors?
5. Is anyone injured?
   a. (Yes) How many?
   b. (Yes) Is s/he still in contact with the electrical hazard?
      injuries

POST-DISPATCH INSTRUCTIONS
a. (Trapped by downed power lines) Do not leave the vehicle (house).
b. Beware of electrical risks and electrified water. (Do not touch any unconscious people or objects near them).
c. If it's safe to do so, turn off the power.
d. (Smoke or fire) If it's safe to do so, leave the area now avoiding the electrical hazard and any water sources and wait for the responders.

FLS ✱ Link to ☎ X-1 unless:
Possible Danger · Not Trapped — ▽ X-4
Stay on Line — 🔗 X-2
Urgent disconnect — 🏠 X-3

| LEVELS | # | DETERMINANT DESCRIPTORS | CODES | RESPONSES | MODES |
|---|---|---|---|---|---|
| E | 1 | ENTRAPMENT (confirmed) | 55-E-1 | | |
| C | 1 | Electrical hazard with (near) water | 55-C-1 | | |
| B | 1 | Appliance with odor present | 55-B-1 | | |
|   | 2 | Wires down with smoke or arcing | 55-B-2 | | |
|   | 3 | Wires down with no smoke or arcing | 55-B-3 | | |
|   | 4 | Smell of smoke (odor) | 55-B-4 | | |
|   | 5 | RECURRING ELECTRICAL ARCING (circuits) | 55-B-5 | | |
| A | 1 | Transformer outside (wire or pole) | 55-A-1 | | |

RECURRING ELECTRICAL ARCING
Arcing that occurs more than once in a brief period of time and will be continuous so long as there is power in the line. In most cases, the breaker will blow and the arcing ceases.

ARCING
A luminous discharge of current that is formed when a strong current jumps a gap in a circuit or between two electrodes. Arcing is usually the result of an intermittent connection or short circuit.

Rules
1. If someone is trapped in a vehicle, and attempts to leave the vehicle, there is a high probability that the person will become electrocuted.
2. Advise caller to beware of electrical risks and electrified water.
3. All electrocution patients are assumed to be in cardiac arrest until breathing is verified.
4. Always assume that transformers may be leaking and it may be PCB (polychlorinated biphenyls).
5. When more than one electrical wire is down, and one is arcing but the other is not, all wires should be considered equally dangerous.

Axioms
1. Wires attached from pole to pole are of a higher voltage.
2. Wires attached from pole to house are of a lower voltage.
3. The numbers on poles allow the power utility company to determine how extensive an area the power outage could effect.
4. A bystander can be electrocuted in just getting close to the hazard, without even touching it, when high voltage is involved or the ground is wet.
5. Electrocutions occurring above the ground may result in significant falls causing injuries that may be more serious than those incurred from the electrocution.
6. Once an energized electrical line contacts a fence or metal guardrail, the entire length becomes charged and presents a difficult hazard.
7. Fires in transformers can present a serious health and environmental risk because of coolant liquids that contain PCBs (polychlorinated biphenyls). These liquids are flammable because of their oil base.
8. 1 out of 5 fires originate from electrical problems (per USFA).
9. Electrical arcing and sparking usually occurs in confined spaces such as inside the wall, outlet, appliance, or the attic.
10. Some arcing does occur in the living space from defective appliances and overheated or damaged extension cords.

First Law of Responders
Don't take more victims to the scene.

Second Law of Responders
Don't get it on you or even touch it.

Third Law of Responders
If there is more than one unconscious patient on scene, there may be scene safety implications.

Fourth Law of Responders
All electricity goes to ground.

55 ELECTRICAL HAZARD

56  ELEVATOR / ESCALATOR RESCUE

| KEY QUESTIONS | ↷ ✈ POST-DISPATCH INSTRUCTIONS |
|---|---|
| 1. Has the power been turned off? | a. (Escalator) To shut off the escalator, push the emergency shutoff switch (button) which is located at the top and bottom of the escalator and push it. |
| 2. (Elevator) Is there any contact with the occupants? | b. (Elevator) Do not try to force or pry the elevator doors open. |
| 3. (Elevator) Which floor is the elevator stuck on? | c. If possible, maintain verbal contact with the trapped victims and assure them that help is on the way. |
| 4. (Appropriate) What is the elevator number? | |
| 5. What is the exact location of the elevator (escalator)? | |
| 6. What is the best entrance in the building to get to the elevator (escalator)? | * Advise the caller to contact the elevator service company. |
| 7. Is anyone sick or injured? | * Advise the caller to contact building management. |
| (Yes) How many? | |
| Yes ──────────── | FLS  * Link to ☎ X-1 unless: |
| | Possible Danger – Not Trapped ─── ▽ X-4 |
| | Stay on Line ─── X-2 |
| | Urgent disconnect ─── X-3 |

| LEVELS | # | DETERMINANT DESCRIPTORS | CODES | RESPONSES | MODES |
|---|---|---|---|---|---|
| D | 1 | ENTRAPMENT (escalator) with injuries | 56-D-1 | | |
| B | 1 | Elevator malfunction – occupants inside (medical condition present) | 56-B-1 | | |
| | 2 | ENTRAPMENT (escalator) with no injuries | 56-B-2 | | |
| | 3 | Unknown situation | 56-B-3 | | |
| A | 1 | Elevator malfunction – occupants inside | 56-A-1 | | |
| Ω | 1 | Elevator malfunction – no occupants inside | 56-Ω-1 | | |

FIG. 5M

| ENTRAPMENT | Axioms | Escalator Injury Causes |
|---|---|---|
| A situation involving a prevention of escape in which there is an immediate threat of death, increased injury or illness to a victim. | 1. More people use escalators (per unit) than elevators. | The most frequent situations where problems occur: |
| | 2. An estimated 18,000 people per year are treated for injuries received while using elevators and escalators in the U.S. | • Loose clothing (including shoe laces) being drawn into the gap and becoming entangled. |
| Types of Elevators/Escalators | 3. Ringing of a bell from inside the elevator indicates that someone is inside. | • Fingers becoming entrapped when people fall. |
| • Delivery | | • Fingers or feet becoming entrapped when children (either deliberately or inadvertently) place their fingers or feet at (or near) the gap. |
| • Dumb waiters | 4. Most elevator emergencies involve elevators that are stuck between floors due to a mechanical or power failure. | |
| • Freight | | • Footwear being drawn into the gap as a result of friction. |
| • Luggage carousel | 5. Forcing the door open can cause failure of safety circuits, allowing a car to move with the doors open while passengers may be attempting to leave the car. | • Long hair becoming entangled. |
| • Moving walkways | | |
| • Passenger | | Escalator Injury Statistics |
| | | There were an estimated 7,300 hospital emergency room-treated injuries from escalators in 1994. Seventy-five percent of these injuries were due to falls, another 20 percent occurred when hands, feet, or shoes were trapped in escalator. |
| Rules | 6. Exiting an elevator car when it is stopped between floors is extremely dangerous. Most accidents under these conditions happen when someone exiting the car slips through the opening under the car and falls down the shaft. | |
| 1. If in doubt, always assume an elevator is occupied. | | |
| 2. Unless there is a medical emergency in the elevator car, reassure the occupants that help is on the way and then wait for the elevator mechanic to arrive and handle the problem. | | |
| 3. If ENTRAPMENT in an escalator has occurred, the unit will not stall or stop. The emergency shutoff switch at the top or bottom must be activated. | 7. Heat, smoke, and moisture may cause the elevator control mechanism to activate. The elevator car can go to the fire floor, open its doors, exposing the occupants. | |

56  ELEVATOR / ESCALATOR RESCUE

FIG. 5N

57 EXPLOSIONS — 514

KEY QUESTIONS
1. (Not obvious) What has *exploded*?
2. Can you describe the extent of the damage?
3. Did you hear a bursting or hissing sound?
4. Has anyone complained of an unusual odor?
5. Did you see anything suspicious?
   Yes
6. Is anyone injured?
   a. (Yes) How many?
   Yes

POST-DISPATCH INSTRUCTIONS
a. This a potential *crime scene*. Do not touch anything.
b. Do not pick up any debris.
c. (Bomb) Be aware, there may be additional devices that haven't gone off yet.
d. (Fire) Do not try to extinguish the fire yourself.

FLS * Link to ☎ X-1 unless:
Possible Danger — ▽ X-4
Stay on Line — ✎ X-2
Urgent disconnect — ☎ X-3

| LEVELS | # | DETERMINANT DESCRIPTORS | CODES | RESPONSES | MODES |
|---|---|---|---|---|---|
| D | 0 | DELTA Zero (caller danger/incomplete information) | 57-D-0 | | |
| | 1 | Explosion (structure) | 57-D-1 | | |
| B | 1 | Explosion (non-structure) | 57-B-1 | | |
| | 2 | Investigation | 57-B-2 | | |
| | 3 | Standby | 57-B-3 | | |

Bomb
A case of explosive or incendiary material to be set off by impact or a timing device.

Types of Bombs
- Incendiary devices
- Mailbox bombs
- Mail bombs
- Military ordnance (found)
- Molotov cocktail
- Pipe bombs
- Pop bottle bombs
- Secondary devices
- Suspicious packages
- Switch devices
- Time-delayed devices

Types of Biological and Chemical Weapons
- Anthrax
- Botulinum toxin (botox)
- Sarin gas
- Smallpox

Rules
1. Advise the caller to never handle, move, or get near any suspicious packages.
2. Always advise responding personnel to use extreme caution, and be alert for secondary devices.
3. Building evacuations should be handled according to local protocol.
4. Reassure the caller that law enforcement is responding. If the caller is upset, the use of repetitive persistence may be applicable.
5. Since this is a crime scene, advise the caller not to touch or disturb anything in the residence or in the area.
6. Audible explosions without known, visible damage should be coded as 57-B-2.

Axioms
1. Unusual odors can signify what type of gas is present. Record them in comments if mentioned:
   - Fruity or geraniums = Seran
   - Bitter almonds = Cyanide
   - Newly mown hay = Mustard gas
   - Strong garlic = Arsine

Bombing Statistics
- Bomb incidents killed 397 people in the United States between 1990 and 1997.
- In 1995, 168 people were killed in the Oklahoma City bombing alone.
- In 1993, 6 people were killed and 1,042 were injured in the New York City World Trade Center bombing.
- Pipe bombs account for 26% of all improvised explosive devices.

57 EXPLOSIONS

FIG. 5P

58 EXTRICATION / ENTRAPPED (MACHINERY, AGRICULTURAL, INDUSTRIAL)

KEY QUESTIONS
1. What type of equipment is involved?
2. Has the equipment been turned off?
3. Are they still trapped?
4. Are there any hazards present?
   - Chemicals
   - Electrical
   - Fire
   - Liquids/Flowing water
   - Odors
   - Smoke
   - Vapor
5. (Appropriate) Has the maintenance department been notified?
6. Is anyone else injured?
   a. (Yes) How many?
      Yes

POST-DISPATCH INSTRUCTIONS
a. If it's safe to do so, turn off the equipment.
b. Do not move her/him unless s/he is in danger.
c. Do not re-enter any hazardous or dangerous areas.
d. If it's safe to do so, keep all affected people at the scene.

\* Determine a specific, clear meeting point for the emergency units.

FLS  \* Link to X-1 unless:
Possible Danger - ......................... X-4
Stay on Line ................................ X-2
Urgent disconnect ......................... X-3

LEVELS / DETERMINANT DESCRIPTORS  CODES  RESPONSES  MODES

E
1. ENTRAPMENT (confirmed) with multiple victims — 58-E-1
2. ENTRAPMENT (confirmed) with single victim — 58-E-2

D
0. DELTA Zero (caller danger/incomplete information) — 58-D-0
1. ENTRAPMENT (confirmed) with hazards — 58-D-1

| ENTRAPMENT | HAZMAT | Axioms |
|---|---|---|
| A situation involving a prevention of escape in which there is an immediate threat of death, increased injury or illness to a victim. | An incident involving a gas, liquid, or solid that even in small quantities poses a threat to life, health, or property. | 1. Even though these calls are generally 3rd party, it is important to determine if the patient actually requires extrication. |
| Extricate To free or remove from an ENTRAPMENT or difficulty. Implies the use of force or skill in freeing someone from a difficult position or situation. | Extrication Situations • Natural disasters • Structure collapse • Vehicle collisions | 2. Emergency service personnel must often utilize special tools and techniques when called upon to rescue someone trapped in any type of machinery. |
| Extrication Tool Terms • Air bags for lifting • Axe (pick head, pry, flat head) • Claw tool • Come-along • Cribbing (blocks of wood) • Cutters • Holmatro tool • Halligan (bar) tool • Jaws of Life (Hurst tool, Amkus) • Hydraulic jack • Knife for Life (Excalibur) • Pike pole • Port-a-power kits • Pry bars • Rabbit tool • Rams • Spreaders | Rules 1. If the patient is caught (trapped or pinned) in machinery, a maximal response should be sent, including the appropriate extrication team. 2. The caller should be advised not to re-enter a hazardous or dangerous environment. 3. The caller should be advised to keep all affected persons at the scene if possible, to lessen the threat of secondary contamination. 4. A call involving an ENTRAPMENT should be considered an extrication situation until responding units arrive and assess the circumstances. 5. If entrapped, assume the victim is injured. | 3. Extrication and ENTRAPMENT situations can require units to be tied up for considerable amounts of time. 4. All efforts to free the victim are focused on preventing any further injury to the victim. 5. An entrapped person often feels panic or has a feeling of impending doom. Reassurance should be provided whenever possible. |

58 EXTRICATION / ENTRAPPED (MACHINERY, AGRICULTURAL, INDUSTRIAL)

FIG. 5R

59  GAS LEAKS (GASES) — 518

KEY QUESTIONS
1. (Not obvious) Is the leak inside or outside?
2. Is there an open flame (ignition source) nearby?
3. (Not obvious) What exactly is the gas leaking from?
   a. (Appropriate) What is the size of the container?
4. Can you smell the gas?
5. Can you hear the gas flowing?
6. Is anyone sick or injured?
   (Yes) How many?
   Yes _____

POST-DISPATCH INSTRUCTIONS
a. (Cordless/Cell) If it's safe to do so, take the phone with you, leave the area, and leave the door open. Do not touch any electrical switches.
b. (Regular phone) Lay the phone down, do not hang it up. If it's safe to do so, leave the area and leave the door open. Do not touch any electrical switches.
c. Avoid using any open flame or other possible ignition source.

* Advise the caller and responders of potential hazards.
* Determine a specific, clear meeting point for the emergency units.
* Contact the local utility immediately.

| FLS | * Link to X-1 unless |
|---|---|
| Possible Danger | Not Trapped — X-4 |
| Stay on Line | X-2 |
| Urgent disconnect | X-3 |

| LEVELS | / DETERMINANT DESCRIPTORS | CODES | RESPONSES | MODES |
|---|---|---|---|---|
| D | 0  DELTA Zero (caller danger/incomplete information) | 59-D-0 | | |
| | 1  Inside ruptured line (break) | 59-D-1 | | |
| | 2  Known ignition source nearby | 59-D-2 | | |
| C | 1  Outside ruptured line (break) | 59-C-1 | | |
| | 2  Propane tank | 59-C-2 | | |
| B | 1  Outside odor | 59-B-1 | | |
| | 2  Inside odor | 59-B-2 | | |
| | 3  Unknown situation | 59-B-3 | | |

HAZMAT
An incident involving a gas, liquid, or solid that even in small quantities poses a threat to life, health, or property.

Rules
1. The caller should be advised not to re-enter a hazardous or dangerous environment.
2. Gas is flowing until proven otherwise.
3. All gas leaks are considered hazardous until proven otherwise.
4. Be aware of the possibility of an explosion when dealing with suspected gas leaks.

First Law of Responders
Don't take more victims to the scene.

Second Law of Responders
Don't get it on you or even touch it.

Third Law of Responders
If there is more than one unconscious patient on scene, there may be scene safety implications.

Axioms
1. Many gases (both flammable and inert) can displace the percentage of oxygen in available air, creating serious (unseen) scene safety conditions.
2. Natural gas is lighter than air and tends to rise and diffuse in the open.
3. Natural gas is non-toxic, but it is classified as an asphyxiant because it may displace normal breathing air and lead to asphyxiation.
4. Natural gas has no odor of its own but a very distinctive odor (mercaptan) is added by the utility companies as a warning smell.
5. Response time for utility companies is usually less than an hour, but this time may be extended in rural areas or in times of great demand.
6. Liquefied petroleum gas (LPG) is one and one-half times as heavy as air, and it will generally seek the lowest point possible.

Inside Odor Sources
- Dryer
- Furnace
- Stove
- Water heater

Potential Ignition Sources
- Cutting and welding
- Electrical appliances
- Frictional heat
- Hot surfaces
- Light switches
- Lightning
- Open flames
- Radiant heat
- Smoking
- Sparks (static, electrical, mechanical)
- Spontaneous ignition including heat-producing chemical reactions
- Thermostats

Common Signs of Gas Leaks
- Blowing or hissing sounds
- Brown patches of vegetation on or near a pipeline right-of-way
- Dirt being blown or thrown into the air
- Dry spot in a moist field
- Fire coming from the ground or burning above the ground
- Gas odor
- Water bubbling or being blown into the air at a pond, creek, or river

59  GAS LEAKS (GASES)

60  HAZMAT / FUEL SPILL — 522

KEY QUESTIONS
1. (Not obvious) What kind of chemicals or substances (fumes or hazardous materials) are involved?
   a. Do you know the warning placard numbers, words, or colors (chemical ID)?
2. Is the spill (leak) contained?
3. How much has spilled or leaked (≥ 50 gallons)?
4. (Not obvious) Where are the chemicals (fumes) coming from?
   a. (Liquid) Which direction is the liquid flowing?
5. (Appropriate) What is the size of the container?
6. Do you see a formation of gas clouds or vapor?
   a. (Yes) What direction is it moving?
   b. (Yes) What color is it?
7. Is anyone sick or injured?
   a. (Yes) How many?
      Yes

POST-DISPATCH INSTRUCTIONS
a. (Inside or near a hazardous place) If it's safe to do so, leave the contaminated area, but not the scene.
b. If anyone (including yourself) is contaminated with chemicals, do not touch her/him (anything).

\* Notify the local and national response centers.
\* Advise the caller and responders of potential hazards.

FLS     \* Link to ☎ X-1 unless:
Possible Danger    Get Trapped ............... ▽  X-4
Stay on Line  ................................ ℩ X-2
Urgent disconnect ........................... ☎ X-3

| LEVELS | # | DETERMINANT DESCRIPTORS | CODES | RESPONSES | MODES |
|---|---|---|---|---|---|
| D | 0 | DELTA Zero (caller danger/incomplete information) | 60-D-0 | | |
|   | 1 | Chemical spill or leak (uncontained or moving) | 60-D-1 | | |
|   | 2 | Radioactive material | 60-D-2 | | |
|   | 3 | Biological material | 60-D-3 | | |
| C | 1 | Chemical spill or leak (contained) | 60-C-1 | | |
|   | 2 | Fuel spill or leak ≥ 50 gallons | 60-C-2 | | |
| B | 1 | Fuel spill or leak < 50 gallons | 60-B-1 | | |
|   | 2 | Unknown situation | 60-B-2 | | |
| A | 1 | Abandoned waste | 60-A-1 | | |

HAZMAT
An incident involving a gas, liquid, or solid that even in small quantities poses a threat to life, health, or property.

HOT ZONE
A geographical area established by Command as unsafe which includes the incident, product, container, and the immediate area exposed to gas, vapor, mist, dust, smoke, or runoff. (Only specially trained and equipped personnel can operate in this zone.)

COLD ZONE
A geographical area established by Command that is safe. An area where many support functions occur.

First Law of Responders
Don't take more victims to the scene.

Second Law of Responders
Don't get it on you or even touch it.

Third Law of Responders
If there is more than one unconscious patient on scene, there may be scene safety implications.

Fifth Law of Responders
What you don't know can kill you.

Types of Biological Weapons
- Viruses – Ebola, Hanta
- Bacteria – Vibrio cholera, Yersinia pestis, Bacillus anthracis
- Rickettsial Organisms – Coxiella burnetti, Rickettsia prowasecki

Rules
1. The caller should be advised not to re-enter a hazardous or dangerous environment.
2. The caller should be advised to keep all affected persons at the scene if possible, to lessen the threat of secondary contamination.
3. A spill or leak is considered uncontained until proven otherwise.

Axioms
1. The United Nations (UN) or North American (NA) number is a 4-digit number that is either painted or stenciled on the end of rail cars or located on the warning placard. This number indicates the type of chemical that is being transported.
2. The NFPA-704 Marking System distinctively indicates the properties and potential dangers of hazardous materials. This system is usually required on fixed site facilities.
3. Patients who have inhaled smoke, carbon monoxide, or other chemicals may be found in any stage of intoxication. Carbon monoxide binds very tightly to hemoglobin and can lead to an urgent situation.

Secondary Contamination
When the contaminant is carried out of the HOT ZONE and contaminates people, animals, and/or the environment. The contaminant can be carried on clothing or skin.

Other Information Sources
CHEMTREC: 1-800-424-9300 (U.S.)
(Non-Emergent): 1-800-262-8200 (U.S.)
CANUTEC: 1-613-996-6666 (Canada)

Essential Information for Reporting a HAZMAT Emergency from Dispatch
1. Name and telephone number of caller.
2. Location, source, and nature (e.g., leak, explosion, derailment) of release.
3. Number of dead or injured.
4. Name of acutely toxic chemical released.
5. Description of the container.
6. Amount of chemical released so far and duration of release.
7. Type of release (e.g., instantaneous, continuous, intermittent).
8. Time of release.
9. Total possible amount of chemical that may be released.
10. Present state of the chemical (gas, liquid, etc.).
11. Whether significant amounts of the chemical appear to be entering the atmosphere.
12. Direction of vapor clouds or fumes.
13. Weather conditions.
14. Local terrain conditions.

Color of Gas Cloud
- Yellow – Chlorine
- Green – Ammonia biflouride
- Brown – Anhydrous ammonia & Rhyzine gas
- White – Liquified petroleum gas (LPG)

60  HAZMAT / FUEL SPILL

61  HIGH ANGLE RESCUE (ABOVE GROUND)

| KEY QUESTIONS | POST-DISPATCH INSTRUCTIONS |
|---|---|
| 1. What type of structure (environment) is involved?<br>2. What is her/his approximate distance from the ground?<br>3. (Appropriate) Is this a threatened suicide?<br>  Yes —————————————<br>4. Does s/he appear to be awake (moving at all)?<br>  No —————————————<br>5. Is anyone else injured?<br>  (Yes) How many?<br>  Yes ————————————— | a. Do not approach or attempt to rescue the victim(s).<br>b. (Non-suicidal) Tell the victim not to move.<br>c. (Non-suicidal) Do not touch any equipment that may be suspending the victim.<br><br>✱ Notify Technical Rescue Team (TRT) immediately.<br><br>FLS  ✱ Link to ☎ X-1 unless:<br>  Stay on Line ............... X-2<br>  Urgent disconnect ......... X-3 |

LEVELS / DETERMINANT DESCRIPTORS          CODES     RESPONSES     MODES

C  1  HIGH ANGLE rescue (confirmed)         61-C-1
    2  Threatening suicide                    61-C-2
    3  Victim not moving                      61-C-3

| HIGH ANGLE | Rules | First Law of Responders |
|---|---|---|
| Rescue or extrication situation of person(s) from an elevated structure (buildings/terrain) where conventional interior rescue is not possible.<br><br>Also to effect rescues of injured and/or stranded persons in areas where normal access is unavailable or hazardous due to height and/or terrain. | 1. In the event, there is no Technical Rescue Team (TRT) available, consider utilizing MUTUAL AID resources.<br>2. Evacuations at greater than 60° inclination are considered HIGH ANGLE operations. A TRT should be used for all rescues above this angle.<br>3. In specialized rescues, the TRT should be advised as soon as possible in order to affect a timely recovery of the victim. | Don't take more victims to the scene.<br><br>First Law of Technical Rescue<br>The first 10 minutes on scene of a technical rescue often determine how the next few hours will go. |
| HIGH RISE<br>A building (structure) that is too tall for adequate fire control from ground-based aerial ladders or elevating platforms or towers.<br>Local Fire Administration must define and authorize (☒) the actual height of structures constituting HIGH RISE in their area:<br>☐ _____<br><br>Approval signature of local Fire Administration   Date approved | Axioms<br>1. Scene safety should include advising the caller not to touch any equipment that may be suspending the victim.<br>2. For purposes of general building size up, 10 feet equals one story (floor level).<br>3. Buildings over 75 ft. high present special problems for the fire safety of occupants.<br>4. The U.S. NFPA considers any building greater than 75 ft. a high-rise structure. | Ladder Sizes<br>• 10 ft. attic ladder<br>• 14 ft. roof ladder<br>• 24 ft. roof ladder extension<br>• 35 ft. roof ladder extension<br>• 55 ft. extension ladder (Bangor)<br>• 70-110 ft. aerial ladder (truck mounted)<br>• 70-100 ft. snorkel elevating platform<br>• 100-125 ft. platform ladder combo |
| Technical Evacuation<br>Evacuations required at greater than 40° inclination or on such rough terrain that the evacuation requires specific technical rescue training. | | |

61  HIGH ANGLE RESCUE (ABOVE GROUND)

FIG. 5X

62  MARINE FIRES — 524

KEY QUESTIONS

1. What type of boat (vessel) is it?
   a. What is the name of the boat (vessel)?
2. Is the fire threatening anything?
   - Other boats
   - Pier
   - Structure
3. What is the exact location of the boat (vessel)?
   a. (In the water) Do you have GPS coordinates or Loran reading?
   b. (Docked) What is the ramp, walk, and slip number?
4. Are there chemicals or other hazards involved?
5. Is anyone in the water?
6. How many people are onboard (still onboard)?
7. Is anyone injured?
   a. (Yes) How many?
      Yes ─────────────────── ○

POST-DISPATCH INSTRUCTIONS a. (Appropriate) Do not enter the burning compartment.
b. If you are forced to abandon ship, please call us back immediately.
c. If it's safe to do so, put on your life jackets.
d. If it's safe to do so, put the anchor overboard.
e. Do not try to extinguish the fire yourself.

FLS    * Link to ☎ X-1 unless:
Using an Extinguisher ------------------------------ Y-4
Possible Danger -------------------------------- ▽ X-4
Stay on Line ---------------------------------- ✓ X-2
Urgent disconnect ----------------------------- ☎ X-3

| LEVELS | # | DETERMINANT DESCRIPTORS | CODES | RESPONSES | MODES |
|---|---|---|---|---|---|
| D | 0 | DELTA Zero (caller danger/incomplete information) | 62-D-0 | | |
| | 1 | THREATENED STRUCTURE or other boats | 62-D-1 | | |
| | 2 | Not threatening structure or other boats | 62-D-2 | | |
| B | 1 | Extinguished fire | 62-B-1 | | |

*Add suffix V, C, or B (both) to Det Code*

THREATENED STRUCTURE
Any structure that has a potential of catching on fire.

Concurrent Problem Suffixes
Indicate additional concurrent problems by adding one of the following suffixes to the determinant code:

V = Victims in water
C = Chemicals or hazards involved
B = Both (victims and chemicals or hazards)

Marine Firefighting
Responds to fire aboard or associated with waterborne vessels, whether alongside a dock or wharf, at anchor, or under way in the jurisdiction.

Types of Boats

- Cargo carrier
- Dry bulk
- Industrial
- Liquid natural gas (LNG)
- Non-commercial (misc.)
- Passenger
- Service vessels
- Roll on/Roll off (RORO)

First Law of Marine Fires
Fire is a boat's worst enemy.

Second Law of Marine Fires
When the fire burns to the water line, the fire will go out.

First Law of Capsizing
If a boat capsizes (overturns), stay with the boat.

Rules
1. Advise the caller that if unable to control the fire, prepare to abandon the vessel.
2. The determination of whether a fire is threatening a structure should be based on the caller's judgment.

Axioms
1. Dangerous cargo manifest or shipping papers are in a pipe-like container or box on the gangplank when it is in port. The responsible party is the captain or the master of the vessel.

62  MARINE FIRES

FIG. 5Z

63  MUTUAL AID

— 526

| KEY QUESTIONS | ↔ POST-DISPATCH INSTRUCTIONS |
|---|---|
| 1. (Not obvious) What type of incident is this? | ∴ I'm sending the following units as requested: (Confirm all units responding.) |
| 2. Are there any hazards present? | |
|     Chemicals | |
|     Electrical | |
|     Fire | |
|     Liquids-Flowing water | |
|     Odors | |
|     Smoke | |
|     Vapor | |
| 3. What resources are needed? | |
| 4. Where exactly do you need them to respond? | ✱ Advise responding units of possible hazards. |
| 5. Has an incident command location been established? | |
| 6. Who should they report to? | FLS  ↱ |
| 7. (Appropriate) What channel are they using? | |

| LEVELS | # | DETERMINANT DESCRIPTORS | CODES | RESPONSES | MODES |
|---|---|---|---|---|---|
| D | 1 | MUTUAL AID to incident | 63-D-1 | | |
| | 2 | AUTOMATIC AID (multiple units) | 63-D-2 | | |
| B | 1 | AUTOMATIC AID (single unit) | 63-B-1 | | |
| A | 1 | MUTUAL AID move up (station assignment) | 63-A-1 | | |
| | 2 | MUTUAL AID to staging area | 63-A-2 | | |

| MUTUAL AID | Types of Apparatus | Situations Requiring MUTUAL and/or AUTOMATIC AID |
|---|---|---|
| An agreement between communities that allows for the exchange of equipment for use during an emergency. Also, a request for specialized apparatus or equipment to the scene of an emergency, or a request for station coverage due to unfilled normal assignments or unusual activity levels. | • Engines<br>  Brush truck<br>  Crash unit<br>  Pumper<br>  Squirt<br>• Ladders<br>  Aerial<br>  Snorkel<br>  Tower unit<br>  Truck<br>• Special<br>  Air supply unit/Cascade<br>  Boat<br>  Field communications unit<br>  Foam unit<br>  HAZMAT unit<br>  Lighting plant<br>  Rehab unit<br>  Rescue unit<br>  Squad<br>  Tanker/Tender<br>  Tunnel/Collapse unit | • A fire can occur near the border of one jurisdiction and the nearest water source can be over the line in a neighboring jurisdiction.<br><br>• A fire can occur near the border of one jurisdiction but the arrangement of roads means that fire apparatus from a neighboring jurisdiction can reach the scene faster than the home fire apparatus.<br><br>• A fire can occur near the border of one jurisdiction and the customary water source, roads, or bridges even in the jurisdiction may be temporarily out of service.<br><br>• A large fire anywhere in the jurisdiction may require more water than can be moved with the home department's equipment alone.<br><br>• Several neighboring departments may each have specialized equipment that is not owned by the other departments.<br><br>• Natural disasters such as floods, tornadoes, and hurricanes can easily overwhelm the capabilities of any department. |
| AUTOMATIC AID<br>A predetermined agreement between communities to utilize the closest units regardless of jurisdictional boundaries. | | |
| Rules:<br>1. In MUTUAL AID situations, go immediately to Protocol 63 after determining the address and callback numbers.<br>2. Refer to local policy regarding updating the availability of MUTUAL AID resources.<br>3. Confirmation of location and responding units should occur on every call. | | |

63  MUTUAL AID

FIG. 5AB

64  ODORS (STRANGE / UNKNOWN) — 528

KEY QUESTIONS
1. (Not obvious) Is the odor inside or outside?
2. (Not obvious) What is the source of the odor?
   (Unknown) What does the odor smell like?
   - Electrical — 55
   - Gas — 59
   - Gasoline — 60
   - Smoke — 66
   - Smoke — 67
3. How long have you smelled it?
4. Is anyone sick or injured?
   a. (Yes) How many?
   b. (Yes) Is s/he completely awake (alert)?
      Yes ──────────────── ⊕

POST-DISPATCH INSTRUCTIONS
a. (Appropriate) If it's safe to do so, leave the area now (close the doors behind you), and remain outside.

✱ Determine a specific, clear meeting point for the emergency unit.

FLS   ✱ Link to ☎ X-1 unless:
Possible Danger                ▽ X-4
Stay on Line                   ƒ X-2
Urgent disconnect              ☎ X-3

| LEVELS | # | DETERMINANT DESCRIPTORS | CODES | RESPONSES | MODES |
|---|---|---|---|---|---|
| D | 0 | DELTA Zero (caller danger/incomplete information) | 64-D-0 | | |
| | 1 | Odor with not alert patient | 64-D-1 | | |
| C | 1 | Odor with multiple patients | 64-C-1 | | |
| B | 1 | Odor with single patient | 64-B-1 | | |
| A | 1 | Unknown odor (inside) | 64-A-1 | | |
| | 2 | Unknown odor (outside) | 64-A-2 | | |

Rules
1. The caller should be advised not to re-enter a hazardous or dangerous environment.
2. Many times calls for odors have no readily identifiable source. Odors may be coming from an area away from the caller.
3. Do not assume that an odor is from a non-threatening material. It could be from a fire, or a chemical odor from a hazardous materials spill.
4. Odors coming from an appliance should be coded 64-A-1.

Axioms
1. Patients who have inhaled smoke, carbon monoxide, or other chemicals may be found in any stage of intoxication. Carbon monoxide binds very tightly to hemoglobin and can lead to an urgent situation.
2. Unconsciousness in a patient who has inhaled carbon monoxide is a bad sign. Hyperbaric oxygen treatment may be necessary to prevent death or brain damage.
3. Unusual odors can signify what type of gas is present. Record them in comments if mentioned:
   - Fruity or geraniums – Seran
   - Bitter almonds – Cyanide
   - Newly mown hay – Mustard gas
   - Strong garlic – Arsine

Illegal Laboratory / Drug Operation Smells
- Acetone
- Ammonia
- Bittersweet
- Cat urine
- Metallic taste in mouth

Familiar Burning Odor
Individuals may recognize an odor that is frequently encountered, for example an electrical odor, and a short time later find that the odor has dissipated but return home only to find a fire occurred in their house while they were gone.

Burning Odor (No Sign of Smoke)
Often individuals who smell a burning odor, because they do not see smoke, don't call the fire department or think "someone else has called." As a result, the fire department does not receive notification of the emergency until it has developed into a major incident.

Second Law of Responders
Don't get it on you or even touch it.

64  ODORS (STRANGE / UNKNOWN)

65  OUTSIDE FIRE

KEY QUESTIONS
1. (Not obvious) Tell me exactly what is burning?
2. Is the fire threatening anything?
   Animals, Roadways, Structures, Trees, Vehicles
   a. (Yes) How far away is it?
3. Is the fire spreading?
   a. (Yes) What direction is the fire spreading?
4. (Grass/WILDLAND fire) What size of an area is involved?
   a. Do you have GPS coordinates?
5. (Lightning strike) Where did it make contact?
6. (Unattended) What materials are involved?
7. Is anyone injured?
   a. (Yes) How many?
   Yes

POST-DISPATCH INSTRUCTIONS
- Listen carefully, this could be a very dangerous situation. Do not try to extinguish the fire yourself.
* Determine a specific, clear meeting point for the emergency units.
* (Threatened roadway) Notify law enforcement.
* Notify appropriate agencies.

FLS  * Link to ☎ X-1 unless:
People on Fire ——————————————— Y-2
Possible Danger – Not trapped ——————— X-4
Stay on Line ———————————————— X-2
Urgent disconnect ——————————————— X-3

| LEVELS | # | DETERMINANT DESCRIPTORS | CODES | RESPONSES | MODES |
|---|---|---|---|---|---|
| D | 0 | DELTA Zero (caller danger/incomplete information) | 65-D-0 | | |
| | 1 | Threatened animals | 65-D-1 | | |
| | 2 | THREATENED STRUCTURE | 65-D-2 | | |
| | 3 | Threatened vehicles | 65-D-3 | | |
| | 4 | WILDLAND fire | 65-D-4 | | |
| C | 1 | Dumpster fire threatening structure | 65-C-1 | | |
| B | 1 | Brush (grass) fire | 65-B-1 | | |
| | 2 | Unattended fire | 65-B-2 | | |
| | 3 | Lightning strike without fire (recent or investigative) | 65-B-3 | | |
| A | 1 | Dumpster fire away from structure | 65-A-1 | | |
| | 2 | Outside trash container (garbage can) | 65-A-2 | | |
| | 3 | Attended fire | 65-A-3 | | |
| | 4 | Extinguished fire | 65-A-4 | | |

| THREATENED STRUCTURE | Rules | Outside Fire Statistics |
|---|---|---|
| Any structure that has a potential of catching on fire. | 1. When the caller is unsure if associated structures are threatened, always assume they are.<br>2. A structure is considered to be threatened when anything on fire is approaching, until proven otherwise.<br>3. The determination of whether a fire is threatening a structure should be based on the caller's judgment.<br>4. If the caller struggles to determine the size of the fire, ask them to relate it to the size of a familiar area (ie., football field, tennis court, etc.). | • In 1998, there were 1,755,000 fires in the United states. 41% were outside fires.<br>• In 1997, more than 12 million acres of forest burned worldwide.<br>• Of the eight million lightning strikes occurring worldwide each day, 1% result in WILDLAND fires.<br>• Dry lightning causes 80% of all WILDLAND fires.<br>• Flames can reach 300 feet in height, smoke columns can reach 40,000 feet.<br>• A heavy-lift helicopter can lift 28,000 pounds and release up to 2,500 gallons of water per drop. |
| WILDLAND Fires (NFPA)<br>Any forest, grass, brush, or tundra fire involving lands not under cultivation but including forests regardless of the type of timber (i.e., tree farms). | | |
| Forest Fire Danger Levels<br>Forest fire danger levels are classified as low, high, or extreme. Fire danger is determined by using weather data, rainfall accumulation, temperature, current moisture, humidity conditions, and weather predictions. | Axioms<br>1. WILDLAND fires, especially fires in canyons, are very dangerous and unpredictable.<br>2. Southern exposure of hills and mountains (north of the equator) receive the most sunlight and heat. Fires will burn faster on southern exposures.<br>3. Be aware that fuel, mulch, landscape, and tire fires can smolder for days.<br>4. Resulting wildfire winds can attain 120 mph. | |
| Special Notifications<br>• Bureau of Land Management (BLM)<br>• Forest Service<br>• MUTUAL AID<br>• Other agencies<br>• Park Police<br>• Park Service<br>• Weather Service | | |

65  OUTSIDE FIRE

FIG. 5AF

66 SMOKE INVESTIGATION — 532

KEY QUESTIONS
1. Where is the smoke coming from?
2. (Not obvious) Is the smoke inside or outside?
3. Can you see through the smoke?
4. What color is the smoke?

POST-DISPATCH INSTRUCTIONS
a. If visibility is affected, use caution in driving through any smoke.
67 b. If it's safe to do so, remain at your present location and direct emergency units to the area.

FLS   * Link to ☎ X-1 unless:
Possible Danger – Not Trapped ........... ▽ X-4
Stay on Line ................................... ✆ X-2
Urgent disconnect ........................... ☎ X-3

| LEVELS | # | DETERMINANT DESCRIPTORS | CODES | RESPONSES | MODES |
|---|---|---|---|---|---|
| C | 1 | HEAVY smoke (outside) | 66-C-1 | | |
| A | 1 | LIGHT smoke (outside) | 66-A-1 | | |

HEAVY Smoke
The caller is unable to see objects through the smoke.

LIGHT Smoke
The caller is able to see objects through the smoke.

1. The caller should be advised to remain at a safe place near their present location to help the responders locate the smoke.
2. Smoke inside a structure, seen or smelled, should be coded as a structure fire on Protocol 67.
3. If the caller can smell smoke outside, but does not see it, code as 66-A-1.
4. If the caller describes the smoke as non-visible or felt but not seen (mist), consider the possibility of a gas leak.

Axioms
1. Smoke causes the majority of fire-related deaths. Smoke contains deadly gases such as carbon monoxide. When smoke is produced, life-sustaining oxygen is consumed. Most fire victims die from these factors, frequently before they awaken. In many fires, extinguished in the early stages, people have been found dead of smoke inhalation without having suffered any skin burns.
2. Smoke and deadly gases rise to block off obvious escape routes.
3. Once water is placed on the fire, the smoke may turn white.
4. What is reported as smoke might not be actual smoke. It may be steam or a HAZMAT cloud.

Color of Gas Cloud
The following colors may indicate the type of gas:
• Yellow = Chlorine
• Green = Ammonia billouride
• Brown = Anhydrous ammonia & Phyzine gas
• White = Liquified petroleum gas (LPG)

Color of Smoke
• Black
  Materials with hydrocarbons such as paints, thinners, oils, gasoline, rubber, and plastics.
• Dark Gray
  Combustible materials in a later burning stage.
• Gray-White
  Combustible materials such as wood, paper, and cloth in early burning stages.
• Yellow-Gray and/or Brownish-Gray
  Slow burning, deep seated fire.

First Law of Smoke
The smoke kills more people than the flames.

First Law of Fire Dispatch
Where there's smoke, there's fire.

66 SMOKE INVESTIGATION

FIG. 5AH

67 STRUCTURE FIRE (COMMERCIAL / RESIDENTIAL) — 534

KEY QUESTIONS
1. What type of structure is involved?
   - Chimney
   - Commercial
   - HIGH LIFE HAZARD
   - Non-dwelling structure
   - Residential
   - Residential
2. How many levels or stories are there?
   - Which floor (level) is the fire on?
3. Are there any hazardous materials inside?
4. What exactly is burning?
5. Is anyone injured?
   a. (Yes) How many?
   Yes _____

POST-DISPATCH INSTRUCTIONS
a. (Inside structure or Appropriate) If it's safe to do so, leave the structure and close the doors behind you, and remain outside.
b. (Multi-level structure) Do not use the elevator.
c. Do not try to extinguish the fire yourself.
d. (Commercial) If it's safe to do so, activate the alarm as you leave to warn others.
* Advise the caller to never carry out a pan, furniture, bedding or anything that is on fire (burning).
* Advise the caller to never attempt to extinguish a grease fire.

FLS  * Link to ☎ X-1 unless:
Trapped in Structure fire ——————————— Y-1
Possible Danger – Not Trapped ——————— X-4
Stay on Line ————————————————— X-2
Urgent disconnect ————————————— X-3

| LEVELS | # | DETERMINANT DESCRIPTORS | CODES | RESPONSES | MODES |
|---|---|---|---|---|---|
| E | 1 | ENTRAPMENT (confirmed) | 67-E-1 | | |
| D | 0 | DELTA Zero (caller danger/incomplete information) | 67-D-0 | | |
| | 1 | HIGH LIFE HAZARD | 67-D-1 | | |
| | 2 | HIGH RISE | 67-D-2 | | |
| | 3 | HIGH OCCUPANCY | 67-D-3 | | |
| | 4 | HAZMAT present | 67-D-4 | | |
| | 5 | Commercial structure | 67-D-5 | | |
| | 6 | Residential (multiple) | 67-D-6 | | |
| | 7 | Residential (single) | 67-D-7 | | |
| | 8 | Chimney fire | 67-D-8 | | |
| | 9 | Non-dwelling structure (shed, detached garage) | 67-D-9 | | |
| C | 1 | Appliance (contained) | 67-C-1 | | |
| | 2 | Extinguished fire | 67-C-2 | | |
| B | 1 | Odor of smoke (nothing visible) | 67-B-1 | | |
| | 2 | Lightning strike without fire | 67-B-2 | | |

HIGH LIFE HAZARD Locations
Any location that poses multiple life threats due to difficulty exiting or lack of mobility of the inhabitants:
- Churches
- High-rise buildings
- Hospitals
- Lodging locations (hotels)
- Nursing homes
- Schools
- Subway stations

HIGH RISE
A building (structure) that is too tall for adequate fire control from ground-based aerial ladders or elevating platforms or towers.
Local Fire Administration must define and authorize (☒) the actual height of structures constituting HIGH RISE in their area:
☐ _____
_Approved signature of local Fire Administration_   _Date approved_

HIGH OCCUPANCY
The general term for a building that can or does contain a large number of people. An apartment complex is an example as long as people could easily exit.

Rules
1. All structures are considered occupied until proven otherwise.
2. Advise the caller to never carry out a burning pan, furniture, or bedding.
3. Advise the caller to never use water to extinguish a grease fire.
4. A fire that is fully contained within an appliance should be coded 67-C-1.

Axioms
1. Fuel, heat, and oxygen must be present for a fire to exist. If any one of these three elements is not present or removed, a fire cannot start or continue to burn.
2. Most home fires happen between 10 p.m. and 6 a.m.
3. Children and the elderly are most susceptible to clothing-related fires.
4. For purposes of general building size up, 10 feet equals one story (floor level).
5. Fire is the third leading cause of death in the home.
6. At least 80% of all fire deaths occur in residences.
7. A fire can double in size within seconds.
8. Grease fires under a vent hood are one of the most common types of extinguished fires reported.

Stop, Drop, and Roll Technique
- Stop. If your clothing catches fire, immediately stop. Do not run or try to pat out the flames with your hands.
- Drop. Immediately drop to the floor or ground and lay out flat.
- Cover your face.
- Roll. Once on the ground or floor, roll over and over again smothering the flames as you roll. If a blanket, rug, or large jacket is available, it can be used to wrap the body, also smothering the flames.

Victim's First Law of Survival
Once you are out, stay out!

First Law of Fire Dispatch
Where there's smoke, there's fire.

Structure Fire Statistics
- In 1998, there were 1,755,000 fires in the U.S. 29% of these were structure fires.
- In commercial properties, arson is the major cause of death, injuries, and dollar loss.

67 STRUCTURE FIRE (COMMERCIAL / RESIDENTIAL)

FIG. 5AJ

68 Train / Subway / Commuter Rail Incidents — 536

KEY QUESTIONS
1. What type of train is it?
   - Freight
   - Passenger only
2. How many rail cars are involved?
3. (Freight) Are there chemicals or other hazards involved?
   (HAZMAT) Do you know the warning placard numbers, words, or colors (chemical ID)?
   b. Are the railcars leaking anything?
4. Is this a derailment?
5. (Fire) What exactly is burning?
6. Are there any structures or vehicles involved (threatened)?
7. (Not obvious) Is the accident elevated, below, or at ground level?
8. Is anyone injured?
   a. (Yes) How many?
      Injuries

POST-DISPATCH INSTRUCTIONS
a. Listen carefully, this could be a very dangerous situation.
b. (HAZMAT) If anyone (including yourself) is contaminated with chemicals, do not touch her/him (anything).
c. (Fire) Do not try to extinguish the fire yourself.
d. If it's safe to do so, leave the area now, but not the scene.

* Notify the Railroad Dispatch Control Tower.
* If it is determined that a train cannot be stopped, notify the on-scene incident commander immediately.

FLS * Link to ☎ X-1 unless:
Possible Danger - Not trapped - ... ▽ X-4
Stay on Line ... ☎ X-2
Urgent disconnect ... X-3

| LEVELS | # | DETERMINANT DESCRIPTORS | CODES | RESPONSES | MODES |
|---|---|---|---|---|---|
| E | 1 | ENTRAPMENT (confirmed) | 68-E-1 | | |
| D | 0 | DELTA Zero (caller danger/incomplete information) | 68-D-0 | | |
| | 1 | HAZMAT | 68-D-1 | | |
| | 2 | Derailment (passenger) | 68-D-2 | | |
| | 3 | Derailment (freight) | 68-D-3 | | |
| | 4 | Fire onboard (passenger) | 68-D-4 | | |
| | 5 | Fire onboard (freight) | 68-D-5 | | |
| | 6 | Structures or vehicle involved (threatened) | 68-D-6 | | |

Add suffix B, E, or G to Determinant Code

HAZMAT ⊗
An incident involving a gas, liquid, or solid that even in small quantities poses a threat to life, health, or property.

Incident Location Coding Suffixes
B = Below ground
E = Elevated above ground
G = Ground level

Bridge (Trestle):
A structure spanning and providing passage over a gap or barrier such as a river or roadway.

Rules
1. Immediately notify the Railroad Dispatch Control Tower to begin the process of stopping train traffic and de-energizing third rails.
2. If it is determined that a train cannot be stopped, notify the on-scene incident commander immediately.

Axioms
1. What is reported as smoke might not be actual smoke. It may be steam or a HAZMAT cloud.
2. Subways (and some other commuter trains) contain an electrically charged third rail.
3. There are more than 250,000 railroad crossings in the U.S.
4. Vehicles often collide with trains when visibility is poor at night and during bad weather.
5. Speeding vehicles collide with trains when motorists are unable to stop prior to reaching an occupied crossing, as do vehicles operated by motorists who attempt to race an approaching train to a crossing.

First Law of Fire Dispatch
Where there's smoke, there's fire.

Other Information Sources
AMTRAK Police:
  1-800-331-0008 (U.S.)
CHEMTREC:
  1-800-424-9300 (U.S.)
CHEMTREC (Non-Emergent):
  1-800-262-8200 (U.S.)
CANUTEC:
  1-613-966-6666 (Canada)

* The National Academy is not responsible for the correctness or updating these numbers. Please check them often.

Rail Accident Statistics
More than 14,000 people have been killed and more than 35,000 injured at railroad crossings in the past 10 years.

68 Train / Subway / Commuter Rail Incidents

FIG. 5AL

69  VEHICLE FIRE — 538

KEY QUESTIONS
1. Is the vehicle inside or threatening any structure?
   Yes ——————————————————— 67
2. Is the fire threatening anything else?
3. (Not obvious) What type of vehicle(s) is involved?
4. (Appropriate) What type of cargo is it carrying?
5. (Suspected) Are there chemicals or other hazards involved?
   a. Do you know the warning placard numbers, words, or colors (chemical ID)?
6. Is anyone injured?
   a. (Yes) How many?
      Yes ———————————————————

POST-DISPATCH INSTRUCTIONS
a. Do not try to extinguish the fire yourself.
b. Do not try to get back in the vehicle to get personal items.
c. Stay away from the vehicle and general area.

✴ (HAZMAT) Use PDIs on Protocol 60 as appropriate.

FLS    ✴ Link to ☎ X-1 unless:
People on Fire ............................................. Y-2
Possible Danger - Not Trapped ................ V  X-4
Stay on Line ............................................... ☏ X-2
Urgent disconnect ..................................... ☎ X-3

| LEVELS | # | DETERMINANT DESCRIPTORS | CODES | RESPONSES | MODES |
|---|---|---|---|---|---|
| E | 1 | ENTRAPMENT (confirmed) | 69-E-1 | | |
| D | 0 | DELTA Zero (caller danger/incomplete information) | 69-D-0 | | |
|   | 1 | Vehicle fire with hazards | 69-D-1 | | |
|   | 2 | Motorhome, camper, tractor-trailor fire | 69-D-2 | | |
| C | 1 | Vehicle fire threatening non-structure | 69-C-1 | | |
| B | 1 | Vehicle fire (involved) | 69-B-1 | | |
| A | 1 | Vehicle fire (extinguished) | 69-A-1 | | |

| THREATENED STRUCTURE | First Law of Vehicle Fires | Axioms |
|---|---|---|
| Any structure that has a potential of catching on fire. | No distance is far enough when a tanker explodes. | 1. Motor vehicle fires can be very dangerous. |
| | | 2. Firefighters have been injured by air bags and air bag canisters activating during extrication activities. |
| | | 3. Injuries to firefighters from exploding front bumper crash shock absorbers on burning cars have been reported. |
| Non-Structure Objects | Rules | 4. A vehicle fire can generate heat upwards of 1,500°F. |
| • Animals | 1. Advise the caller to stay away from a burning vehicle, especially the front. | 5. Fires in motor vehicles can produce toxic gases. |
| • Roadway | 2. If a vehicle is inside a residential or public parking garage, it is considered to be a structure fire. | 6. Absence of a placard does not mean absence of HAZMAT. |
| • Vegetation (brush, trees) | | 7. A vehicle fire is not considered to be a HAZMAT incident until the fire is out. |
| • Vehicles | 3. The determination of whether a fire is threatening a structure should be based on the caller's judgment. | 8. Most vehicle fires start in the engine area. |
| Vehicle Fire Statistics | 4. A motorhome or camper should be considered a structure response due to their size and fireload. | 9. Flames from burning vehicles can shoot out distances of 10 feet or more. |
| Each year in the U.S., vehicle fires kill over 450 people and injure thousands more. Toxic gases and other hazardous substances, and flying debris and explosion, combine to produce serious dangers in motor vehicle fires. | | 10. The leading cause of motor vehicle fires is mechanical problems such as leaks (breaks in lines) and electrical failure. |
| • 1 out of 5 fires involves a motor vehicle. | | 11. Electrical fires commonly erupt under the dashboard and have a distinct odor. |
| • 1 out of 8 fire deaths results from motor vehicle fires. | | |
| • 1,200 firefighters are injured each year fighting motor vehicle fires. | | |

69  VEHICLE FIRE

FIG. 5AN

70  WATER RESCUE (SWIFT, STILL, ICE)

KEY QUESTIONS

1. (Not obvious) What type of body of water is it?
2. Can you see the victim(s)?
   - (No) What was the last location the victim(s) were seen?
   - (No) What was the exact location the victim(s) entered the water?
3. (Appropriate) How far from the shore are the victim(s)?
4. Can you describe the victim's appearance and clothes?
5. (Not obvious) Was this an accident involving a watercraft?
6. Is anyone else injured?
   - (Yes) How many?
     Yes ─────────────────────── ○

POST-DISPATCH INSTRUCTIONS a. Listen carefully, this could be a very dangerous situation. Do not go in the water (or out on the ice).

* Notify dive team in accordance with local procedures.
* Notify appropriate downstream agencies.
* (SCUBA) Determine availability of nearest local hyperbaric (recompression) chamber.
* Determine a specific meeting point for the emergency units.

| FLS | * Link to X-1 unless: | |
|---|---|---|
| Fallen through Ice | ──────────────── | Y-5 |
| Person in water | ──────────────── | Y-5 |
| Sinking Vehicle | ──────────────── | Y-3 |
| Flood Situation | ──────────────── | Y-6 |
| Possible Danger – Not Trapped | ──────── ▽ | X-4 |
| Stay on Line | ──────────────── | X-2 |
| Urgent Disconnect | ──────────────── | X-3 |

LEVELS # DETERMINANT DESCRIPTORS    CODES    RESPONSES    MODES

D
- 0  DELTA Zero (caller danger/incomplete information)   70-D-0
- 1  Vehicle in water                                     70-D-1
- 2  Ice rescue                                           70-D-2
- 3  Watercraft in distress                               70-D-3
- 4  SWIFT WATER rescue                                   70-D-4
- 5  STILL WATER rescue                                   70-D-5
- 6  SCUBA dive accident                                  70-D-6
- 7  Swimming pool                                        70-D-7

| SWIFT WATER | Recovery | Flood Situation Safety |
|---|---|---|
| Any body of water that is moving and has a visible current. | Situations where a victim has been submerged for an unsurvivable period of time and the goal is to recover the body. | • If outdoors, climb to high ground and stay there.<br>• Avoid walking through any flood-waters. If it is moving swiftly, even water 6 inches deep can sweep you off your feet.<br>• If you come to a flooded area in a car, turn around and go another way.<br>• If your car stalls, abandon it immediately and climb to higher ground. Deaths have resulted from attempts to move stalled vehicles. |
| STILL WATER | Rules | |
| Any body of water that lacks a visible current, usually lakes, ponds, reservoirs, etc. | 1. Most victims are recovered quickly, when the point last seen is immediately known.<br>2. A current list of rescue boat resources should be readily available at dispatch.<br>3. Notify relevant downstream agencies when search capability is required.<br>4. A submerged patient, regardless of time underwater (≤ 6 hours), is considered resuscitable by definition until proven otherwise, especially in a cold-water situation. | |
| SCUBA | | |
| A commonly used acronym for Self-Contained Underwater Breathing Apparatus, used here to define problems occurring while using this device underwater. | | Prolonged Submersion Case<br>In 1986, a 2½ year old girl was submerged in a cold-water river for over 63 minutes and survived without serious brain damage after an extensive resuscitation that included internal warming from a heart/lung bypass machine at a children's trauma center. No one knows how long a patient can be submerged and still survive. |
| Types of Water | Axioms | |
| • Lake<br>• Low-head dam<br>• Moving (Swift)<br>• River<br>• Swimming pool<br>• Water treatment facilities | 1. Diving problems are also a fire complaint if the victim is in the water whereas it is a medical complaint if the victim is out of the water.<br>2. Vehicles can become buoyant in 2 feet of water or less. | Water and Flood Statistics<br>• Nearly half of all flood-related deaths occur in vehicles.<br>• Water weighs about 62.4 pounds per cubic foot and typically flows downstream at 6 to 12 miles per hour.<br>• More than half of all low-water crossing vehicular-related deaths occur at night. |
| Rescue | First Law of Responders | |
| Situations where a victim is stranded, floundering, or has been submerged for a survivable period of time. The potential for saving the victim is real. | Don't take more victims to the scene.<br>Red Cross First Law of Water Rescue<br>Reach, throw, row, then go. | |

70  WATER RESCUE (SWIFT, STILL, ICE)

FIG. 5AP

METHOD AND SYSTEM FOR THE FIRE RESPONSE DISPATCH PROTOCOL OF AN EMERGENCY DISPATCH SYSTEM

CROSS REFERENCE TO RELATED APPLICATIONS

This application is based on U.S. Provisional Patent Application No. 60/325,152 filed on Sep. 25, 2001, at the filing date of this present patent application and priority is hereby claimed thereto.

BACKGROUND OF INVENTION

1. Field of the Invention

This invention relates to methods and systems of the emergency dispatch of fire response services. More specifically, this invention relates to methods and system for the dispatch of fire response services which has the capability of systematically gathering critical information during an emergency call and producing a determinate value for categorization of the emergency call, said categorization of the emergency call, said categorization being used in the subsequent dispatch of law enforcement services.

2. Description of Related Art

A variety of methods, systems and devices have been proposed for use in fire response services dispatch. Several systems and methods have been proposed for medical dispatch, which involve the calculation of a determinate value to be used in categorizing the criticality of an emergency medical call. Nevertheless, the inventors are unaware of a method and system, which is adapted specifically to the needs of fire response dispatch, which provides an appropriate determinate value for use in the dispatch of a fire, services response to an emergency call.

The reader is directed to the following U.S. patent documents for general background material. Each of which is hereby incorporated by reference in its entirety for the material contained therein.

U.S. Pat. No. 3,799,147 describes an apparatus and method for diagnosing myocardial infarction predicted on analysis of the acoustical frequency spectrum of the human heart during the isovolumic contraction phase of the cardiac cycle for the purpose of detecting a shift in the predominant frequency component of the spectrum from 30-50 cps frequency band.

U.S. Pat. No. 4,290,114 describes a computer-aided health care system for use by a paramedic. Findings taken from the patient by the paramedic are assigned numerical codes by use of preprinted forms.

U.S. Pat. No. 4,360,345 describes a computer controlled interactive instruction system for teaching an individual in a health education system.

U.S. Pat. No. 4,731,725 describes a data processing system for use in a total medical image diagnosis system.

U.S. Pat. No. 4,922,514 describes a method and system for the dispatch of resources to remote sites in response to alarm signals.

U.S. Pat. No. 4,926,495 describes a computer aided dispatch system for use in a trunked communication system.

U.S. Pat. No. 5,063,522 describes an artificial intelligent expert system that integrates multi-tasking capabilities to allow more than one user to interface with a rule or knowledge base at one time without the need for adding additional hardware for each instance of use, or the need to load multiple rule base information for each user.

U.S. Pat. No. 5,086,391 describes a medical alert system for domestic use wherein the system is comprised of two major components, a device worn about the neck and a home computer.

U.S. Pat. No. 5,109,399 describes a computer-based system for receiving emergency telephone calls which, upon receipt of the call, provides a voice connection to the operator as well as displaying a map showing the location of the calling party and other relevant textual information.

U.S. Pat. No. 5,228,449 describes a monitoring system uses infrared photoplethysmography to monitor the pulse of a person wearing a wrist unit and the wrist unit sends RF signals, which describe his, hear condition to a base unit.

U.S. Pat. No. 5,323,444 describes a community emergency response service system that is provided with three types of destinations to which emergency calls may be routed.

U.S. Pat. No. 5,339,351 describes a 911 emergency response system that includes a location identification module, preferably in solid-state circuit form.

U.S. Pat. No. 5,348,008 describes a cardiorespiratory alert system, which comprises a patient unit, which communicates with a caregiver unit.

U.S. Pat. No. 5,379,337 describes an emergency call routing system that includes a platform having a call router and a processor for identifying destinations to which such router directs emergency calls.

U.S. Pat. No. 5,404,292 describes a data processing system and method for automatically performing prioritized nursing diagnoses from patient assessment data that stores a diagnosis table.

U.S. Pat. No. 5,438,996 describes an ambulatory, ultrasonic transit time, real-time, cervical effacement and dilation monitor with disposable probes, preferably transducers in the substantial shapes of a three-dimensional body.

U.S. Pat. No. 5,462,051 describes a medical communication system that includes a sensor and a first device disposed on a side of the living body, receiving the physical information signal from the sensor.

U.S. Pat. No. 5,471,382 describes a medical network management system and process wherein health plan beneficiaries access a team of health care professionals over the telephone to help them assess their health needs and select appropriate care.

U.S. Pat. No. 5,502,726 describes a network of telemetry system, which allows virtual services at the application or presentation layer to communicate with other virtual services without regard to the physical interconnections.

U.S. Pat. No. 5,513,993 describes an educational training device in disclosed, which includes a replica of a telephone including a telephone headset having an operational speaker and a telephone keypad having a plurality of numeric key buttons.

U.S. Pat. No. 5,516,702 describes a screening method for identifying women at increased risk for imminent delivery, by providing an early, biochemical indication of increased risk of impeding preterm delivery.

U.S. Pat. No. 5,521,812 describes devices and methods for providing emergency information.

U.S. Pat. No. 5,544,649 describes an ambulatory patient health monitoring system is disclosed wherein the patient is monitored by a health care worker at a central station, while the patient is at a remote location.

U.S. Pat. No. 5,554,031 describes a method of training a child for reporting an emergency on a telephone system of the type having an emergency access code.

U.S. Pat. No. 5,590,269 describes a resource assignment system provides mixed-initiative updates of a user interface display in response to asynchronous events independently triggered updates.

U.S. Pat. Nos. 5,594,638 and 5,660,176 describe a system and method for providing computerized, knowledge-based medical diagnostic and treatment advice.

U.S. Pat. No. 5,675,372 describes a communication system, which can be utilized to complement an existing cable television system in which a central office transmits signals along a coaxial cable to a user unit through a tap.

U.S. Pat. No. 5,722,418 describes a method for mediating social and behavioral influence processes through an interactive telecommunications guidance system for use in medicine and business that utilizes an expert, such as a physician, counselor, manager, supervisor, trainer, or peer in association with a computer.

U.S. Pat. No. 5,724,983 describes a method for continuously monitoring the medical condition of a patient, the method including the steps of continuously monitoring one or more clinical features of the patient; periodically computing a probability of a medical outcome or diagnosis based upon the continuously monitored one or more clinical features.

U.S. Pat. No. 5,745,532 describes a system and method for wireless transmission of information, which is subject to fading by using a RF carrier modulated with a subcarrier modulated with the information.

U.S. Pat. No. 5,759,044 describes a system for generating and processing synthetic and absolute real time remote environments for interaction with a user and her biological senses.

U.S. Pat. No. 5,761,278 describes a system for integrated data delivery in a 9-1-1 calls for service application.

U.S. Pat. No. 5,761,493 describes an object-oriented query language apparatus and method that provides data abstraction, seamlessness with respect to the host programming language, set support orthogonal to persistence and strong typing.

U.S. Pat. No. 5,805,670 describes a private notification system designed to communicate 9-1-1 information to preselected recipients, such as family and friends, identified by a subscriber to the system.

U.S. Pat. No. 5,809,493 describes a knowledge processing system that includes a memory for storing knowledge in a plurality of knowledge modules in a knowledge bank.

U.S. Pat. No. 5,826,077 describes an object-oriented query language apparatus and method that provides data abstraction, seamlessness with respect to the host programming language.

U.S. Pat. No. 5,832,187 describes a system and method for automatically detecting fires in select areas, and reacting thereto to put out the fires.

U.S. Pat. No. 5,844,817 describes a decision support system, including a decision model that provides an indication, either of itself or in combination with a weighted average of the scores assigned to the decision model factors.

U.S. Pat. No. 5,857,966 describes a method and system for receiving, processing and responding to emergency medical calls for patients who have fainted or are unconscious.

U.S. Pat. Nos. 5,901,214 and 6,058,179 describe a one number, multi-application, intelligent call processing system that provides services benefits to a caller, a servicing location and/or a vanity number advertiser during a call, parallel to the call and/or post call in an integrated common architecture.

U.S. Pat. Nos. 5,910,987 and 5,915,019 describe systems and methods for secure transaction management and electronic rights protection.

U.S. Pat. No. 5,926,526 describes an automated patient information retrieval system for notifying patients of medical information.

U.S. Pat. No. 5,964,700 describes a medical network management system, health plan beneficiaries access a team of health care professionals over the telephone to help them assess their health needs and select appropriate care.

U.S. Pat. No. 5,989,187 describes a method and system for providing emergency medical counseling to childbirth patients remotely.

U.S. Pat. No. 5,991,751 describes a system, method, and computer product for processing patent-centric and group-oriented data.

U.S. Pat. No. 6,004,266 describes a method and system for receiving, processing and responding to emergency medical calls for patients with heart problems.

U.S. Pat. No. 6,010,451 describes a method and system for providing emergency medical counseling to choking patients remotely.

U.S. Pat. No. 6,035,187 describes an emergency call box that has a cellular transceiver, a controller for controlling the cellular transceiver, and a memory for storing preprogrammed telephone numbers.

U.S. Pat. No. 6,052,574 describes a system for auxiliary monitoring of emergency access calls functions to identify the geographical location of the origination point of the emergency access call and interconnects the appropriate emergency response agency that serves this geographic location to the emergency access call.

U.S. Pat. No. 6,053,864 describes a method and system for providing emergency medical counseling to arrest patients remotely.

U.S. Pat. No. 6,074,345 describes a method and apparatus for connecting to and coordinating data communications of various medical devices having different communication protocols.

U.S. Pat. No. 6,076,065 describes a method and system for receiving, processing and responding to emergency medical calls for patients with pregnancy related medical problems.

U.S. Pat. No. 6,078,894 describes a method and system for evaluating the performance of emergency medical dispatchers in adhering to a provided systematic procedure or protocol for handling emergency medical calls.

U.S. Pat. No. 6,106,459 describes a method and system for receiving, processing and responding to emergency medical calls by emergency dispatchers.

U.S. Pat. No. 6,115,646 describes a dynamic and generic object-oriented process automation engine that provides workflow management services in a heterogeneous distributed computing environment.

U.S. Pat. No. 6,117,073 describes an integrated medical database system for the emergency medical transportation business.

U.S. Pat. No. 6,118,866 describes an emergency call load handling system in a call network that has an interactive voice response (IVR) unit associated with a switching apparatus to which calls may be diverted in special conditions, such as during emergencies or disasters when calls to certain destinations may suddenly increase dramatically.

U.S. Pat. No. 6,134,105 describes a portable command center.

SUMMARY OF INVENTION

It is desirable to provide a system and method for managing the process of fire response so as to efficiently deploy fire response services in a manner appropriate to the emergency call. It is particularly desirable to provide a system and method for managing the emergency fire call response that provides a systematic process for gathering critical information, calculating a determinate value which provides a quantitative indication of the criticality of the emergency, and communicating essential and helpful information to the dispatched fire response teams and to individuals on the site of the emergency.

In a typical use of this invention in a fire emergency response situation a caller uses a telephone or radio device to call an emergency response call center. Generally, the call center either has dispatch personnel ("dispatchers") or is capable of transferring the incoming call to a dispatcher. Once the dispatcher, using the system of this invention, receives the call he or she acts as a voice to the automated system of this invention, wherein the dispatcher asks for specific information, inputs the responses from the caller into the system. Included in the specific information requested is whether or not anyone is trapped or unable to get to safety. A description of the problem leads to a specific set of inquiries. The result of the inquiries is used to define a determinate, which indicates the degree of criticality of the call. The dispatcher then communicates with fire response services, indicating the type of response required according to the type of call and the determinate value. Post dispatch instructions and guidance are provides as appropriate. Throughout the process of this invention the dispatcher is directed to ask specific questions, in a specific order, gather specific information and dispatch fire response services based on a specific quantified determinate value. This invention removes the variability of dispatcher inquiries and responses, which have previously led to inefficient and often dangerous fire response services. By providing a preprogrammed set of inquiries and responses for dispatchers and by calculating a determinate value, which specifies the appropriate response, this invention provides an important improvement in the management of emergency dispatch services; specifically the dispatch of services associated with a fire related emergency call.

Accordingly, it is an object of this invention to provide a method and system for managing the dispatch of emergency fire response services.

Another object of this invention is to provide a method and system for managing the dispatch of emergency fire response services wherein inquiries are made in a manner such as to avoid variability in the dispatcher process.

A further object of this invention is to provide a method and system for managing the dispatch of emergency fire response services wherein a determinate value is defined appropriate based on specific responses from the emergency caller.

A still further object of this invention is to provide a method and system for managing the dispatch of emergency fire response services wherein a communication to fire response services is dependent on a determinate value.

It is another object of this invention to provide a method and system for managing the dispatch of emergency fire response services that provides medically competent consistent post-dispatch instructions to fire emergency callers.

A further object of this invention is to provide a method and system for managing the dispatch of emergency fire response services that is adapted specifically to the requirements of emergency fire calls and responses.

Additional objects, advantages, and other novel features of this invention will be set forth in part in the description that follows and in part will become apparent to those skilled in the art upon examination of the following description, drawings and claims or may be learned with the practice of the invention. The objects and advantages of this invention may be realized and attained by means of the instrumentalities and combinations particularly pointed out in the appended claims. Still other objects of the present invention will be become readily apparent to those skilled in the art from the following description wherein there is shown and described the preferred embodiment of this invention, simply by way of illustration of the modes best suited to carry out this invention. As it will be realized, this invention is capable of other different embodiments, and its several details, and specific steps, are capable of modification in various aspects without departing from the invention. Accordingly, the drawings and descriptions should be regarded as illustrative in nature and not as restrictive.

To achieve the foregoing and other objectives, and in accordance with the purposes of the present invention, two separate and independent embodiments of this invention are presented. The first and presently preferred embodiment of this invention is a computerized process, while an alternative preferred embodiment of this invention is a cross-referenced card deck.

BRIEF DESCRIPTION OF DRAWINGS

The accompanying drawings incorporated in and forming a part of the specification, illustrate a preferred embodiment of the present invention. Some, although not all, alternative embodiments are described in the following description. In the drawings.

Figure 1:
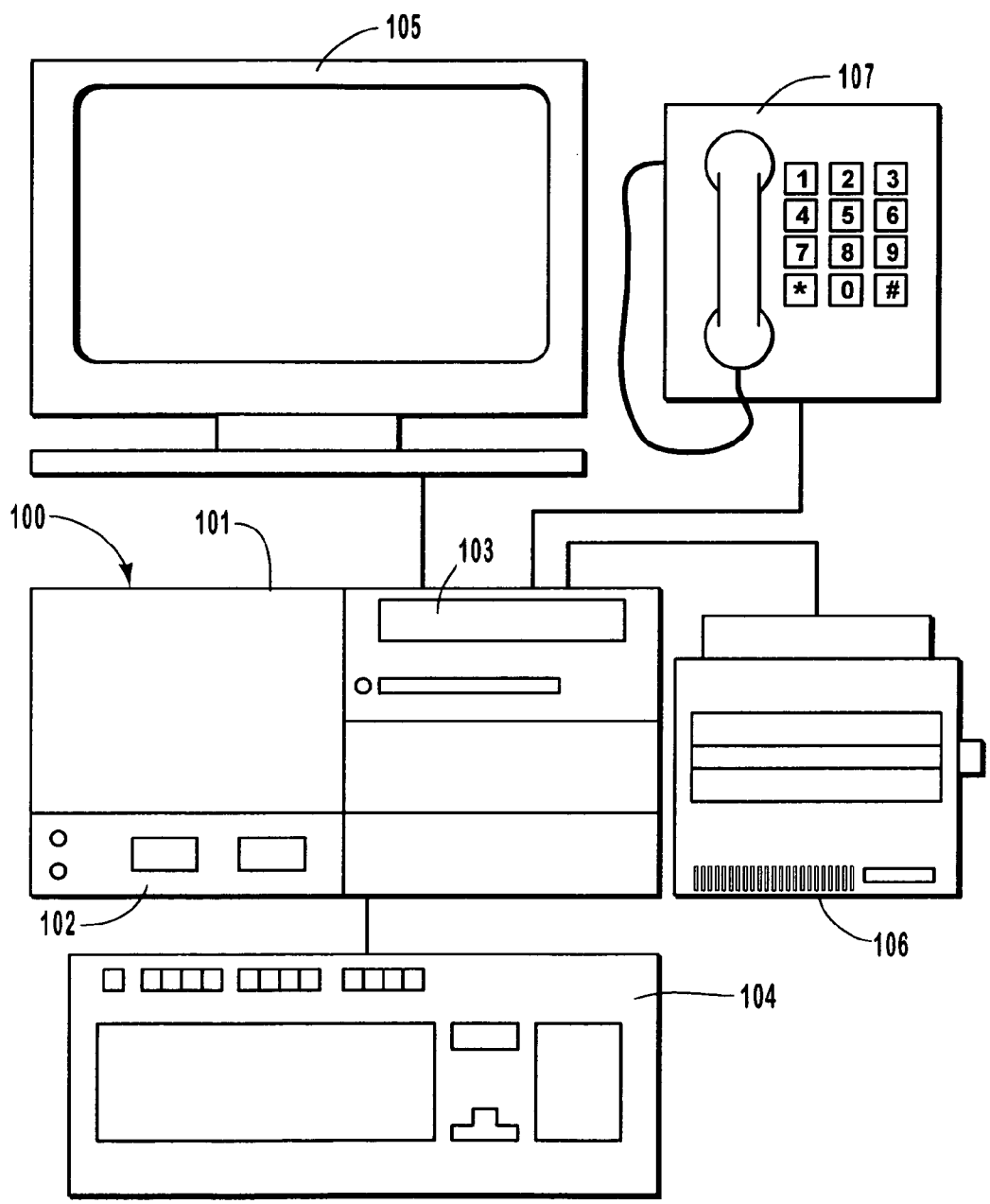
FIG. 1 is a top-level system block diagram of the computerized embodiment of this invention.

Reference will now be made in detail to the present preferred embodiment of the invention, examples of which are illustrated in the accompanying drawings.

DETAILED DESCRIPTION

This invention provides a method, system and apparatus for receiving, processing and communicating fire response calls from emergency callers and to fire fighter response units. This invention enables the assessment of critical or "key" information by trained emergency dispatch personnel. When the invention is properly employed the initial interrogation of the caller will provide critical information, such as the address of the emergency, the phone number called from, the caller's name, incident information, whether the caller is safe and out of danger, what the caller saw or heard, how many people are involved, where and when the incident occurred. This information is immediately put to use in calculating a determinate value, which identifies the criticality of the emergency. The process of this invention provides a consistent, tested method of gathering information, and determining the criticality of the emergency call, in order to maximize the efficiency of dispatched fire fighter units, while minimizing unnecessary high speed maximum response calls. This invention also provides consistent pre-arrival instructions to be given to the caller during or after telephone interrogation. The determinate value is calculated based on the criticality of the call that is the type and duration of the incident, the number people in danger, and other similar information. In the present preferred embodiment of the invention, the determinate value is a combination of a determinate level (Alpha A, Bravo B, Charlie C, Delta D, Echo E and Omega Ω) and a numeric value. Generally, A2 is the least serious while E1 is the most serious call. Depending on the determinate level, the appropriate emergency response is dispatched as indicated by the response protocol. For example, an Alpha-A call will typically be responded to by a next available fire fighter response unit using the safest arrival method reasonably possible. While a Delta-D call will typically be responded to by any or all-available fire response units proceeding under the most urgent method possible. Echo-E calls typically involve likely immediate life threatening situations and will be responded to in the most urgent manner available. Bravo-B and Charlie-C calls are intermediate calls that are typically responded to in business-like orderly manner according to specific department protocol. An Omega-Ω call is generally common assistance response or is not specifically responded to, rather is referred to another person or agency. Typically, after the response fire fighter units have been sent, the dispatcher remains on the telephone with the caller to give pre-arrival instructions. For the purposes of this disclosure, the Echo-E is generally abbreviated as E; Delta-D is generally abbreviated as D; Charlie-C is generally abbreviated as C; Bravo-B is generally abbreviated as B; Alpha-A is generally abbreviated as A; and Omega-Ω is generally abbreviated as Ω. The Generally, the lower numbers within a determinate classification are more urgent than higher numbers. For example, an emergency dispatch call with a determinate value of D1 is generally more critical requiring a more urgent response than a call with a determinate value of D2. However, in some instances, the numeric values within a determinate code serve only to identify the type, rather than criticality of the call. Also, if more than one determinate code can be assigned to a particular call, the more critical or higher determinate code is assigned. That is, the call is assigned a criticality determinate code based on the fact that would lead to the most urgent response. For example, if the call concerns an electrical hazard that has a confirmed entrapment, an electrical hazard near water, the smell of smoke and an outside transformer, then the determinate value assigned would be E1 (due to the confirmed entrapment) rather than C1 (electrical hazard near water) or B4 (smell of smoke) or A1 (an outside transformer).

FIG. 1 shows a top level system block diagram of the preferred computer system 100, which typically is programmed with specially designed computer software incorporating the process of this invention and which essentially converts the computer system hardware 100 into the special purpose machine used in the computerized embodiment of this invention. A processing unit 101 is provided to execute the steps of the software embodiment of the process of this invention and to thereby generate the prompts for information in the preferred order, receive the corresponding information, set the appropriate determinate value based on the received information, display the appropriate dispatch response and the corresponding pre-arrival instructions. The present preferred processing unit 101 is a standard Intel or Intel compatible microprocessor with the standard interface and control circuitry as is typically provided in a standard, moderately high performance desktop computer. A power supply 102, which typically and preferably includes surge protection and an uninterruptible power source, provides required electrical power to operate the computer system 100. Generally, the power supply 102 receives its electrical power connection from a standard AC wall outlet. A storage device 103 is provided in electronic communication with the processing unit 101 to store the program and data, as well as the computer operating system and utilities. The typical presently preferred storage device includes one or more of the following: one or more computer hard disk drive units; one or more removable disk units; a tape drive unit; an optical drive unit; and semiconductor memory. An input device 104, in communication with the processing unit 101 is provided to permit the user to input information and/or to respond to queries from the software embodiment of the process of this invention. Typically input devices 104 include a keyboard, mouse, trackball, touch sensitive pad and/or voice recognition equipment. An output device 106 in communication with the processing unit 101 may also be used to provide hard copy (paper) records and reports. A display unit 105 in communication with the processing unit 101 is provided to give the user instruction, queries and to prompt for information. A telephone device 107, which may be in communication with the processing unit 101 to track phone calls and to look up addresses from caller ID information, provides a communication channel between the emergency caller and the dispatcher. For the purposes of this disclosure, a telephone device or telephone equipment shall be defined to be an electronic communication device capable of transmitting information between two or more locations and employing wired and/or wireless communication channels and includes but is not limited to standard wired telephones, radios and computer devices. Optionally, it is envisioned that this invention will operate on a computers 100 which are networked together and using a telephone device 107 that is part of a telephone switchboard system.

Figure 2:
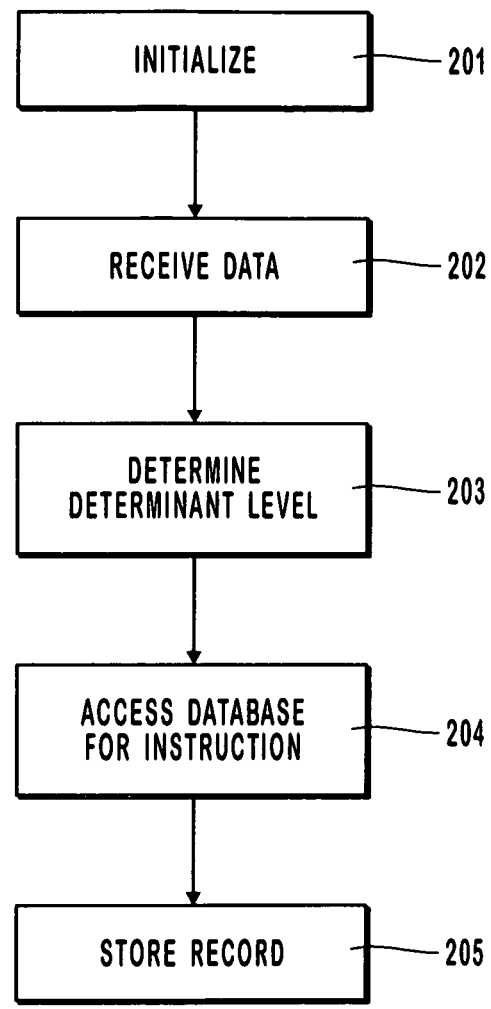
FIG. 2 is a top-level flow chart of the preferred embodiment of this invention.

FIG. 2 shows a top-level flow chart of the preferred embodiment of this invention. The process is first initialized 201. This initialization step includes starting up the software program embodiment of the process of this invention, collecting information regarding the current deployment of fire fighter units and other dispatcher relevant information. A call is received 202 using telephone equipment 107 from a caller requesting emergency fire fighter assistance or providing information to the dispatcher. This data is entered into the computer system 101 for use by the computer software process of this invention. The process then assigns the appropriate determinate level 203 for use in assessing the criticality of the emergency fire fighter dispatch call. A database is accessed 204 for instruction information, which the dispatcher uses to provide information to the caller. The record of the call is stored 205 to the computer storage device 103, and may then be used to produce reports and to provide quality review of dispatchers and the dispatch process.

Figure 3A:
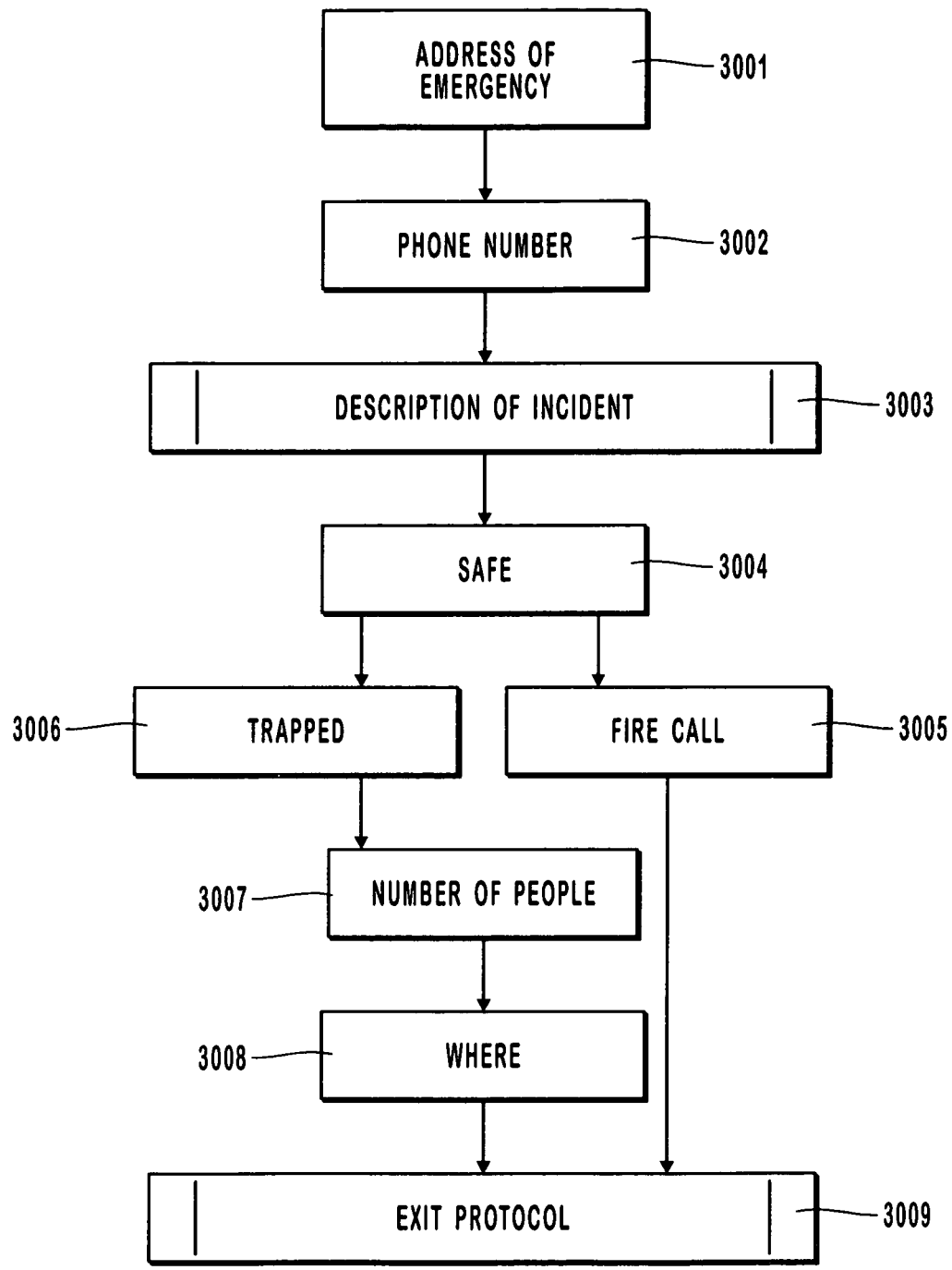
FIGS. 3a to 3x are detailed flow charts of the detailed preferred steps of this invention.

FIGS. 3a to 3z show detailed flow charts of the detailed preferred steps of this invention.

FIG. 3a shows the entry protocol of the preferred embodiment of the invention. The address of the emergency is collected 3001. Generally, the address information is collected via an inquiry of the caller received on telephone equipment 107, although alternatively a caller identification phone number reverse address look-up database may be used. The call may also be initiated by an automatic alarm system ("silent call"). In the case of a "silent call" the dispatcher is instructed to follow the department's policy regarding activating an appropriate response. The phone number that the caller is calling from is ascertained 3002. Typically, the phone number is acquired by inquiry of the caller. Although, alternatively a caller identification system which provides the phone number can also be used. An inquiry is made to get a description of the incident 3003. Certain incidents are identified as being especially critical, including alarms, assist other agencies, bomb found, bomb threat and life threat. When these incidents are identified, the process is diverted to the appropriate protocol as soon as required Case Entry information has been collected. If there is a life threat, typically from an entrapment scenario, the Echo-E determinate level is set. The Echo level provides early recognition and response initiation when life is jeopardized by entrapment. Otherwise, the remaining information, steps 3004, 3005, 3006, 3007, 3008, 3009 of this protocol is collected, after which the appropriate detailed protocol is executed. Whether the caller and everyone else is safe and out of danger is determined 3004. If the caller is not safe and out of danger, the process is diverted to Critical Caller Instructions. The caller is then asked if anyone is trapped 3006 or unable to get to safety. If the response to this call is Yes, then the number of people trapped is determined 3007, where they are located is determined 3008 and the exit protocol is entered 3009. If the response to safety 3004 is Yes, then the call is considered a Fire Call 3005. These entry inquiries and responses provide the information, which leads the process into the more detailed protocols of the preferred embodiment of this invention. Moreover, this Entry Protocol also provides guidance to the Dispatcher, including the following: Regarding repetitive persistence use, when using repetitive persistence to calm a caller, always provide a reason for the instruction (i.e., I need you to tell me the exact location of your son so that the police officers can locate him quickly). Regarding Deluca's Law EFDs (Emergency Fire Dispatchers) will follow all protocols per se, avoiding freelance questioning or information unless it enhances, not replaces, the written protocol questions and scripts. Regarding dispatcher rules: (1) Always verify the incident address and the caller's phone number regardless of ANI/ALI information. (2) In Mutual Aid situations, go immediately to Protocol 63 after determining the address and callback numbers. (3) If something seems like it poses a threat, relay it to responders. (4) If at any time the caller expresses that they may be in danger, advise them to get to safety immediately (if safe to do so) and call back. (5) Case Entry questioning must always be completed, even when an Echo determinant has been selected. (6) Fire Complaint key questioning must always be completed to cover scene safety issues, even when an Echo determinant has been selected. (7) Smoke inside a structure should be coded as a structure fire on Protocol 67. And, (8) all questions must be asked unless the answer is obvious or spontaneously provided by the caller. Regarding axioms: (1) When an incident involves both fire and hazardous materials, the incident is first a fire incident. Once the fire is out, it then becomes a Hazmat incident. (2) An incident involving a victim needing rescue and emergency medical treatment is a fire incident until the victim has been rescued. If the victim needs only medical treatment, this is an EMS incident. (3) If you know that traffic will cause delays for responders, provide an alternative route. (4) Sometimes changes in incident information will come into the communication center that responders don't automatically hear over the radio. Relay these changes to responders as quickly as possible.

Figure 3B:

FIG. 3b shows the detail of the various types of incident descriptions. Each of these incident types is associated with a specific incident protocol and, depending on the type of incident, may lead to a direct diversion of the process to that particular protocol or may be diverted to the specific protocol only after collecting the remaining information 3004, 3005, 3006, 3007, 3008 of the Entry Protocol. The present preferred embodiment of this invention includes specific protocols to address the following incident types: Aircraft Emergencies (see FIG. 3c); Alarms (see FIG. 3d); Assist/Service Calls (see FIG. 3e); Confined Space/Structure Collapse (see FIG. 3f); Electrical Hazard (see FIG. 3g); Elevator/Escalator Rescue (see FIG. 3h); Explosions (see FIG. 3i); Extraction/Entrapped (Machinery, Agricultural, Industrial) (see FIG. 3j); Gas Leaks (see FIG. 3k); Hazmat/Fuel Spill (see FIG. 3l); High Angle Rescue (see FIG. 3m); Marine Fires (see FIG. 3n); Mutual Aid (see FIG. 3o); Odors (Strange/Unknown) (see FIG. 3p); Outside Fire (see FIG. 3q); Smoke Investigation (see FIG. 3r); Structure Fire (Commercial/Residential) (see FIG. 3s); Train/Subway/Commuter Rail Incidents (see FIG. 3t); Vehicle Fire (see FIG. 3u); and Water Rescue (see FIG. 3v).

Figure 3C:
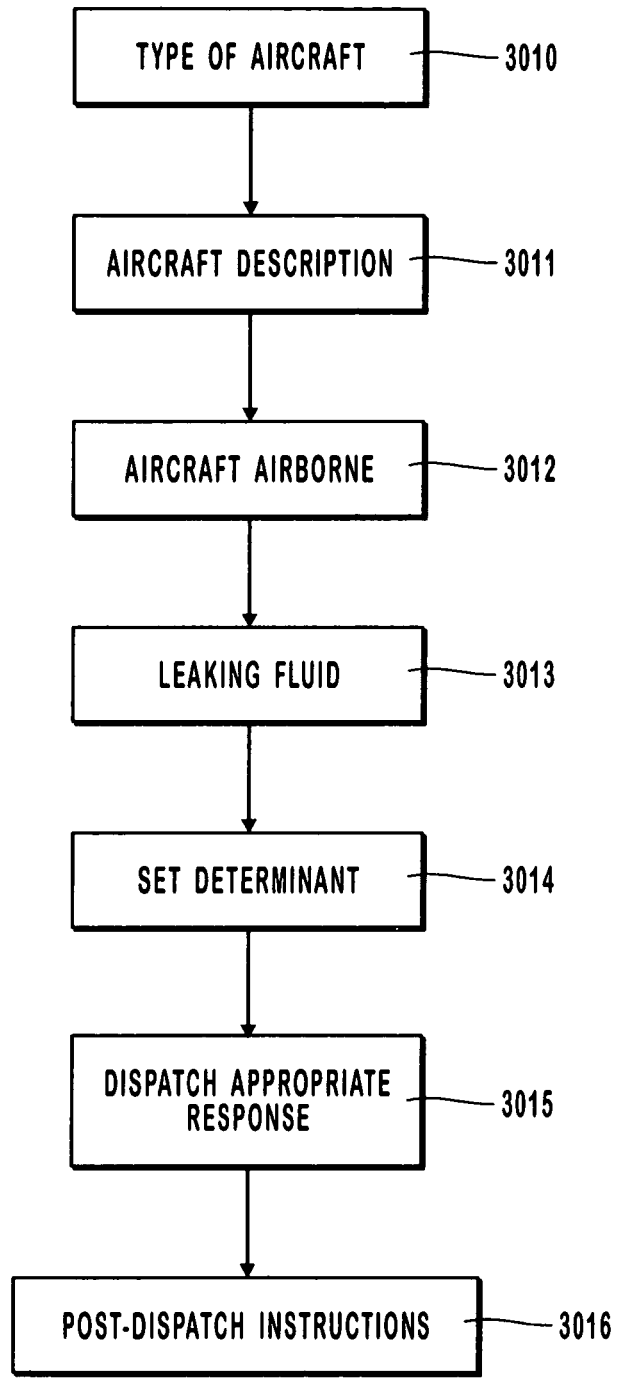

FIG. 3c shows the present steps of the Aircraft Emergencies Protocol. In this protocol a large aircraft is defined as an aircraft with a maximum gross takeoff weight of 41,000 to 255,000 lbs, while the definition of a small aircraft is an aircraft with a maximum gross takeoff weight of 41,000 lbs or less. In the present embodiment of this invention, each of the inquiries is made and the information is received via the telephone equipment 107. An inquiry 3010 is made to determine what type of aircraft it is. An aircraft description is requested 3011. Whether the aircraft is airborne or on the ground is determined 3012. A further inquiry 3013 is made to determine if the aircraft is leaking fluid. The determinate value is set 3014 as follows. If the caller indicates danger and information is incomplete, the determinate value is set to D0. If the call concerns a confirmed large aircraft crash involving structure, the determinate value is set to D1. If the call concerns a confirmed small aircraft crash involving structure, the determinate value is set to D2. If the call concerns a confirmed large aircraft crash, the determinate value is set to D3. If the call concerns a confirmed small aircraft crash, the determinate value is set to D4. If the call concerns a large aircraft fire, the determinate value is set to D5. If the call concerns a small aircraft fire, the determinate value is set to D6. If the call concerns a military aircraft crash or fire, the determinate value is set to D7. If the call concerns a large aircraft incoming in trouble, the determinate value is set to C1. If the call concerns a small aircraft incoming in trouble, the determinate value is set to C2. If the call concerns an aircraft leaking fluid on the ground, the determinate value is set to C3. If the call concerns an airborne aircraft in trouble the determinate value is set to $\Omega 1$. Once the determinate value is set 3014, the appropriate fire fighter response is dispatched 3015 and post-dispatch instructions 3016 are provided. This appropriate firefighter response 3015 is based on the assigned determinate value. The present preferred post-dispatch instructions 3016 of this protocol are: (a) for a fire, do not try to extinguish the fire yourself; and (b) this is a potential crime scene, do not pick up any debris. This protocol also provides the following rules: (1) Aircraft crashes should also be considered HAZMAT incidents until proven otherwise; (2) Report all aircraft emergencies to the FAA; (3) All military aircraft are assumed to be carrying explosive ordnance until proven otherwise; (4) Get as much of a description of the plane as possible to help FAA officials identify the plane and its intended route; and (5) Many victims survive the crash itself, but die of smoke inhalation inside the cabin. The axioms of the present aircraft emergencies protocol are: (1) most accidents occur during the takeoff, climb, descent, and landing phase of flight; and (2) reports from the public will usually be 51-$\Omega$-1 unless the aircraft has crashed or the eyewitness can identify a general location where the aircraft will try to land or crash, unless a touchdown locations is specified, the incident is referred to the FAA.

Figure 3D:
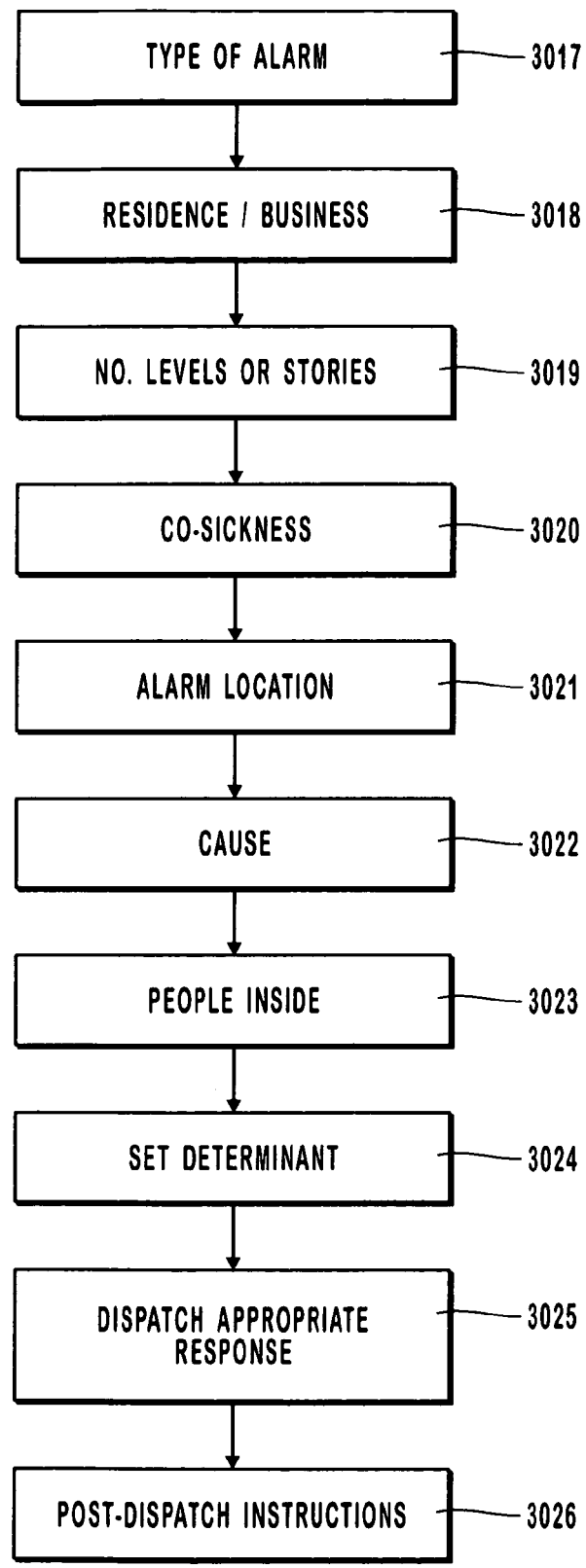

FIG. 3d shows the present steps of the Alarms Protocol. In this protocol a high rise is a building that is too tall for adequate fire control from ground-based aerial ladders or elevating platforms or towers, a high life hazard location is any location that poses multiple life threats due to difficulty exiting or lack of mobility of the inhabitants, and high occupancy is the general term for a building that can or does contain a large amount of people. In the present preferred embodiment of this invention information is requested and information is received via the telephone equipment 107. An inquiry 3017 is made to determine what type of alarm it is. Whether the location is a residence or a business is determined 3018. The number of stories or levels is determined 3019. An inquiry 3020 is made to learn if anyone is sick. The exact location of the alarm is identified 3021. An inquiry 3022 is made to learn of the caller knows the cause of the alarm. The number of people inside the building 3023 is determined. The determinate value is set 3024 as follows. If the caller indicates a high life hazard, the determinate value is set to C1. If the call concerns a high rise, the determinate value is set to C2. If the call concerns a high occupancy building, the determinate value is set to C3. If the call concerns a waterflow, the determinate value is set to C4. If the call concerns a commercial fire alarm, the determinate value is set to C5. If the call concerns carbon monoxide with a sick patient in a business structure, the determinate value is set to C6. If the call concerns carbon monoxide with a sick patient in a residential structure, the determinate value is set to C7. If the call concerns a single dwelling—residential, the determinate value is set to B1. If the call concerns a pull box/pull station, the determinate value is set to B2. If the call concerns an unknown cause, the determinate value is set to B3. If the call concerns carbon monoxide with no patient, the determinate value is set to A1. Once the determinate value is set 3024, the appropriate fire fighter response is dispatched 3025 and post-dispatch instructions 3026 are provided. This appropriate firefighter response 3025 is based on the assigned determinate value. The present preferred post-dispatch instructions 3026 of this protocol are: (a) do not reset or silence the alarm; (b) if it's safe to do so, leave the building and close the doors behind you and wait for the responders; (c) for carbon monoxide, make sure no one re-enters the area; and (d) for an alarm company, try to contact a responsible party, and call back with an ETA. The axioms of the present alarm emergencies protocol are: (1) carbon monoxide poisoning can be difficult to diagnose; (2) failure to evacuate immediately may result in prolonged exposure and worsening effects from the CO gas; (3) if a house is equipped with smoke detectors, the chances of someone dying are cut nearly in half; and (4) pull boxes are located on buildings or streets that send signals in the form of flashes and/or bells directly to communication centers when activated.

Figure 3E:
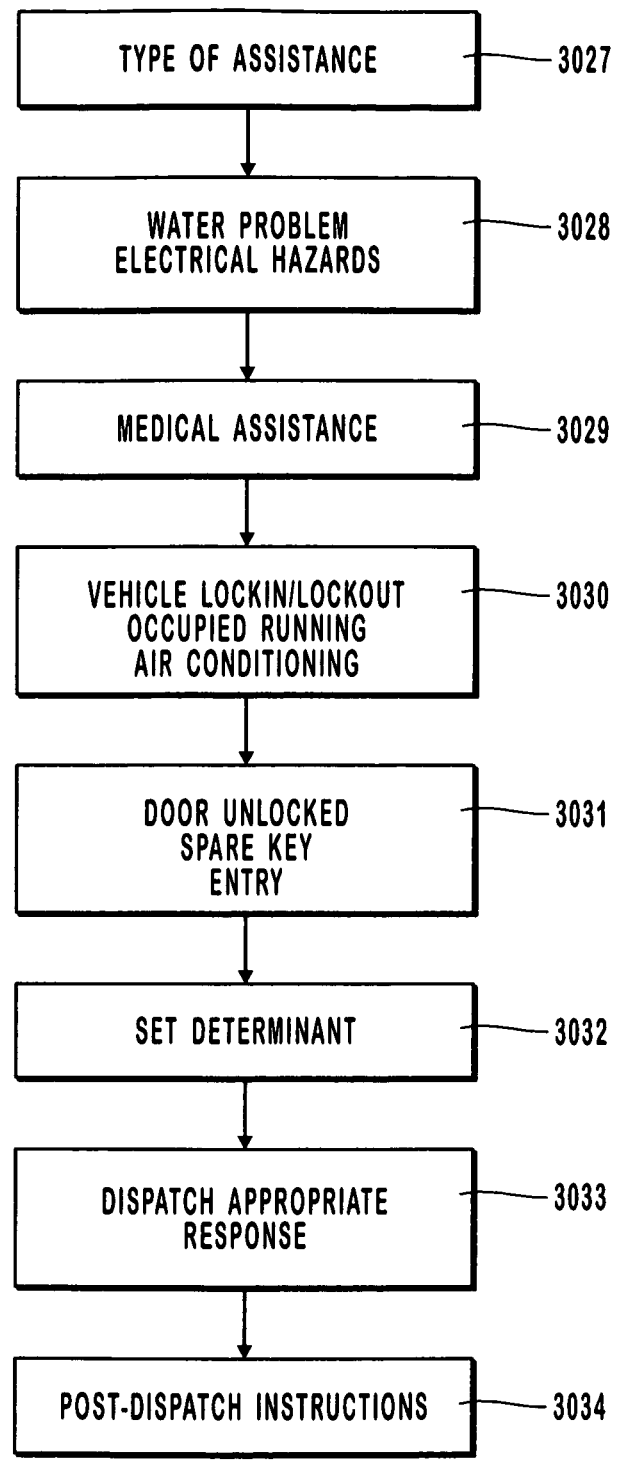

FIG. 3*e* shows the present steps of the Assist/Service Calls Protocol. In this protocol a citizen assist is providing a service to the citizens in circumstances that may not be an emergency. An outside agency is defined to be any agency other than the actual company where a person is employed. In the present embodiment of this invention, each of the inquiries is made and the information is received via the telephone equipment 107. An inquiry 3027 is made to learn what type of assistance is needed. If it is a water problem, an inquiry 3028 is made to determine if any electrical hazards are present. Whether anyone appears to need medical assistance is determined 3029. If the call relates to vehicle lockin/lockout, an inquiry 3030 is made to determine if the vehicle is occupied. If appropriate, whether the door is locked is determined 3031. The determinate value is set 3032 as follows. If the caller indicates entrapment of a person, the determinate value is set to E1. If the call concerns a water problem with an electrical hazard, the determinate value is set to C1. If the call concerns someone locked in a vehicle, the determinate value is set to B1. If the call concerns someone locked in a building who may require medical assistance, the determinate value is set to B2. If the call concerns a citizen assist, the determinate value is set to A1. If the call concerns a person locked in or out of a dwelling, the determinate value is set to A2. If the call concerns an animal rescue, the determinate value is set to A3. If the call concerns a water problem, the determinate value is set to A4. If the call concerns assisting an outside agency, the determinate value is set to A5. If the call concerns a person being locked out of an unoccupied vehicle, the determinate value is set to Ω1. Once the determinate value is set 3032, the appropriate fire fighter response is dispatched 3033 and post-dispatch instructions 3034 are provided. This appropriate firefighter response 3033 is based on the assigned determinate value. The present preferred post-dispatch instructions 3034 of this protocol are: (a) for a water problem with an electrical hazard, beware of electrical risks and electrified water; (b) for a water problem, if it's safe to do so, turn off the water and/or electrical power; and (c) if appropriate, if it's safe to do so, remove the child from the vehicle. This protocol also provides the following rules: (1) Any person locked in a trunk, especially a child, should be considered a high-level entrapment emergency; and (2) Advise caller to beware of electrical risks and electrified water. The axioms of the present assist/service calls emergencies protocol are: (1) entrapments in car trunks can be especially hazardous; (2) skin that touches a car seat surface over 150° F. can be severely burned in 1 second; and (3) carbon monoxide buildup for a victim entrapped in the trunk may reach toxic levels.

Figure 3F:
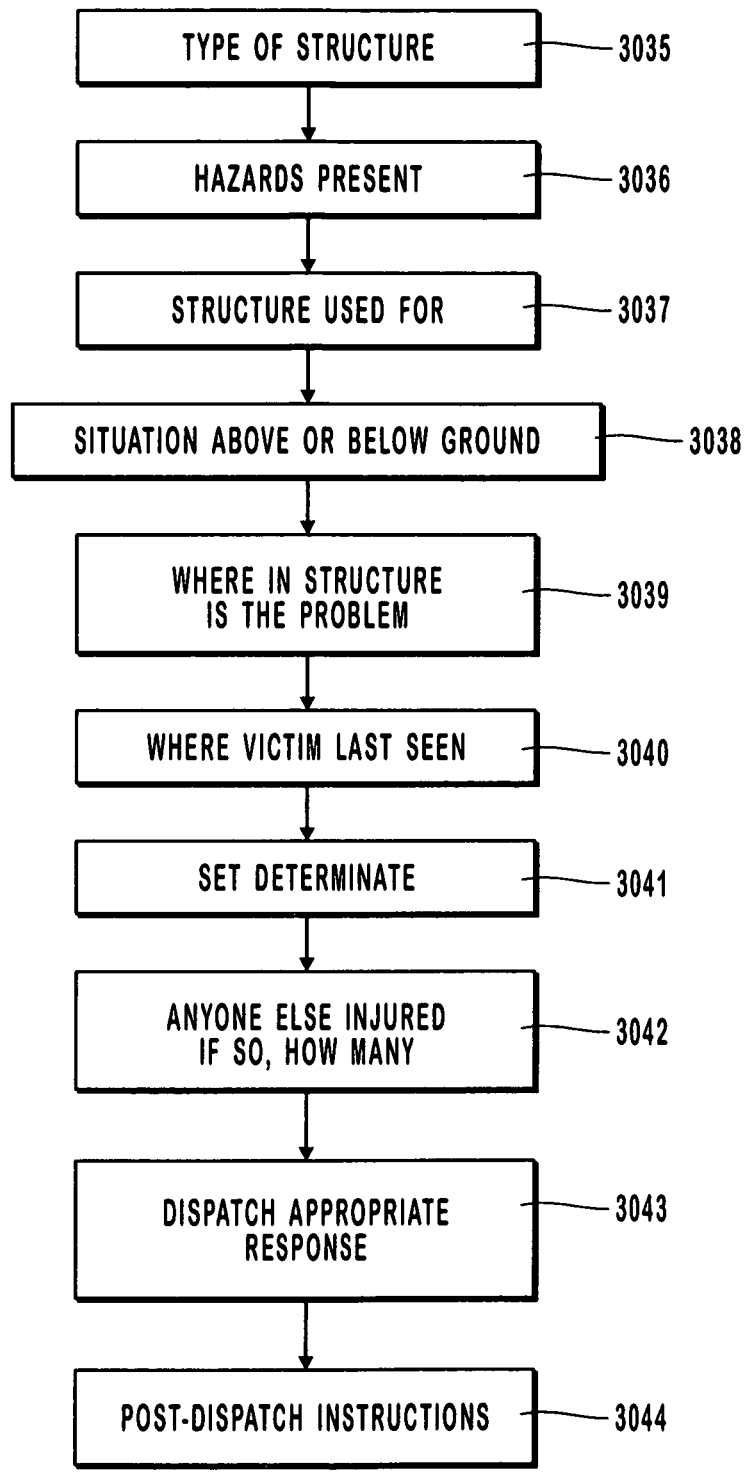

FIG. 3*f* shows the present steps of the Confined Space/Structure Collapse Emergencies Protocol. In this protocol a confined space is any enclosed space in the workplace that has three specific features: (1) must have the size and shape to allow a person to bodily enter; (2) must have restricted openings that make it difficult to enter or leave; and (3) must be a space not designed for continuous human occupancy. An avalanche is a mass of snow sliding down a mountainside. A mudslide is a moving river of rock, soil and water often triggered by storms, volcanic activity, earthquakes, fires and mismanagement of land. In the present embodiment of this invention, each of the inquiries is made and the information is received via the telephone equipment 107. An inquiry 3035 is made to determine what type of structure is involved. A further inquiry 3036 is made to learn if there are any hazards present. If appropriate, what the structure is used for is determined 3037. If not obvious, whether the situation is above or below the ground level is determined 3038. The location of the problem is identified 3039. The location where the victim was last seen is determined 3040. Whether anyone else was injured is determined 3042 and, if so, the number of injured persons. The determinate value is set 3041 as follows. If the caller indicates a confirmed entrapment of a person, the determinate value is set to E1. If the call concerns a trench collapse, the determinate value is set to E2. If the call concerns a caller in danger with incomplete information, the determinate value is set to D0. If the call concerns a confirmed entrapment with hazards, the determinate value is set to D1. If the call concerns an unconfirmed entrapment with hazards, the determinate value is set to C1. If the call concerns an unconfirmed entrapment, the determinate value is set to C2. Once the determinate value is set 3041, the appropriate fire fighter response is dispatched 3043 and post-dispatch instructions 3044 are provided. This appropriate firefighter response 3043 is based on the assigned determinate value. The present preferred post-dispatch instructions 3044 of this protocol are: (a) make sure no one re-enters the area; (b) if appropriate, if it's save to do so, turn off all machinery, except the ventilation; and (c) if a confined space permit is available, please have it ready for the responders. This protocol also provides the following rules: (1) Working in a confined space is always considered to be a potentially dangerous activity and is regulated by government agencies; and (2) Conditions at a structure fire can deteriorate rapidly, sometimes with little or no warning. Be aware of audible signals from distressed firefighters. The axioms of the present confined space/structure collapse emergencies protocol are: (1) most confined space injuries and deaths result from asphyxiation due to hazardous atmospheres; (2) studies and accident reports have shown a high incidence of rescuer death associated with confined space incidents; (3) risks associated with entering confined spaces include loss of functional capacity, permanent impairment, injury, and death; (4) initial building collapse may occur as a result of fire, weather conditions, earthquake, or simply because an old or otherwise weak structural component fails; and (5) although a buried victim must immediately receive air, rescue operations depend on making the site as safe as possible by shoring or cribbing to hold back other weakened earth formations.

Figure 3G:
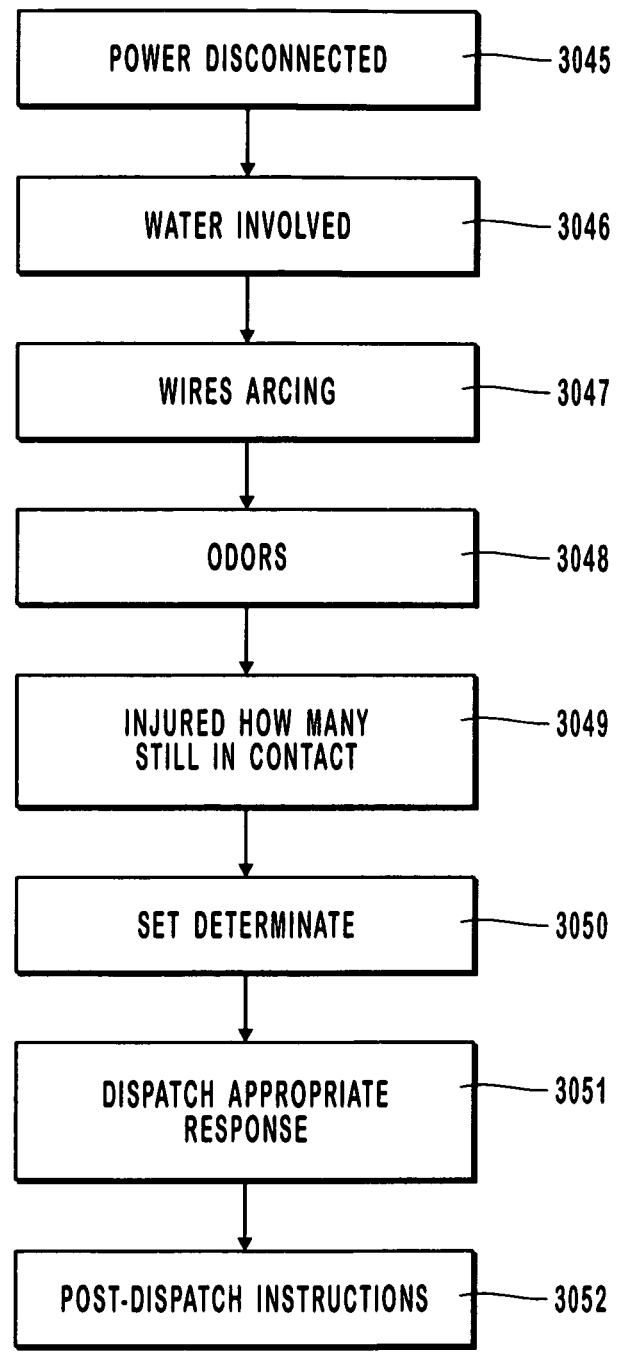

FIG. 3g shows the present steps of the Electrical Hazard Emergencies Protocol. In this protocol recurring electrical arcing is arcing that occurs more than once in a brief period of time and will be continuous so long as there is power in the line. Arcing is a luminous discharge of current that is formed when a strong current jumps a gap in a circuit or between two electrodes. Arcing is usually the result of an intermittent connection or short circuit. In the present embodiment of this invention, each of the inquiries is made and the information is received via the telephone equipment 107. An inquiry 3045 is made to learn if the power has been disconnected. If water is involved with the hazard is determined 3046. The caller is asked if any wires are arcing 3047 and if there are any strange or unusual odors 3048. It is determined 3049 if anyone is injured, if so, how many and if she or he is still in contact with the hazard. The determinate value is set 3050 as follows. If the caller indicates a confirmed entrapment, the determinate value is set to E1. If the call concerns an electrical hazard with or near water, the determinate value is set to C1. If the call concerns an appliance with an odor present, the determinate value is set to B1. If the call concerns wires down with smoke or arcing, the determinate value is set to B2. If the call concerns wires down with no smoke or arcing, the determinate value is set to B3. If the call concerns the smell of smoke, the determinate value is set to B4. If the call concerns recurring electrical arcing, the determinate value is set to B5. If the call concerns a transformer, the determinate value is set to A1. Once the determinate value is set 3050, the appropriate fire fighter response is dispatched 3051 and post-dispatch instructions 3052 are provided. This appropriate firefighter response 3051 is based on the assigned determinate value. The present preferred post-dispatch instructions 3052 of this protocol are: (a) if trapped by downed power lines, do not leave the vehicle or house; (b) beware of electrical risks and electrified water; (c) if it's safe to do so, turn off the power; and (d) if smoke or fire, if it's safe to do so, leave the area now avoiding the electrical hazard and any water sources and wait for the responders. This protocol also provides the following rules: (1) If someone is trapped in a vehicle, and attempts to leave the vehicle, there is a high probability that the person will become electrocuted; (2) Advise caller to beware of electrical risks and electrified water; (3) All electrocution patients are assumed to be in cardiac arrest until breathing is verified; (4) Always assume that transformers may be leading and it may be PCB; and (5) When more than one electrical wire is down, and one is arcing but the other is not, all wires should be considered equally dangerous. The axioms of the present electrical hazard emergencies protocol are: (1) wires attached from pole to pole are of a higher voltage; (2) wires attached from pole to house are of a lower voltage; (3) the numbers on poles allow the power utility company to determine how extensive an area the power outage could effect; (4) a bystander can be electrocuted in just getting close to the hazard, without even touching it, when high voltage is involved or the ground is wet; (5) electrocutions occurring above the ground may result in significant falls causing injuries that may be more serious than those incurred from the electrocution; (6) once an energized electrical line contacts a fence or metal guardrail, the entire length becomes charged and presents a difficult hazard; (7) fires in transformers can present a serious health and environmental risk because of coolant liquids that contain PCBs; (8) 1 out of 5 fires originate from electrical problems; (9) electrical arcing and sparking usually occurs in confined spaces such as inside the wall, outlet, appliance, or the attic; and (10) some arcing does occur in the living space from defective appliances and overheated or damaged extension cords.

Figure 3H:
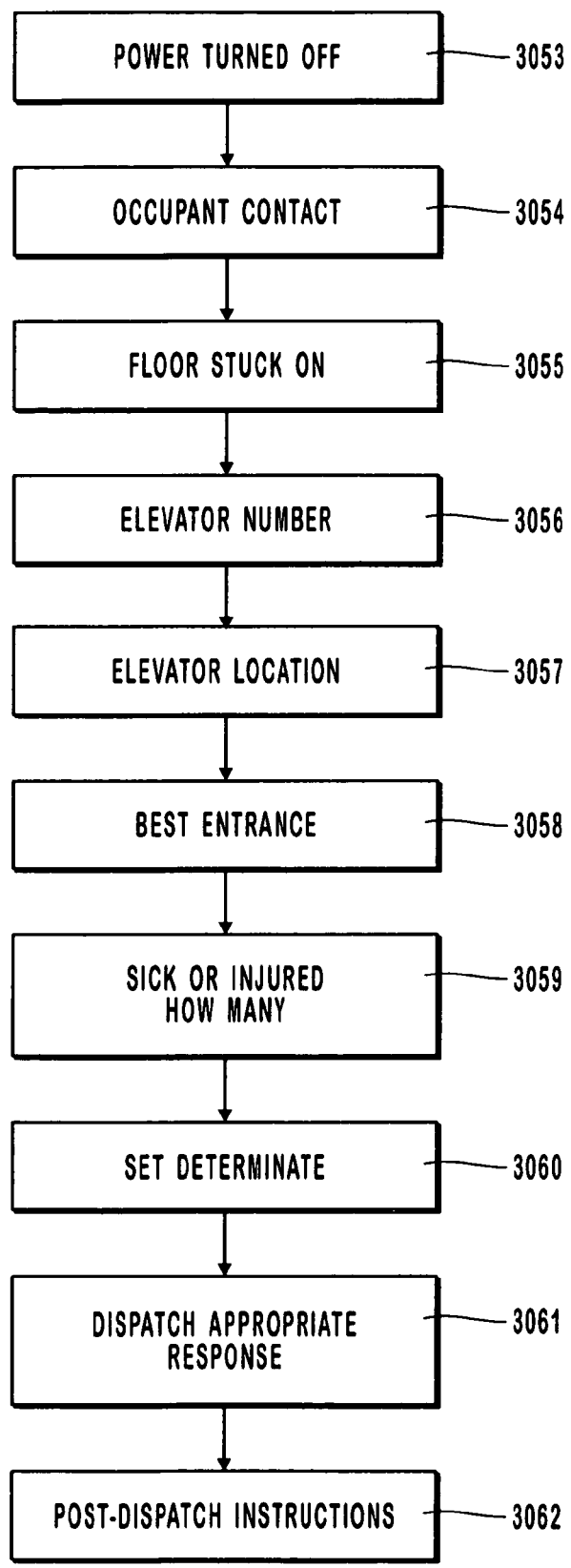
Figure 31:
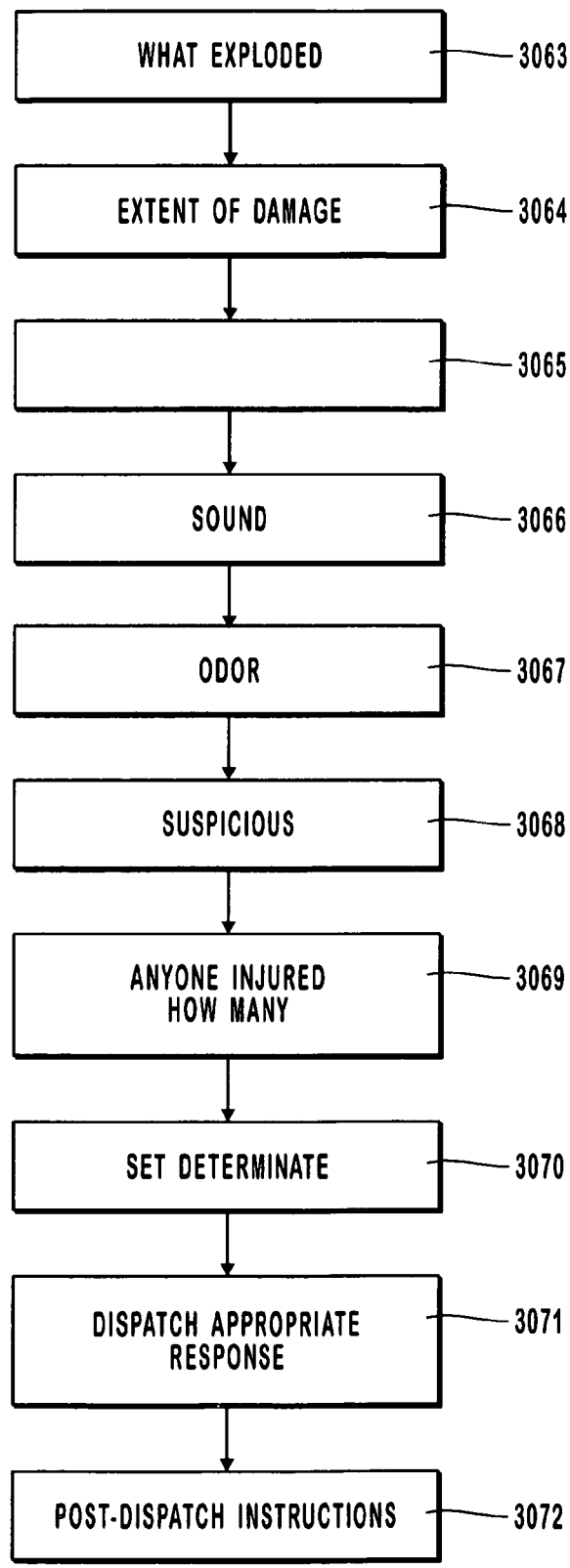

FIG. 3h shows the present steps of the Elevator/Escalator Rescue Emergencies Protocol. In this protocol entrapment is a situation involving a prevention of escape in which there is an immediate threat of death, increased injury or illness to a victim. In the present embodiment of this invention, each of the inquiries is made and the information is received via the telephone equipment 107. An inquiry 3053 is made to learn if the power has been turned off. If this incident involves elevators, an inquiry 3054 is made to determine if there has been any contact with the occupants and the floor the elevator is stuck on is identified 3055. The exact location of the elevator is determined 3057. An inquiry 3058 is made to learn what is the best entrance in the building to get to the elevator. If anyone is sick or injured, the number is determined 3059. The determinate value is set 3060 as follows. If the caller indicates entrapment (escalator) with injuries, the determinate value is set to D1. If the call concerns an elevator malfunction, with occupants inside, the determinate value is set to B1. If the call concerns an entrapment (escalator) with no injuries, the determinate value is set to B2. If the call concerns an unknown situation, the determinate value is set to B3. If the call concerns an elevator malfunction with occupants inside, the determinate value is set to A1. If the call concerns an elevator malfunction with no occupants inside, the determinate value is set to Ω1. Once the determinate value is set 3060, the appropriate fire fighter response is dispatched 3061 and post-dispatch instructions 3062 are provided. This appropriate firefighter response 3061 is based on the assigned determinate value. The present preferred post-dispatch instructions 3062 of this protocol are: (a) for an escalator, to shut off the escalator, push the emergency shutoff switch which is located at the top and bottom of the escalator and push it; (b) for an elevator, do not try to force or pry the elevator doors open; and (c) if possible, maintain verbal contact with the trapped victims and assure them that help is on the way. This protocol also provides the following rules: (1) If in doubt, always assume an elevator is occupied; (2) Unless there is a medical emergency in the elevator car, reassure the occupants that help is on the way and then wait for the elevator mechanic to arrive and handle the problem; and (3) if entrapment in an escalator has occurred, the unit will not stall or stop, the emergency shutoff switch at the top or bottom must be activated. The axioms of the present elevator/escalator rescue emergencies protocol are: (1) more people use escalators than elevators; (2) an estimated 18,000 people per year are treated for injuries received while using elevators and escalators in the U.S.; (3) ringing a bell from inside the elevator indicates that someone is inside; (4) most elevator emergencies involve elevators that are stuck between floors due to a mechanical or power failure; (5) forcing the door open can cause failure of safety circuits, allowing a car to move with the doors open while passengers may be attempting to leave the car; (6) exiting an elevator car when it is stopped between floors is extremely dangerous; (7) heat, smoke and moisture may cause the elevator control mechanism to activate.

FIG. 3*i* shows the present steps of the Explosions Emergencies Protocol. In this protocol a bomb is a case of explosive or incendiary material to be set off by impact or a timing device. In the present embodiment of this invention, each of the inquiries is made and the information is received via the telephone equipment 107. An inquiry 3063 is made to learn what has exploded, if it is not obvious. The extent of the damage is learned 3064. A pass through 3065 step to the next inquiry 3066 as to whether the caller heard a bursting or hissing sound is made followed by an inquiry 3067 as to whether the caller smelled an unusual odor. It is determined 3068 if anything suspicious was seen. And, an inquiry 3069 is made to learn if anyone is injured, and, if so, how many. The determinate value is set 3070 as follows. If the caller indicates danger and information is incomplete, the determinate value is set to D0. If the call concerns an explosion involving structure, the determinate value is set to D1. If the call concerns an explosion—nonstructural, the determinate value is set to B1. If the call concerns an investigation, the determinate value is set to B2. If the call concerns a standby, the determinate value is set to B3. Once the determinate value is set 3070, the appropriate fire fighter response is dispatched 3071 and post-dispatch instructions 3072 are provided. This appropriate firefighter response 3071 is based on the assigned determinate value. The present preferred post-dispatch instructions 3072 of this protocol are: (a) this is a potential crime scene, do not touch anything; (b) do not pick up any debris; (c) if a bomb, be aware, there may be additional devices that haven't gone off yet; and (d) if a fire, do not try to extinguish the fire yourself. This protocol also provides the following rules: (1) Advise the caller to never handle, move, or get near any suspicious packages; (2) Always advise responding personnel to use extreme caution and to be alert for secondary devices; (3) Building evacuations should be handled according to local protocol; (4) Reassure the caller that law enforcement is responding; (5) Since this is a crime scene, advise the caller not to touch or disturb anything in the residence or in the area; and (6) Audible explosions without known, visible damage should be coded as 57-B-2. The axioms of the present explosions emergencies protocol are: (1) unusual odors can signify what type of gas is present.

Figure 3J:
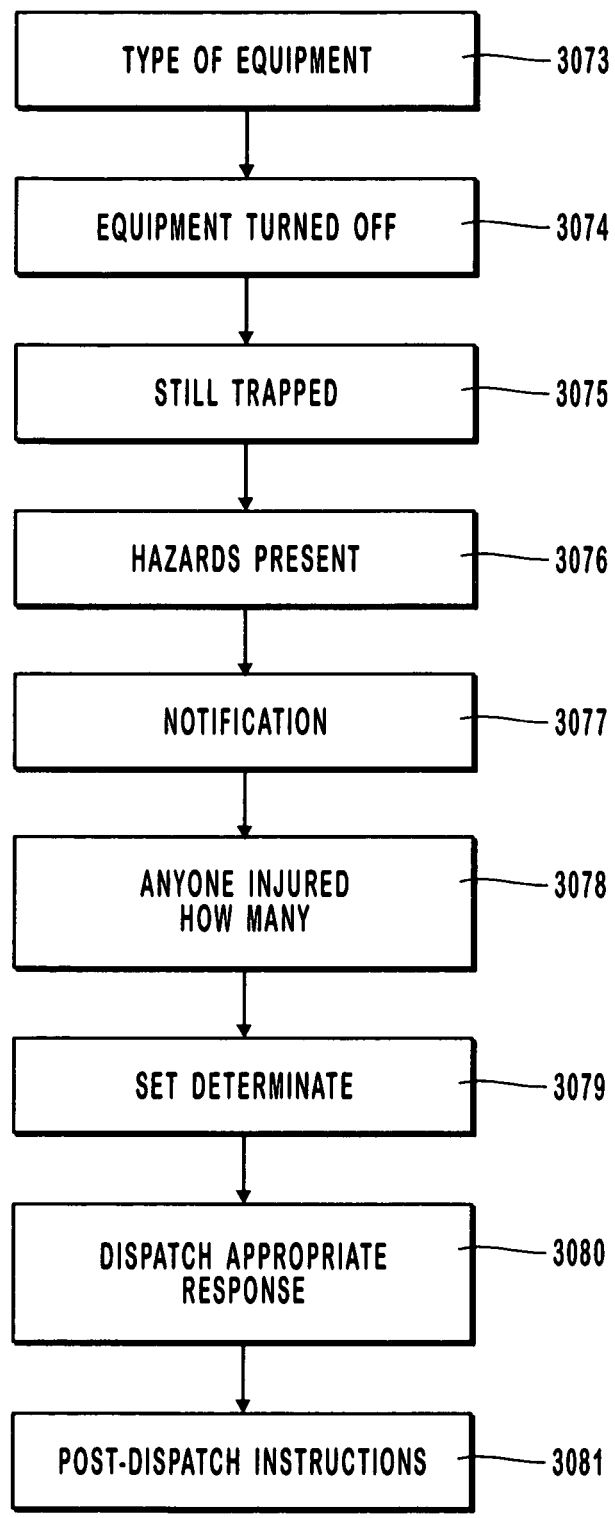

FIG. 3*j* shows the present steps of the Extrication/Entrapped Emergencies Protocol. In this protocol an entrapment is defined as a situation involving a prevention of escape in which there is an immediate threat of death, increased injury or illness to a victim. Extricate is defined as to free or remove from an entrapment or difficult. In the present embodiment of this invention, each of the inquiries is made and the information is received via the telephone equipment 107. An inquiry 3073 is made to determine what type of equipment is involved. Followed by an inquiry 3074 to learn if the equipment has been turned off. It is determined 3075 if the people are still trapped. Whether any hazards are present is determined 3076. If appropriate, an inquiry 3077 is made to learn if the maintenance department has been notified. It is determined 3078 if anyone else has been injured, and, if so, how many. The determinate value is set 3079 as follows. If the caller indicates a confirmed entrapment with multiple victims, the determinate value is set to E1. If the call concerns a confirmed entrapment with a single victim, the determinate value is set to E2. If the call concerns a caller in danger and/or incomplete information, the determinate value is set to D0. If the call concerns an entrapment with hazards, the determinate value is set to D1. Once the determinate value is set 3079, the appropriate fire fighter response is dispatched 3080 and post-dispatch instructions 3081 are provided. This appropriate firefighter response 3080 is based on the assigned determinate value. The present preferred post-dispatch instructions 3081 of this protocol are: (a) if it's safe to do so, turn off the equipment; (b) do not move her/him unless she or he is in danger; (c) do not reenter any hazardous or dangerous areas; and (d) if it's safe to do so, keep all affected people at the scene. This protocol also provides the following rules: (1) If the patient is caught in machinery, a maximal response should be sent, including the appropriate extraction team; (2) The caller should be advised not to reenter a hazardous or dangerous environment; (3) The caller should be advised to keep all affected persons at the scene if possible, to lessen the threat of secondary contamination; (4) A call involving an entrapment should be considered an extraction situation until responding units arrive and assess the circumstances; and (5) If entrapped, assume the victim is injured. The axioms of the present extraction/entrapped emergencies protocol are: (1) even though these calls are generally 3rd party, it is important to determine if the patient actually requires extraction; (2) emergency service personnel must often utilize special tools and techniques when called upon to rescue someone trapped in any type of machinery; (3) extrication and entrapment situations can require units to be tied up for considerable amounts of time; (4) all efforts to free the victim are focused on preventing any further injury to the victim; and (5) an entrapped person often feels panic or has a feeling of impending doom.

Figure 3K:
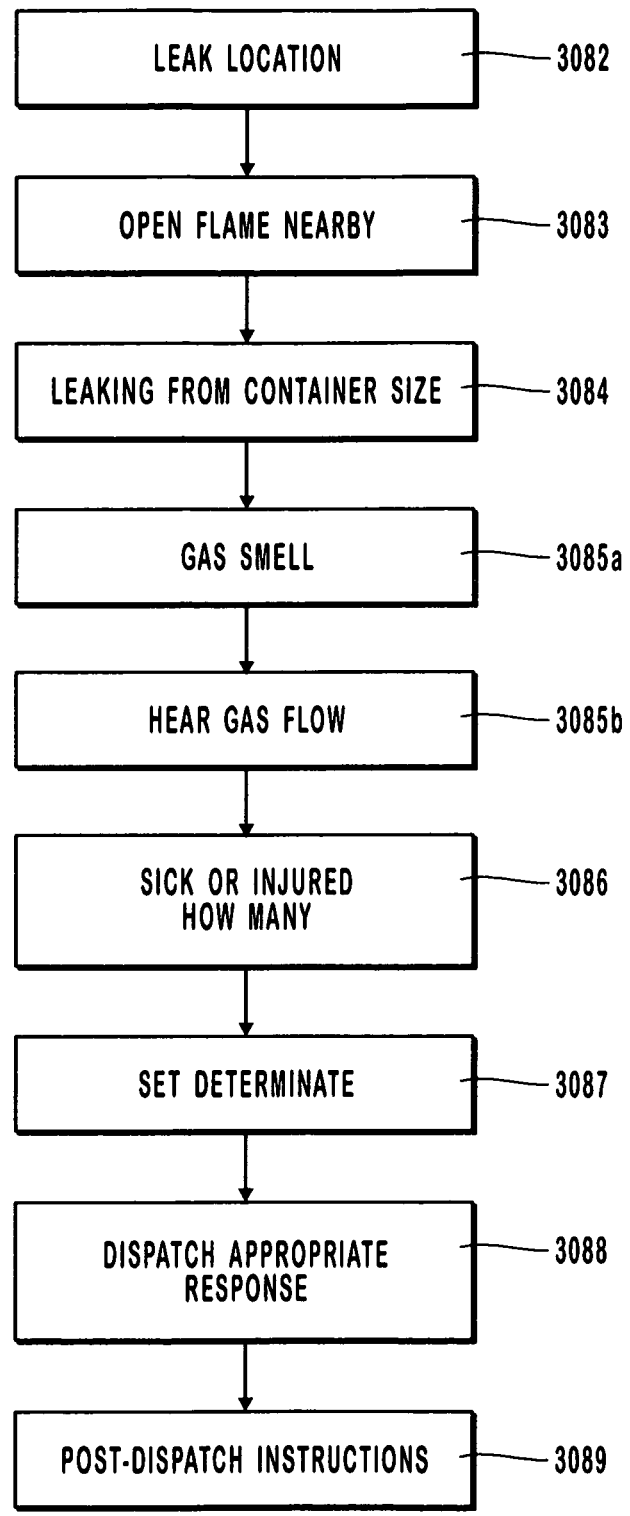

FIG. 3*k* shows the present steps of the Gas Leaks Emergencies Protocol. In this protocol a HAZMAT is defined as an incident involving a gas, liquid, or solid that even in small quantities poses a threat to life, health or property. In the present embodiment of this invention, each of the inquiries is made and the information is received via the telephone equipment 107. If not obvious, an inquiry 3082 is made to learn the location of the leak. It is determined 3083 if an open flame is nearby. The caller is asked 3084 what the gas is leaking from and what is the size of the container. Inquiries are made to learn if the caller can smell 3085 the gas, hear 3085 the case and if anyone is sick or injured, if so how many 3086. The determinate value is set 3087 as follows. If the caller indicates danger and information is incomplete, the determinate value is set to D0. If the call concerns an inside ruptured line, the determinate value is set to D1. If the call concerns a known ignition source nearby, the determinate value is set to D2. If the call concerns an outside-ruptured line, the determinate value is set to C1. If the call concerns a propane tank, the determinate value is set to C2. If the call concerns an outside odor, the determinate value is set to B1. If the call concerns an inside odor, the determinate value is set to B2. If the call concerns an unknown situation, the determinate value is set to B3. Once the determinate value is set 3087, the appropriate fire fighter response is dispatched 3088 and post-dispatch instructions 3089 are provided. This appropriate firefighter response 3088 is based on the assigned determinate value. The present preferred post-dispatch instructions 3089 of this protocol are: (a) for a cordless/cell call, if it's safe to do so, take the phone with you, leave the area, and leave the door open, do not touch any electrical switches; (b) if a regular phone, lay the phone down, do not hang it up, if it's safe to do so, leave the area and leave the door open, do not touch any electrical switches; and (c) avoid using any open flame or other possible ignition source. This protocol also provides the following rules: (1) The caller should be advised not to reenter a hazardous or dangerous environment; (2) Gas is flowing until proven otherwise; (3) All gas leaks are considered hazardous until proven otherwise; and (4) Be aware of the possibility of an explosion when dealing with suspected gas leaks. The axioms of the present gas leaks emergencies protocol are: (1) many gases can displace the percentage of oxygen in available air, creating serious scene safety conditions; (2) natural gas is lighter than air and tends to rise and diffuse in the open; (3) natural gas is non-toxic, but it is classified as an asphyxiate because it may displace normal breathing air and lead to asphyxiation; (4) natural gas has no odor of its own but a very distinctive odor is added by the utility companies as a warning smell; (5) response time for utility companies is usually less than an hour, but this time may be extended in rural areas or in times of great demand; and (6) liquefied petroleum gas is one and one-half times as heavy as air and it will generally seek the lowest point possible.

Figure 3L:
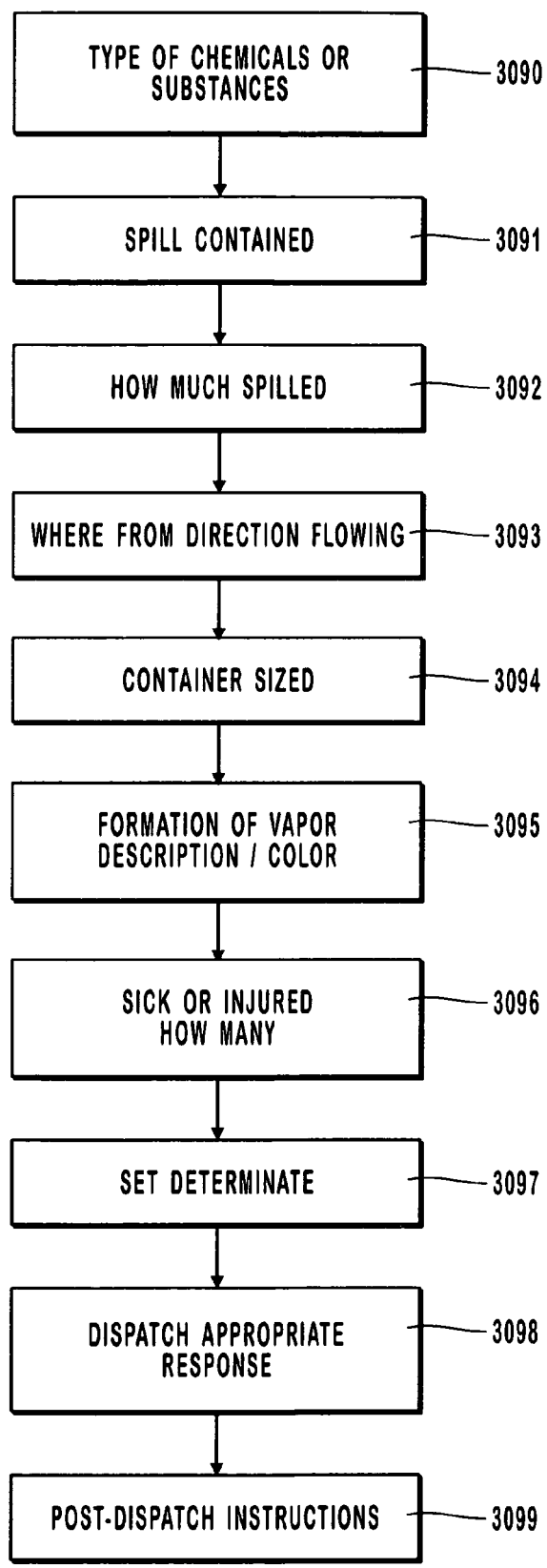

FIG. 3*l* shows the present steps of the HAZMAT/Fuel Spill Emergencies Protocol. In this protocol a HAZMAT is an incident involving a gas, liquid, or solid that even in small quantities poses a threat to life, health, or property. A Hot Zone is a geographical area established by Command as unsafe which includes the incident, product, container, and the immediate area exposed to gas, vapor, mist, dust, smoke or runoff. A Cold Zone is a geographical area established by Command that is safe, an area where many support functions occur. In the present embodiment of this invention, each of the inquiries is made and the information is received via the telephone equipment 107. An inquiry 3090 is made to determine the kind of chemicals or substances that are involved. Whether the spill is contained is determined 3091. How much has spilled or leaked is determined 3092. If it is not obvious, the location where the chemicals or liquid is from is learned 3093. If appropriate, the size of the container is determined 3094. An inquiry 3095 is made to learn if the caller can see a formation of gas clouds or vapor. The number of sick or injured persons is determined 3096. The determinate value is set 3097 as follows. If the caller indicates danger and information is incomplete, the determinate value is set to D0. If the call concerns a chemical spill or leak, the determinate value is set to D1. If the call concerns a radioactive material, the determinate value is set to D2. If the call concerns a biological material, the determinate value is set to D3. If the call concerns a contained chemical spill, the determinate value is set to C1. If the call concerns a fuel spill or leak greater than 50 gallons, the determinate value is set to C2. If the call concerns a fuel spill or leak less than 50 gallons, the determinate value is set to B1. If the call concerns an unknown situation, the determinate value is set to B2. If the call concerns abandoned waste, the determinate value is set to A1. Once the determinate value is set 3097, the appropriate fire fighter response is dispatched 3098 and post-dispatch instructions 3099 are provided. This appropriate firefighter response 3098 is based on the assigned determinate value. The present preferred post-dispatch instructions 3099 of this protocol are: (a) for an inside or near a hazardous place, if it's safe to do so, leave the contaminated area, but not the scene; and (b) if anyone is contaminated with chemical, do not touch him, her or anything. This protocol also provides the following rules: (1) The caller should be advised not to re-enter a hazardous or dangerous environment; (2) The caller should be advised to keep all affected persons at the scene if possible, to lessen the threat of secondary contamination; and (3) A spill or leak is considered uncontained until proven otherwise. The axioms of the present HAZMAT/Fuel Spill emergencies protocol are: (1) the United Nations (UN) or North American (NA) number is a 4-digit number that is either painted or stenciled on the end of rail cars or located on the warning placard; (2) the NFPA-704 Marking System distinctively indicates the properties and potential dangers of hazardous materials; and (3) patients who have inhaled smoke, carbon monoxide, or other chemicals may be found in any stage of intoxication.

Figure 3M:
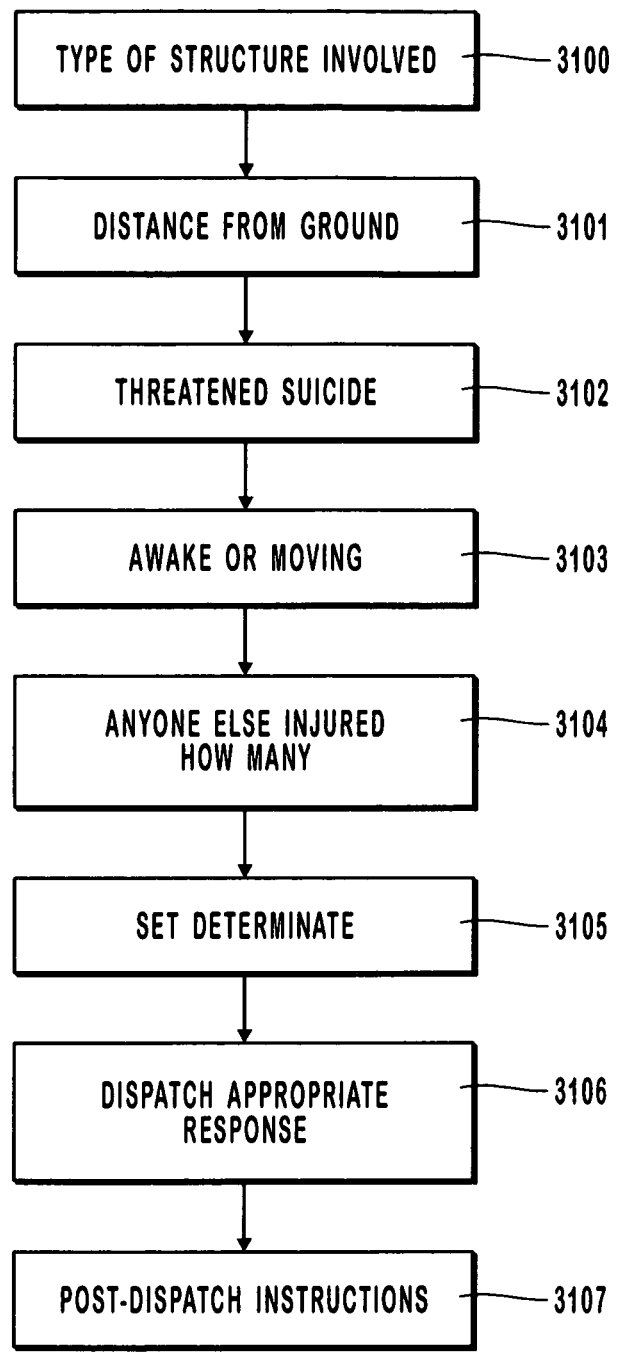

FIG. 3*m* shows the present steps of the High Angle Rescue Emergencies Protocol. In this protocol a high angle rescue is defined as rescue or extrication situation of person(s) from an elevated structure where conventional interior rescue is not possible. A high rise is a building that is too tall for adequate fire control from ground-based aerial ladders or elevating platforms or towers. In the present embodiment of this invention, each of the inquiries is made and the information is received via the telephone equipment 107. An inquiry 3100 is made to determine the type of structure or environment that is involved. The distance from the caller to the ground is determined 3101. An inquiry 3102 is made to learn if this is a threatened suicide. Whether the person appears to be awake is determined 3103 and whether anyone else is injured is determined 3104. The determinate value is set 3105 as follows. If the caller indicates confirmation of a high angle rescue, the determinate value is set to C1. If the call concerns a threatened suicide, the determinate value is set to C2. If the call concerns a victim who is not moving, the determinate value is set to C3. Once the determinate value is set 3105, the appropriate fire fighter response is dispatched 3106 and post-dispatch instructions 3107 are provided. This appropriate firefighter response 3106 is based on the assigned determinate value. The present preferred post-dispatch instructions 3107 of this protocol are: (a) do not approach or attempt to rescue the victim(s); (b) for non-suicidal, tell the victim not to move; and (c) for non-suicidal, do not touch any equipment that may be suspending the victim. This protocol also provides the following rules: (1) In the event, there is no Technical Rescue Team (TRT) available, consider utilizing mutual aid resources; (2) Evacuations at greater than 60° inclination are considered high angle operations, and a TRT should be used for all rescues above this angle; and (3) In specialized rescues, the TRT should be advised as soon as possible in order to affect a timely recovery of the victim. The axioms of the present high angle rescue emergencies protocol are: (1) scene safety should include advising the caller not to touch any equipment that may be suspending the victim; (2) for purposes of general building size up, 10 feet equals one story; (3) buildings over 75 feet high present special problems for the fire safety of the occupants; and (4) the U.S. NFPA considers any building greater than 75 feet a high-rise structure.

Figure 3N:
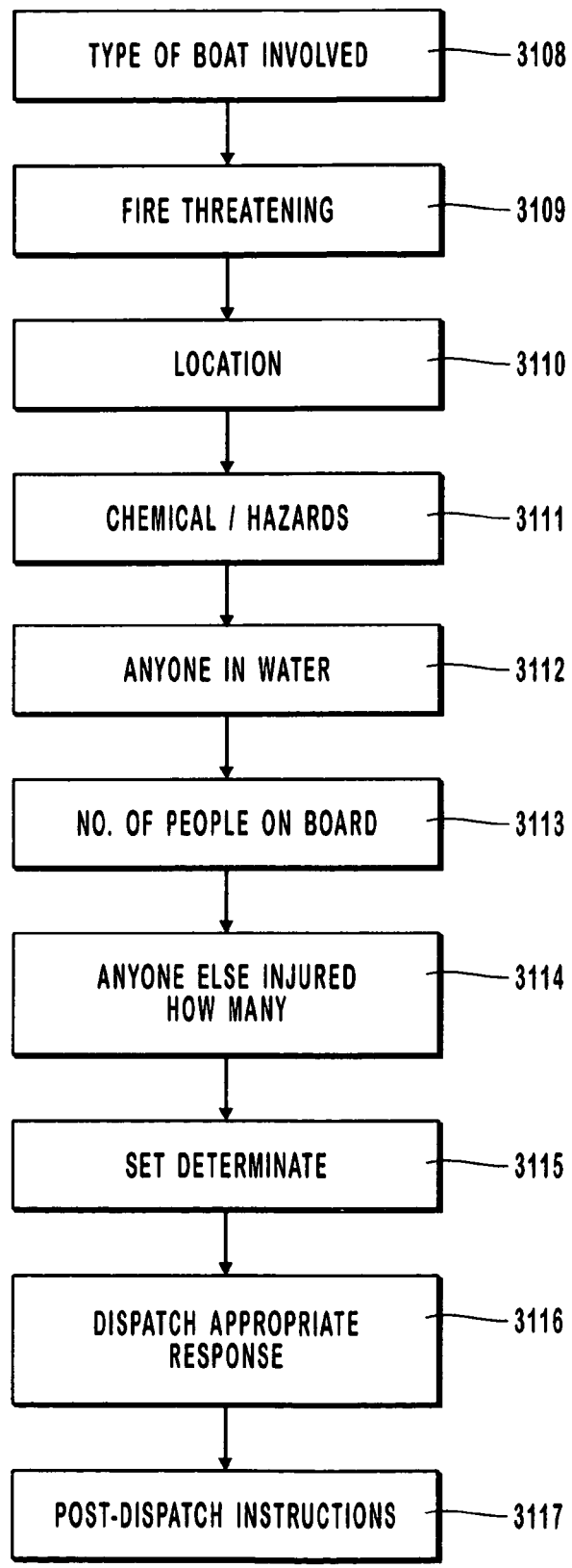
Figure 30:
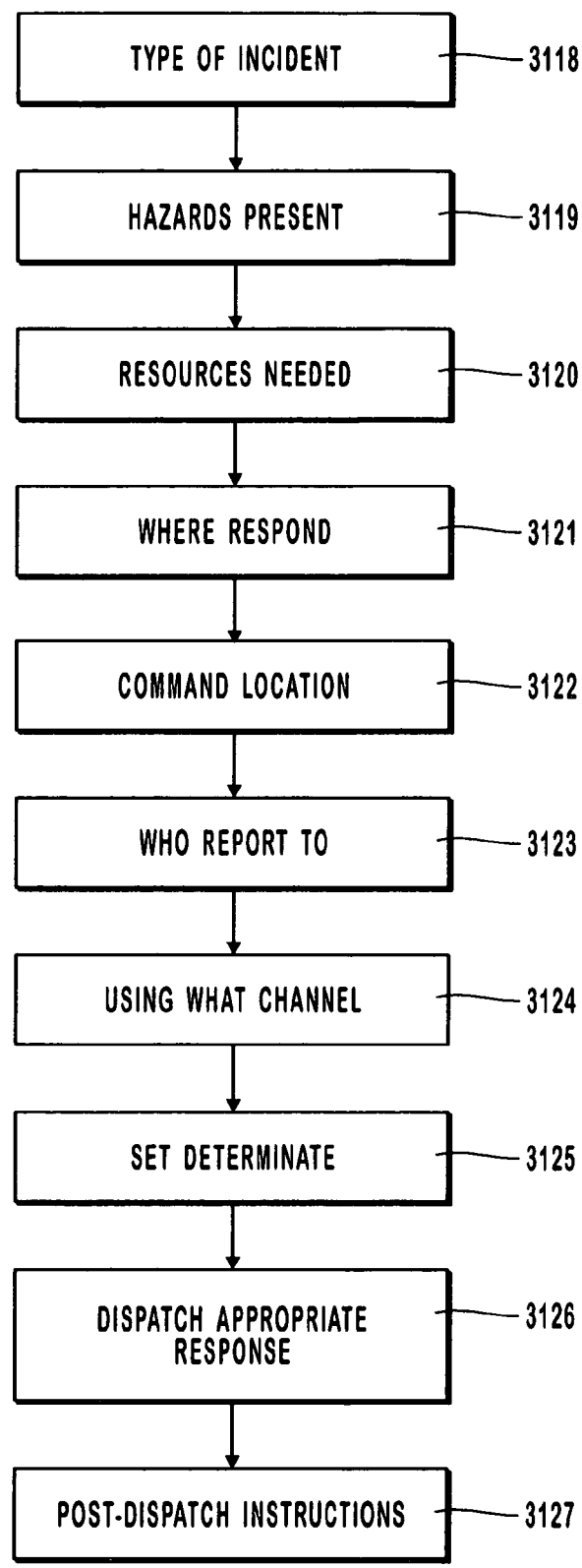

FIG. 3*n* shows the present steps of the Marine Fires Emergencies Protocol. In this protocol a threatened structure is any structure that has a potential for catching on fire. In the present embodiment of this invention, each of the inquiries is made and the information is received via the telephone equipment 107. An inquiry 3108 is made to determine the type of boat and the name. A further inquiry 3109 is made to determine if the fire is threatening anything. The location of the boat is identified 3110. Whether there are chemicals or other hazards involved is determined 3111. An inquiry 3112 is made to determine if anyone is in the water. The number of people onboard is determined 3113. An inquiry 3114 is made to determine if anyone is injured and, if so, how many. The determinate value is set 3115 as follows. If the caller indicates danger and information is incomplete, the determinate value is set to D0. If the call concerns a threatened structure or other boats, the determinate value is set to D1. If the call concerns a fire not threatening structure or other boats, the determinate value is set to D2. If the call concerns an extinguished fire, the determinate value is set to B1. Once the determinate value is set 3115, the appropriate fire fighter response is dispatched 3116 and post-dispatch instructions 3117 are provided. This appropriate firefighter response 3116 is based on the assigned determinate value. The present preferred post-dispatch instructions 3117 of this protocol are: (a) if appropriate, do not enter the burning compartment; (b) if you are forced to abandon ship, please call back immediately; (c) if it's safe to do so, put on your life jackets; (d) if it's safe to do so, put the anchor overboard; and (e) do not try to extinguish the fire yourself. This protocol also provides the following rules: (1) Advise the callers that if unable to control the fire, prepare to abandon the vessel; and (2) The determination of whether a fire is threatening a structure should be based on the caller's judgment. The axiom of the present marine fires emergencies protocol is: dangerous cargo manifest or shipping papers are in a pipe-like container or box on the gangplank when it is in port. The responsible person is the captain or the master of the vessel.

FIG. 3o shows the present steps of the Mutual Emergencies Protocol. In this protocol mutual aid is an agreement between communities that allows for the exchange of equipment for use during an emergency. Automatic aid is a predetermined agreement between communities to utilize the closest units regardless of jurisdictional boundaries. In the present embodiment of this invention, each of the inquiries is made and the information is received via the telephone equipment 107. An inquiry 3118 is made to determine what type of incident this is. Whether there are any hazards present is determined 3119. An inquiry 3120 is made to determine what resources are needed and where they are needed 3121. Whether an incident command has been established is determined 3122. The person who the response team should report to and the channel being used is identified 3123, 3124. The determinate value is set 3125 as follows. If the caller indicates mutual aid to incident, the determinate value is set to D1. If the call concerns automatic aid—multiple units, the determinate value is set to D2. If the call concerns an automatic aid—single unit, the determinate value is set to B1. If the call concerns a mutual aid move up, the determinate value is set to A1. If the call concerns mutual aid to a staging area, the determinate value is set to A2. Once the determinate value is set 3125, the appropriate fire fighter response is dispatched 3126 and post-dispatch instructions 3127 are provided. This appropriate firefighter response 3126 is based on the assigned determinate value. The present preferred post-dispatch instructions 3127 of this protocol are: (a) I'm sending the following units as requested. This protocol also provides the following rules: (1) In Mutual Aid situations, go immediately to Protocol 63 after determining the address and callback numbers; (2) Refer to local policy regarding updating the availability of Mutual Aid resources; and (3) confirmation of location and responding units should occur on every call.

Figure 3P:
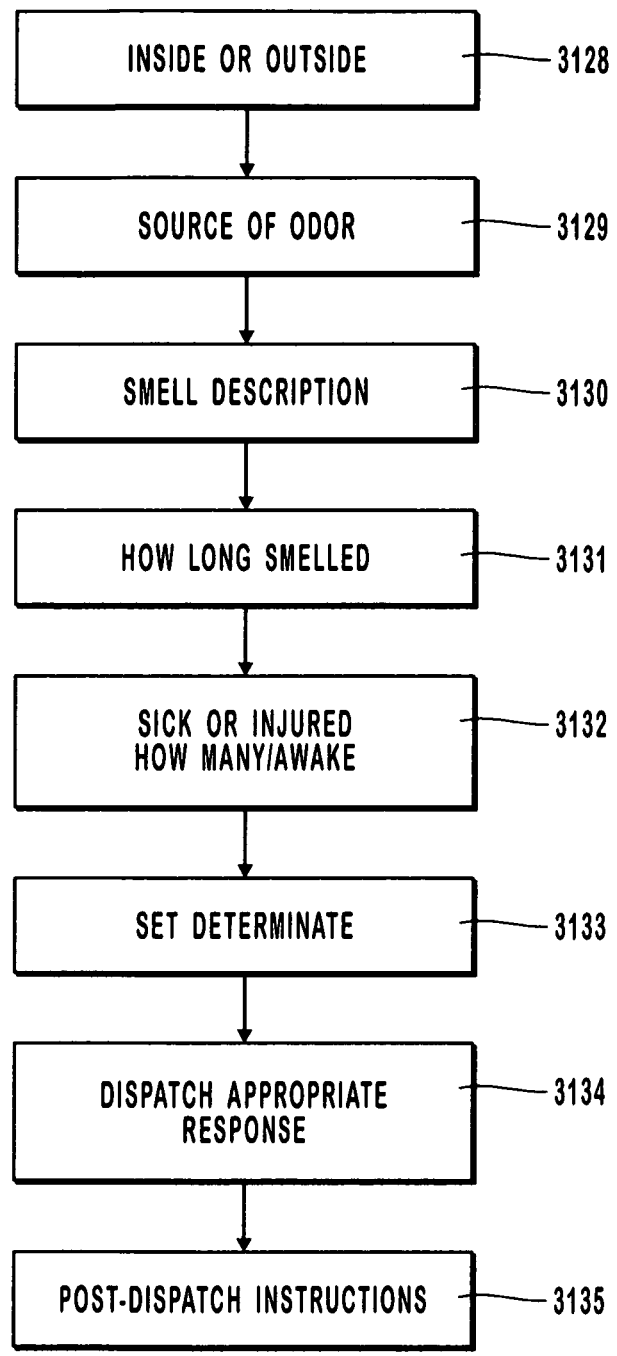

FIG. 3p shows the present steps of the Odors Emergencies Protocol. In this protocol an odor is a strange or unknown odor. In the present embodiment of this invention, each of the inquiries is made and the information is received via the telephone equipment 107. An inquiry 3128 is made to learn whether the odor is inside or outside, if it is not obvious. The source of the odor is identified 3129. The smell of the odor is described 3130. The duration of the odor is determined 3131. An inquiry 3132 is made to determine if anyone is sick or injured. The determinate value is set 3133 as follows. If the caller indicates danger and information is incomplete, the determinate value is set to D0. If the call concerns an odor with a patient who is not alert, the determinate value is set to D1. If the call concerns an odor with multiple patients, the determinate value is set to C1. If the call concerns an odor with a single patient, the determinate value is set to B1. If the call concerns an unknown odor inside, the determinate value is set to A1. If the call concerns an unknown odor outside, the determinate value is set to A2. Once the determinate value is set 3133, the appropriate fire fighter response is dispatched 3134 and post-dispatch instructions 3135 are provided. This appropriate firefighter response 3134 is based on the assigned determinate value. The present preferred post-dispatch instructions 3135 of this protocol is: (a) if appropriate, if it's safe to do so, leave the area now, close the doors behind you, and remain outside. This protocol also provides the following rules: (1) The caller should be advised not to reenter a hazardous or dangerous environment; (2) Many times calls for odors have no readily identifiable source; (3) Do not assume that an odor is from a non-threatening material; and (4) Odors coming from an appliance should be coded 64-A-1. The axioms of the present odors emergencies protocol are: (1) patients who have inhaled smoke, carbon monoxide, or other chemicals may be found in any stage of intoxication; (2) unconsciousness in a patient who has inhaled carbon monoxide is a bad sign; and (3) unusual odors can signify what type of gas is present.

Figure 3Q:
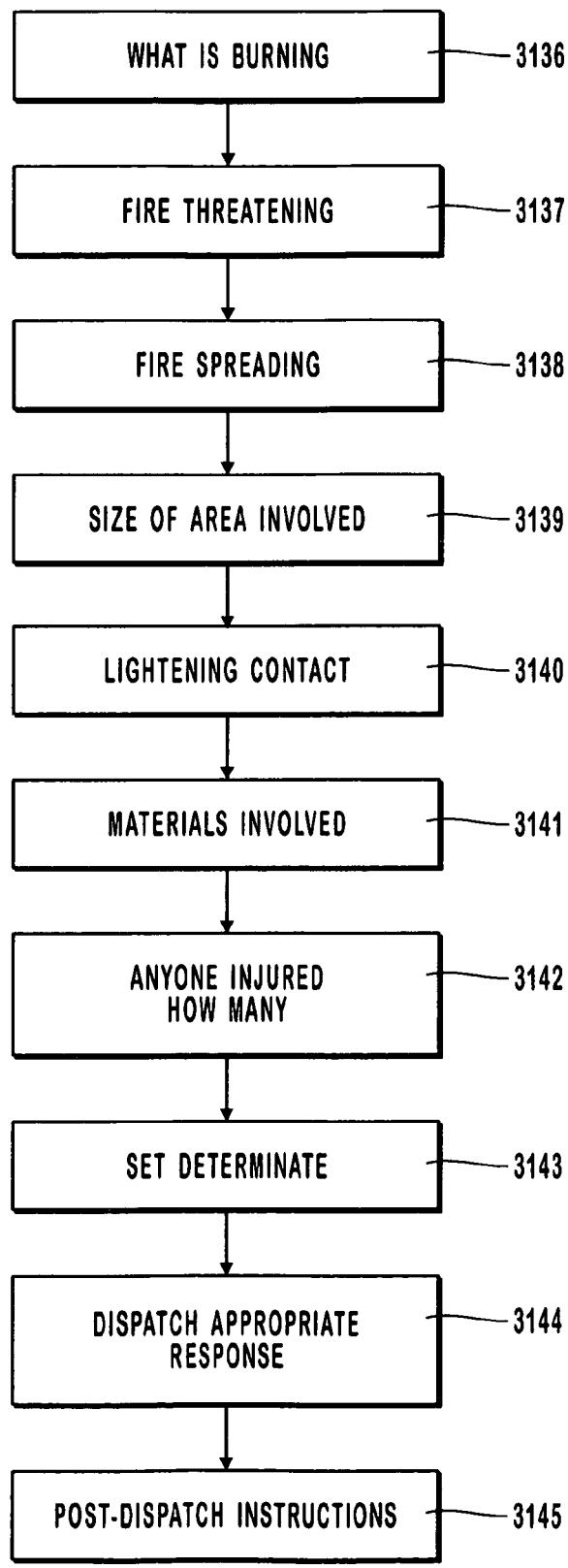

FIG. 3q shows the present steps of the Outside Fire Emergencies Protocol. In this protocol a threatened structure is any structure that has a potential of catching on fire; and wildland fires are any forest, grass, brush, or tundra fire involving lands not under cultivation but including forests regardless of the type of timber. In the present embodiment of this invention, each of the inquiries is made and the information is received via the telephone equipment 107. An inquiry 3136 is made to determine what is burning. Another inquiry 3137 is made to learn if the fire is threatening anything. Whether the fire is spreading is determined 3138. If grass or wildland fire, the size of the fire area is identified 3139. If a lightning strike, where the strike made contact is determined 3140. The involved materials are identified 3141. An inquiry 3142 is made to determine if anyone is injured and, if so, how many are injured. The determinate value is set 3143 as follows. If the caller indicates danger and information is incomplete, the determinate value is set to D0. If the call concerns threatened animals, the determinate value is set to D1. If the call concerns a threatened structure, the determinate value is set to D2. If the call concerns a threatened vehicle, the determinate value is set to D3. If the call concerns a wildland fire, the determinate value is set to D4. If the call concerns a dumpster fire, the determinate value is set to C1. If the call concerns a brush fire, the determinate value is set to B1. If the call concerns an unattended fire, the determinate value is set to B2. If the call concerns a lightning strike without fire, the determinate value is set to B3. If the call concerns a dumpster fire away from a structure, the determinate value is set to A1. If the call concerns an outside trash container, the determinate value is set to A2. If the call concerns an attended fire, the determinate value is set to A3. If the call concerns an extinguished fire, the determinate value is set to A4. Once the determinate value is set 3143, the appropriate fire fighter response is dispatched 3144 and post-dispatch instructions 3145 are provided. This appropriate firefighter response 3144 is based on the assigned determinate value. The present preferred post-dispatch instructions 3145 of this protocol are: (a) listen carefully, this could be a very dangerous situation, do not try to extinguish the fire yourself. This protocol also provides the following rules: (1) When the caller is unsure if associated structures are threatened, always assume they are;

(2) A structure is considered to be threatened when anything on fire is approaching, until proven otherwise; (3) The determination of whether a fire is threatening a structure should be based on the caller's judgment; and (4) If the caller struggles to determine the size of the fire, ask them to relate it to the size of a familiar area. The axioms of the present outside fire emergencies protocol are: (1) wildland fires, especially fires in canyons, are very dangerous and unpredictable; (2) southern exposure of hills and mountains receive the most sunlight and heat, fires will burn faster on southern exposures; (3) be aware that fuel, mulch, landscape, and tire fires can smolder for days; and (4) resulting wildfire winds can attain 120 mph.

Figure 3R:
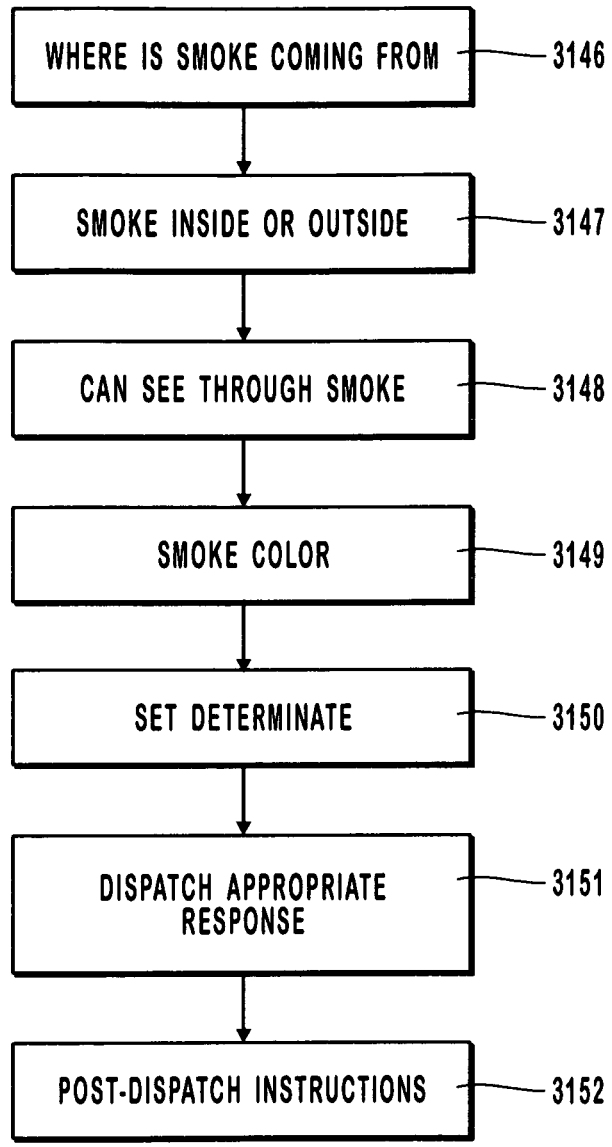

FIG. 3r shows the present steps of the Smoke Investigation Protocol. In this protocol heavy smoke is smoke that the caller is unable to see objects through. Light smoke is smoke the caller is able to see objects through. In the present embodiment of this invention, each of the inquiries is made and the information is received via the telephone equipment 107. An inquiry 3146 is made to learn where the smoke is coming from. If it is not obvious, whether the smoke comes from inside or outside is determined 3147. An inquiry 3148 is made to determine if the caller can see through the smoke. The color of the smoke is identified 3149. The determinate value is set 3150 as follows. If the caller indicates heavy smoke, the determinate value is set to C1. If the call concerns light smoke, the determinate value is set to A1. Once the determinate value is set 3150, the appropriate fire fighter response is dispatched 3151 and post-dispatch instructions 3152 are provided. This appropriate firefighter response 3151 is based on the assigned determinate value. The present preferred post-dispatch instructions 3152 of this protocol are: (a) if visibility is affected, use caution in driving though any smoke; and (b) if it's safe to do so, remain at your present location and direct emergency units to the area. This protocol also provides the following rules: (1) The caller should be advised to remain at a safe place near their present location to help the responders locate the smoke; (2) Smoke inside a structure, seen or smelled, should be coded as a structure fire on Protocol 67; (3) If the caller can smell smoke outside, but does not see it, code as 66-A-1; and (4) If the caller describes the smoke as non-visible or felt but not seen, consider the possibility of a gas link. The axioms of the present smoke investigation emergencies protocol are: (1) smoke causes the majority of fire-related deaths; (2) smoke and deadly gases rise to block off obvious escape routes; (3) once water is placed on the fire, the smoke may turn white; and (4) what is reported as smoke might not be actual smoke, it may be steam or a HAZMAT cloud.

Figure 3S:
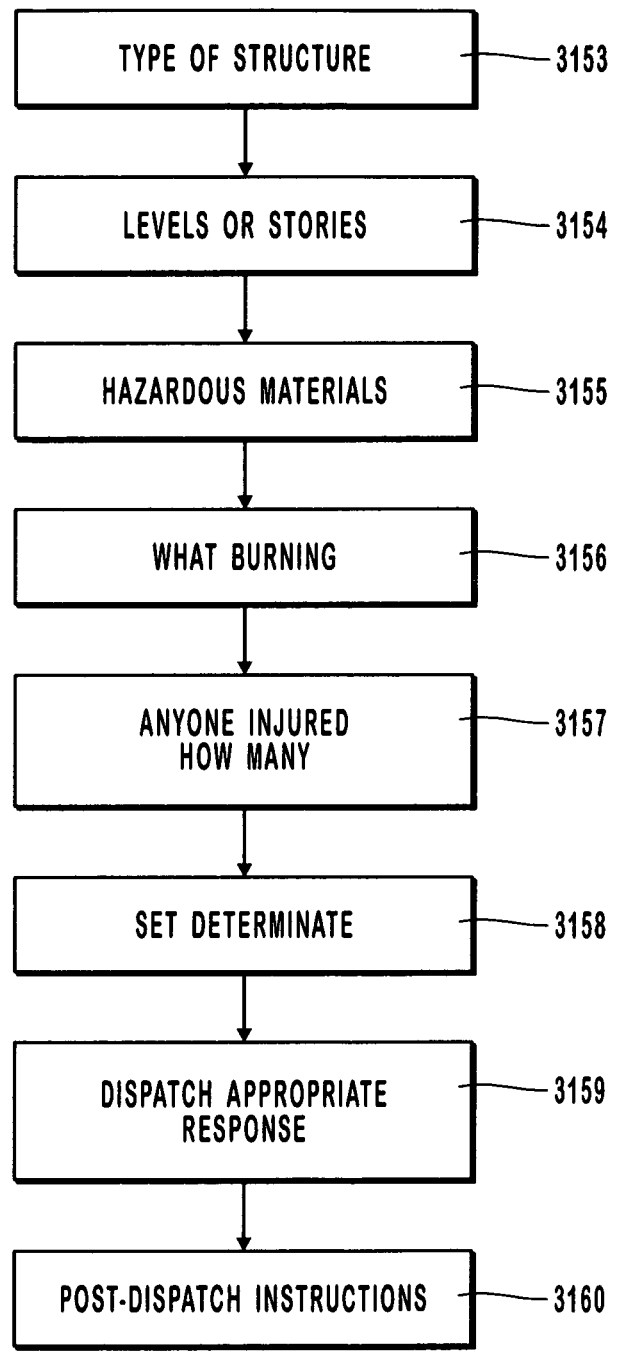

FIG. 3s shows the present steps of the Structure Fire Emergencies Protocol. In this protocol a high rise is a building that is too tall for adequate fire control from ground-based aerial ladders or elevating platforms or towers, a high life hazard location is any location that poses multiple life threats due to difficulty exiting or lack of mobility of the inhabitants, and high occupancy is the general term for a building that can or does contain a large amount of people. In the present preferred embodiment of this invention information is requested and information is received via the telephone equipment 107. An inquiry 3153 is made to determine what type of structure is involved. The number of levels or stories is identified 3154. Whether hazardous materials are inside is determined 3155. An inquiry 3156 is made to determine what is burning. Whether anyone is injured, and if so how many are injured is determined 3157. The determinate value is set 3158 as follows. If the caller indicates confirmed entrapment, the determinate value is set to E1. If the call indicates danger and information is incomplete, the determinate value is set to D0. If the call concerns a high life hazard, the determinate value is set to D1. If the call concerns a high rise, the determinate value is set to D2. If the call concerns a high occupancy building, the determinate value is set to D3. If the call concerns a HAZMAT condition, the determinate value is set to D4. If the call concerns a commercial structure, the determinate value is set to D5. If the call concerns a multiple residential structure, the determinate value is set to D6. If the call concerns a single residential structure, the determinate value is set to D7. If the call concerns a chimney fire, the determinate value is set to D8. If the call concerns a non-dwelling structure, the determinate value is set to D9. If the call concerns an appliance, the determinate value is set to C1. If the call concerns an extinguished fire, the determinate value is set to C2. If the call concerns the odor of smoke, the determinate value is set to B1. If the call concerns a lightning strike without fire, the determinate value is set to B2. Once the determinate value is set 3158, the appropriate fire fighter response is dispatched 3159 and post-dispatch instructions 3160 are provided. This appropriate firefighter response 3159 is based on the assigned determinate value. The present preferred post-dispatch instructions 3160 of this protocol are: (a) for inside the structure or as appropriate, if it's safe to do so, leave the structure and close the doors behind you, and remain outside; (b) for multi-level structures, do not use the elevator; (c) do not try to extinguish the fire yourself; and (d) for commercial, if it's safe to do so, activate the alarm as you leave the building to warn others. This protocol also provides the following rules: (1) All structures are considered occupied until proven otherwise; (2) Advise the caller to never carry out a burning pan, furniture or bedding; (3) Advise the caller to never use water to extinguish a grease fire; and (4) a fire that is fully contained within an appliance should be coded 67-C-1. The axioms of the present structure fire emergencies protocol are: (1) fuel, heat and oxygen must be present for a fire to exist; (2) most home fires happen between 10 p.m. and 6 a.m.; (3) children and the elderly are most susceptible to clothing-related fires; (4) for purposes of general building size up, 10 feet equals one story; (5) fire is the third leading cause of death in the home; (6) at least 80% of all fire deaths occur in residences; (7) a fire can double in size within seconds; and (8) grease fires under a vent hood are one of the most common types of extinguished fires reported.

Figure 3T:
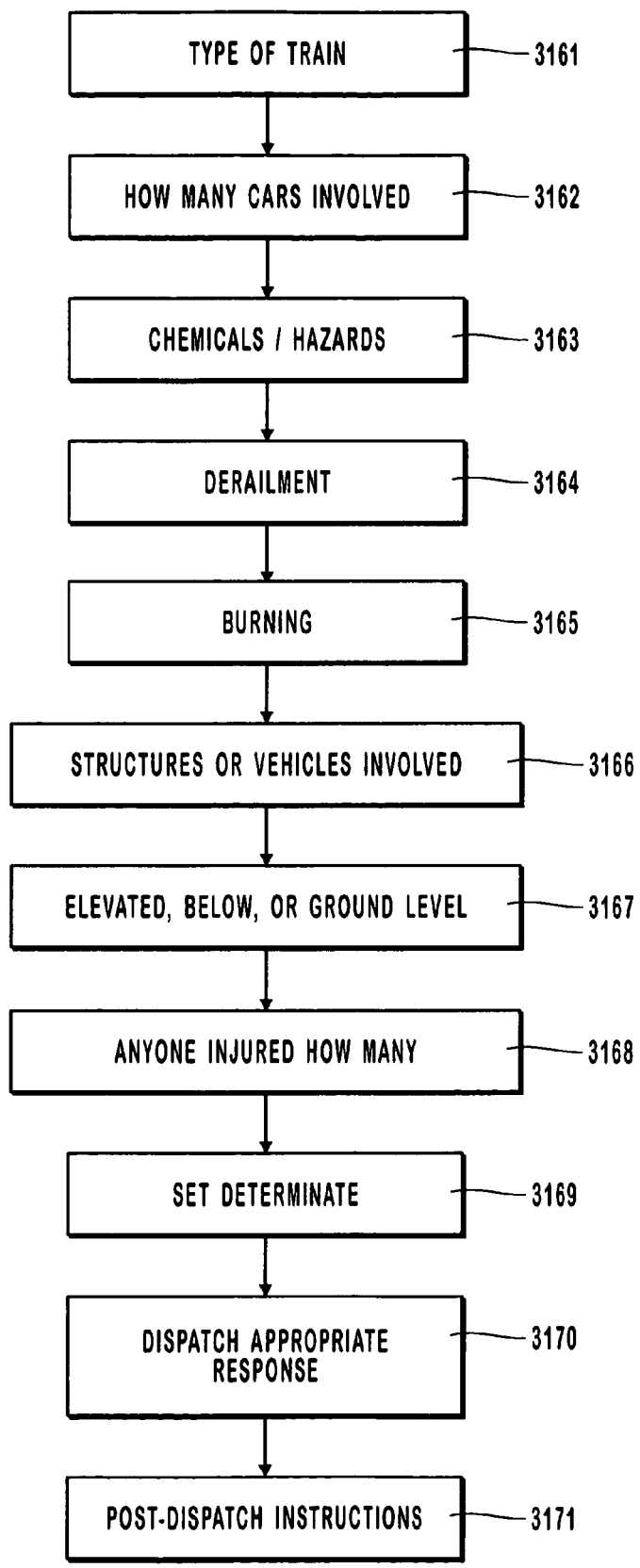

FIG. 3t shows the present steps of the Train/Subway/Commuter Rail Emergencies Protocol. In this protocol a HAZMAT is an incident involving a gas, liquid or solid that even in small quantities poses a threat to life, health, or property. A bridge is a structure spanning and providing passage over a gap or barrier such as a river or roadway. In the present preferred embodiment of this invention information is requested and information is received via the telephone equipment 107. An inquiry 3161 is made to determine type of train. The number of rail cars involved is identified 3162. A determination is made 3163 as to whether chemicals or other hazards involved. An inquiry is made 3164 as to whether this incident is a train derailment. If a fire, what is burning is identified 3165. An inquiry 3166 is made to learn if any structures or vehicles are involved. If it is not obvious, whether the accident is elevated, below or at ground level is determined 3167. Whether anyone is injured and if so how many persons are injured is determined 3168. The determinate value is set 3169 as follows. If the caller indicates confirmed entrapment, the determinate value is set to E1. If the call indicates danger and information is incomplete, the determinate value is set to D0. If the call concerns HAZMAT, the determinate value is set to D1. If the call concerns the derailment of a passenger train, the determinate value is set to D2. If the call concerns the derailment of a freight train, the determinate value is set to D3. If the call concerns a fire on board a passenger train, the determinate value is set to D4. If the call concerns a fire on board a freight train, the determinate value is set to D5. If the call concerns a structure of vehicle incident, the determinate value is set to D6. Once the determinate value is set 3169, the appropriate fire fighter response is dispatched 3170 and post-dispatch instructions 3171 are provided. This appropriate firefighter response 3170 is based on the assigned determinate value. The present preferred post-dispatch instructions 3171 of this protocol are: (a) listen carefully, this could be a very dangerous situation; (b) for HAZMAT, if anyone, including yourself, is contaminated with chemicals, do not touch her, him or anything; (c) if fire, do not try to extinguish the fire yourself; and (d) if it's safe to do so, leave the area now, but not the scene. This protocol also provides the following rules: (1) Immediately notify the Railroad Dispatch Control Tower to begin the process of stopping train traffic and de-energizing third rails; and (2) If it is determined that a train cannot be stopped, notify the on-scene incident commander immediately. The axioms of the present structure fire emergencies protocol are: (1) what is reported as smoke might not be actual smoke, it may be steam or a HAZMAT cloud; (2) subways contain an electrically charged third rail; (3) there are more than 250,000 railroad crossings in the U.S.; (4) vehicles often collide with trains when visibility is poor at night and during bad weather; and (5) speeding vehicles collide with trains when motorists are unable to stop prior to reaching an occupied crossing.

Figure 3U:
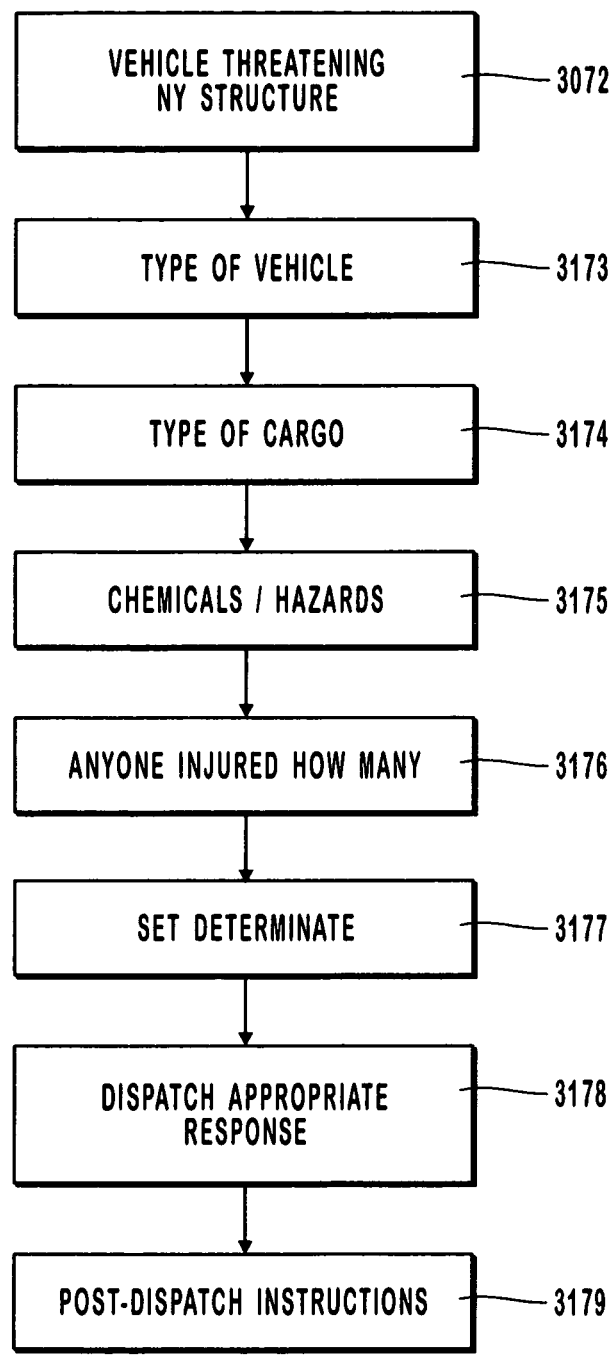

FIG. 3u shows the present steps of the Vehicle Fire Emergencies Protocol. In this protocol a threatened structure is any structure that has a potential of catching on fire. In the present preferred embodiment of this invention information is requested and information is received via the telephone equipment 107. An inquiry 3172 is made to determine if the vehicle is inside or is threatening any structure or anything else. The type of vehicle is determined 3173 and the type of cargo is identified 3174. An inquiry 3175 is made to learn if there are chemicals or other hazards involved. A determination is made 3176 to learn if anyone is injured and if so how many persons. The determinate value is set 3177 as follows. If the caller indicates confirmed entrapment, the determinate value is set to E1. If the call indicates danger and information is incomplete, the determinate value is set to D0. If the call concerns a vehicle fire with hazards, the determinate value is set to D1. If the call concerns a motorhome, camper, tractor-trailer fire, the determinate value is set to D2. If the call concerns a vehicle fire threatening a non-structure, the determinate value is set to C1. If the call concerns an involved vehicle fire, the determinate value is set to B1. If the call concerns an extinguished vehicle fire, the determinate value is set to A1. Once the determinate value is set 3177, the appropriate fire fighter response is dispatched 3178 and post-dispatch instructions 3179 are provided. This appropriate firefighter response 3178 is based on the assigned determinate value. The present preferred post-dispatch instructions 3179 of this protocol are: (a) do not try to extinguish the fire yourself; (b) do not try to get back in the vehicle to get personal items; and (c) stay away from the vehicle and general area. This protocol also provides the following rules: (1) Advise the caller to stay away from a burning vehicle, especially the front; (2) If a vehicle is inside a residential or public parking garage, it is considered to be a structure fire; (3) The determination of whether a fire is threatening a structure should be based on the caller's judgment; and (4) A motorhome or camper should be considered a structure response due to their size and fireload. The axioms of the present vehicle fire emergencies protocol are: (1) motor vehicle fires can be very dangerous; (2) firefighters have been injured by air bags and air bag canisters activating during extrication activities; (3) injuries to firefighters from exploding front bumper crash shock absorbers on burning cars have been reported; (4) a vehicle fire can generate heat upwards of 1,500° F.; (5) fires in motor vehicles can produce toxic gases; (6) absence of a placard does not mean absence of HAZMAT; (7) a vehicle fire is not considered to be a HAZMAT incident until the fire is out; (8) most vehicle fires start in the engine area; (9) flames from burning vehicles can shoot out distances of 10 feet or more; (10) the leading cause of motor vehicle fires is mechanical problems such as leaks and electrical failures; and (11) electrical fires commonly erupt under the dashboard and have a distinct odor.

Figure 3V:
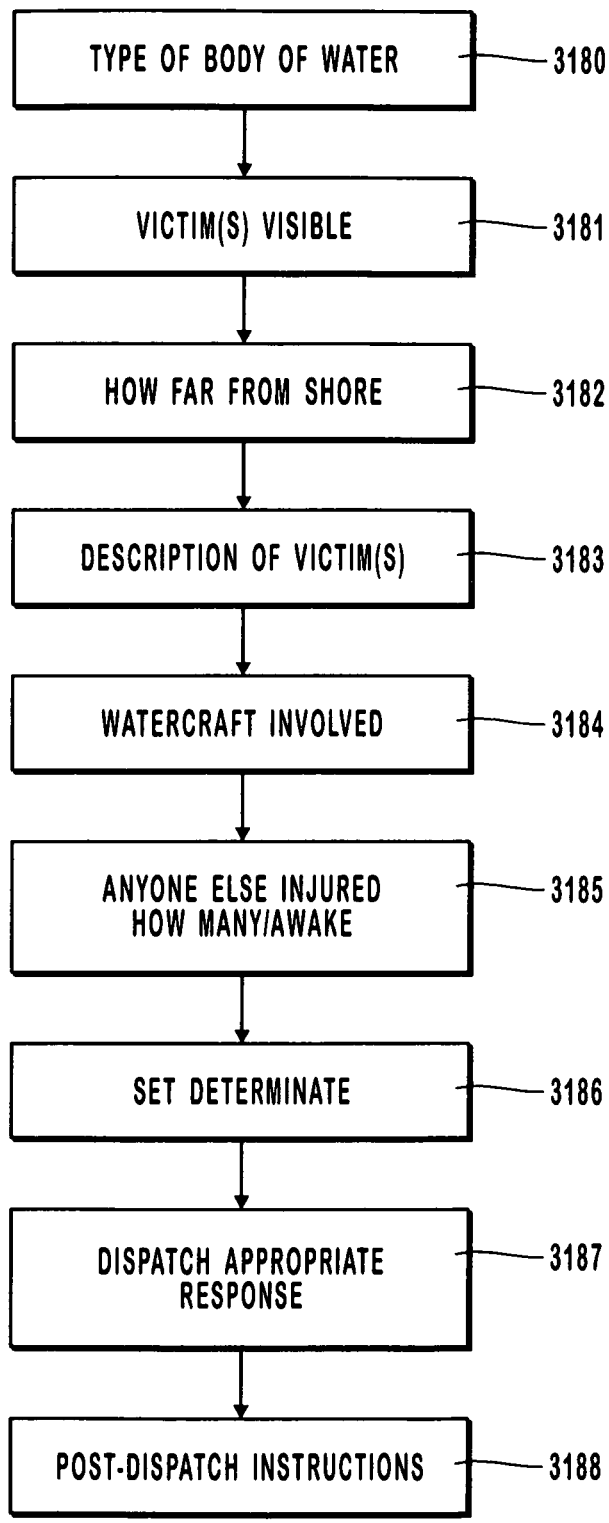

FIG. 3v shows the present steps of the Water Rescue Emergencies Protocol. In this protocol swift water is defined as any body of water that is moving and has a visible current, still water is any body of water that lacks a visible current, usually lakes, ponds, reservoirs, etc., scuba is an acronym for self-contained underwater breathing apparatus. In the present preferred embodiment of this invention information is requested and information is received via the telephone equipment 107. An inquiry 3180 is made to learn, if it is not obvious, what type of body of water is involved. Whether the victim can be seen is determined 3181. If appropriate, the distance from the victim to the shore is estimated 3182. The victim is described 3183. If not obvious, an inquiry 3184 is made to learn if the accident involved a watercraft. A determination 3185 is made to learn if anyone else was injured and, if so, how many. The determinate value is set 3186 as follows. If the caller indicates danger and information is incomplete, the determinate value is set to D0. If the call concerns a vehicle in water, the determinate value is set to D1. If the call concerns an ice rescue, the determinate value is set to D2. If the call concerns a watercraft in distress, the determinate value is set to D3. If the call concerns a swift water rescue, the determinate value is set to D4. If the call concerns a still water rescue, the determinate value is set to D5. If the call concerns a scuba dive accident, the determinate value is set to D6. If the call concerns a swimming pool, the determinate value is set to D7. Once the determinate value is set 3186, the appropriate fire fighter response is dispatched 3187 and post-dispatch instructions 3188 are provided. This appropriate firefighter response 3187 is based on the assigned determinate value. The present preferred post-dispatch instructions 3188 of this protocol are: (a) listen carefully, this could be a very dangerous situation, do not go in the water on out on the ice. This protocol also provides the following rules: (1) Most victims are recovered quickly, when the point last seen is immediately known; (2) A current list of rescue boat resources should be readily available at dispatch; (3) Notify relevant downstream agencies when search capability is required; and (4) a submerged patient, regardless of time underwater is considered resuscitatable by definition until proven otherwise, especially in a cold-water situation. The axioms of the present water rescue emergencies protocol are: (1) diving problems are also a fire complaint if the victim is in the water whereas it is a medical complaint if the victim is out of the water; and (2) vehicles can become buoyant in 2 feet of water or less.

Figure 3W:
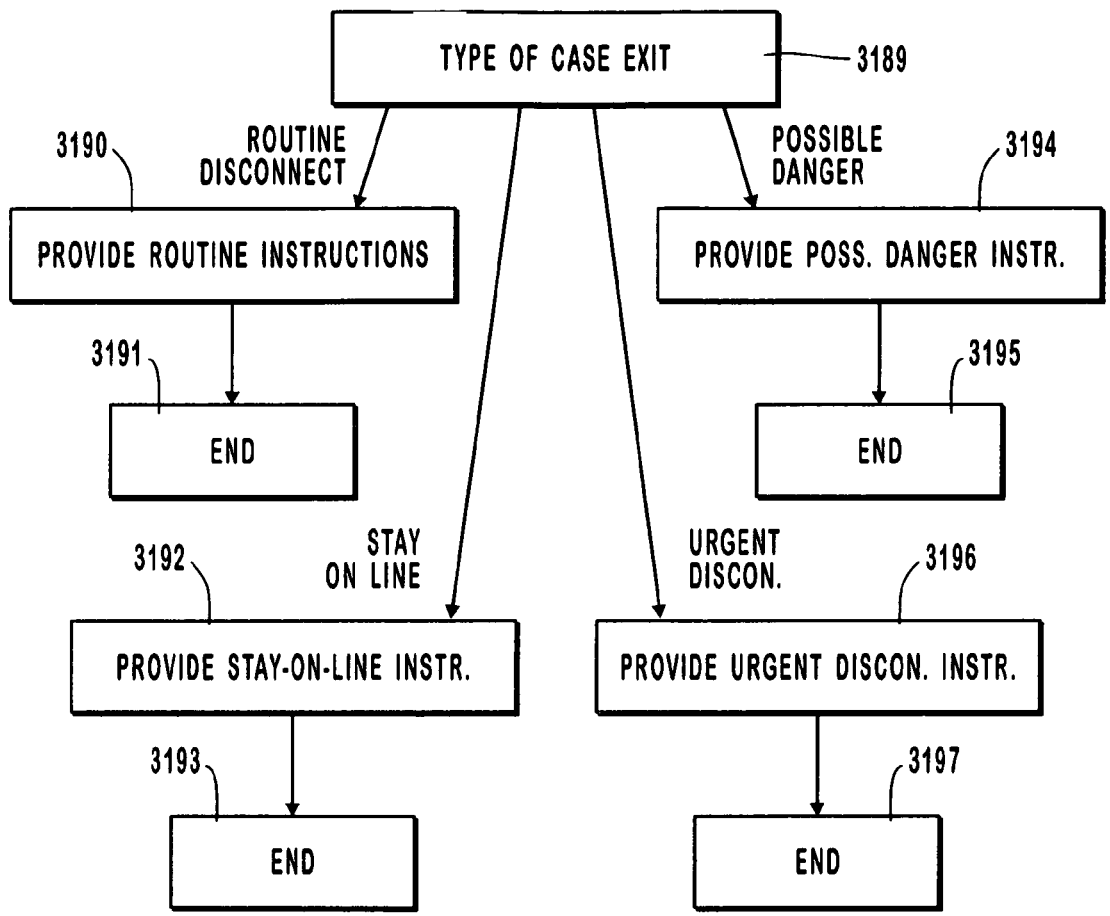

FIG. 3w shows the present steps of the case exit protocol. If the required information has been collected, the determinate has been calculated, the dispatch made and the post-dispatch instructions given, then it is appropriate to exit the case 3189. If it is a routine disconnect, routine instructions are provided 3190 and the process ends 3191. If it is a stay on line exit, the caller is instructed to stay on the line 3192 and is asked to provide additional information, ending the case 3193. If it is an urgent disconnect, the urgent disconnect instruction is given 3196 and the case ends 3197. If the caller is possibly in danger, the possible danger instructions 3194 are given and the caller is requested to stay in contact, thereby ending the information dispatch case 3195.

Figure 3X:
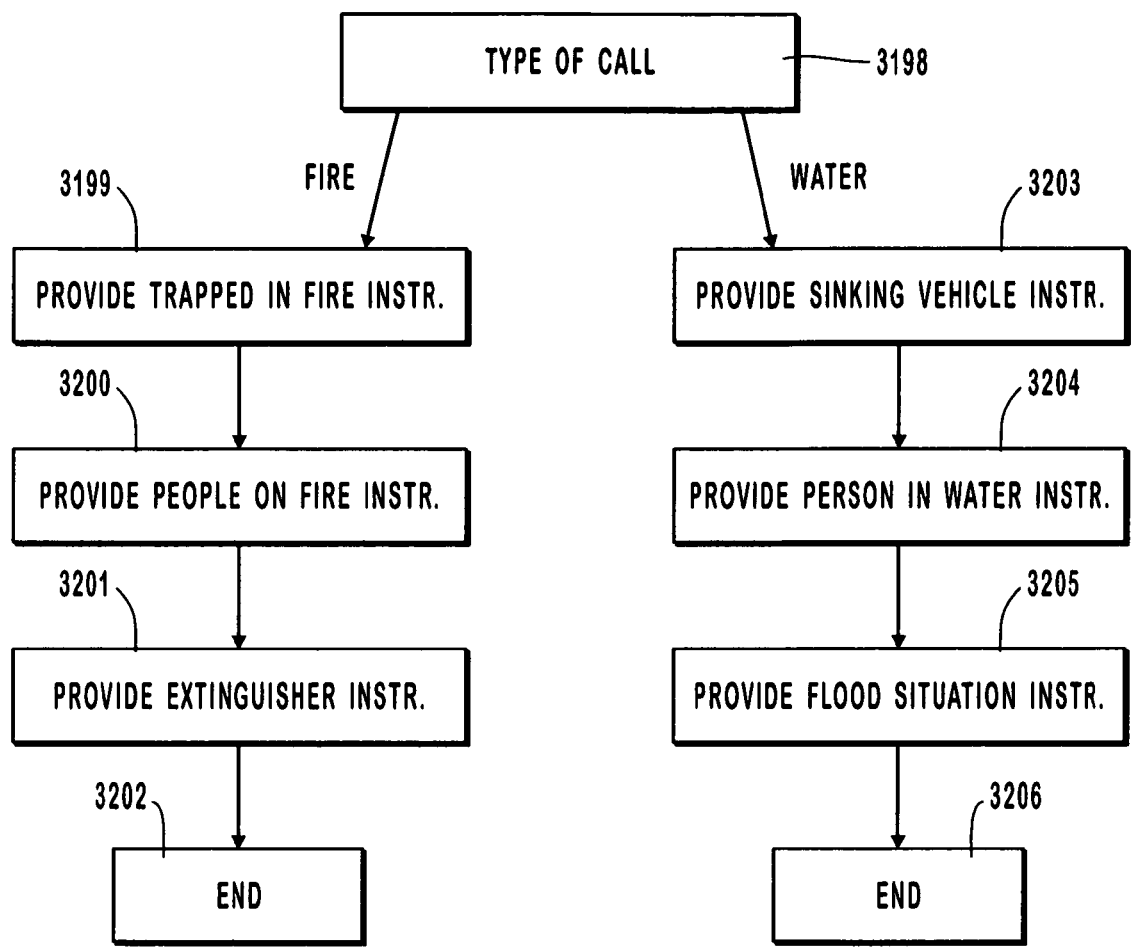

FIG. 3x shows the present steps of the pre-arrival instructions. The type of call is identified 3198. If it is a fire call, instructions are available for callers trapped in a structural fire 3199, regarding people of fire 3200, use of an extinguisher 3201 and the pre-arrival instructions end 3202. If the call is a water call, then instructions on sinking vehicle 3203, falling through ice or in the water 3204 and flood instructions 3205 are available before ending the pre-arrival instructions 3206.

Figure 4A:
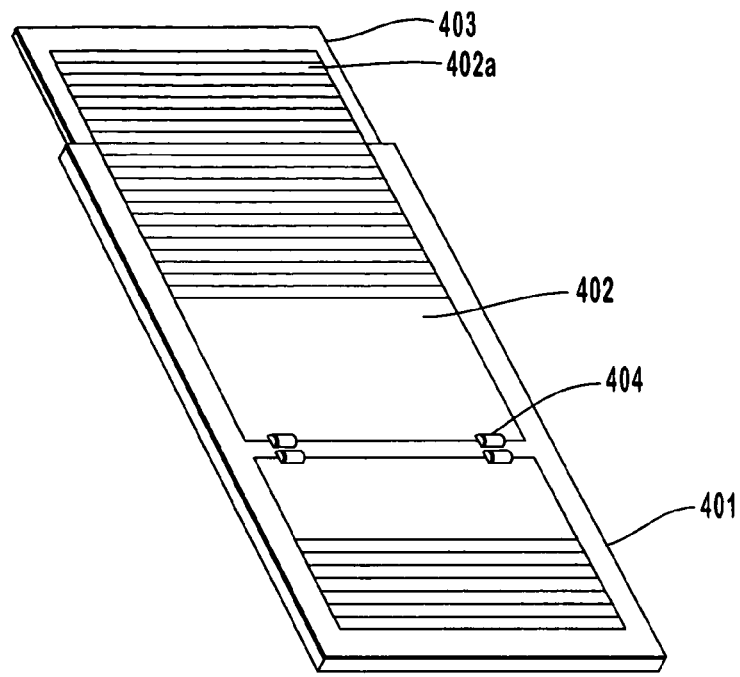
FIG. 4a is a perspective view of the flip card embodiment of this invention.

FIG. 4a depicts a perspective view of the flip card apparatus embodiment of this invention. One preferred embodiment of the invention involves the use of a flip card apparatus 401. The flip card apparatus 401 has the advantage of organizing the cards 402 so that the user can see the top or bottom, label edge of each card. Each card 402 is separately fastened into the apparatus with one or more fasteners 404. The steps embodying the elements of this invention, the entry protocol, are displayed on a top flap 403 and the first card 402a. Alternative embodiments of the card apparatus can be a deck of cards bound in a manner well known to those skilled in the art. In the current embodiment of the flip card apparatus there are sixty-four chief complaint cards, twelve pre-arrival instruction cards, two post-dispatch cards, one determinant classification card and two entry protocol cards. The cards are generally organized in pairs, with the top card providing the protocol questions, instructions, jump directions and determinant assignments. The bottom card provides information the dispatcher uses to improve the dispatcher's decision-making process.

Figure 4B:
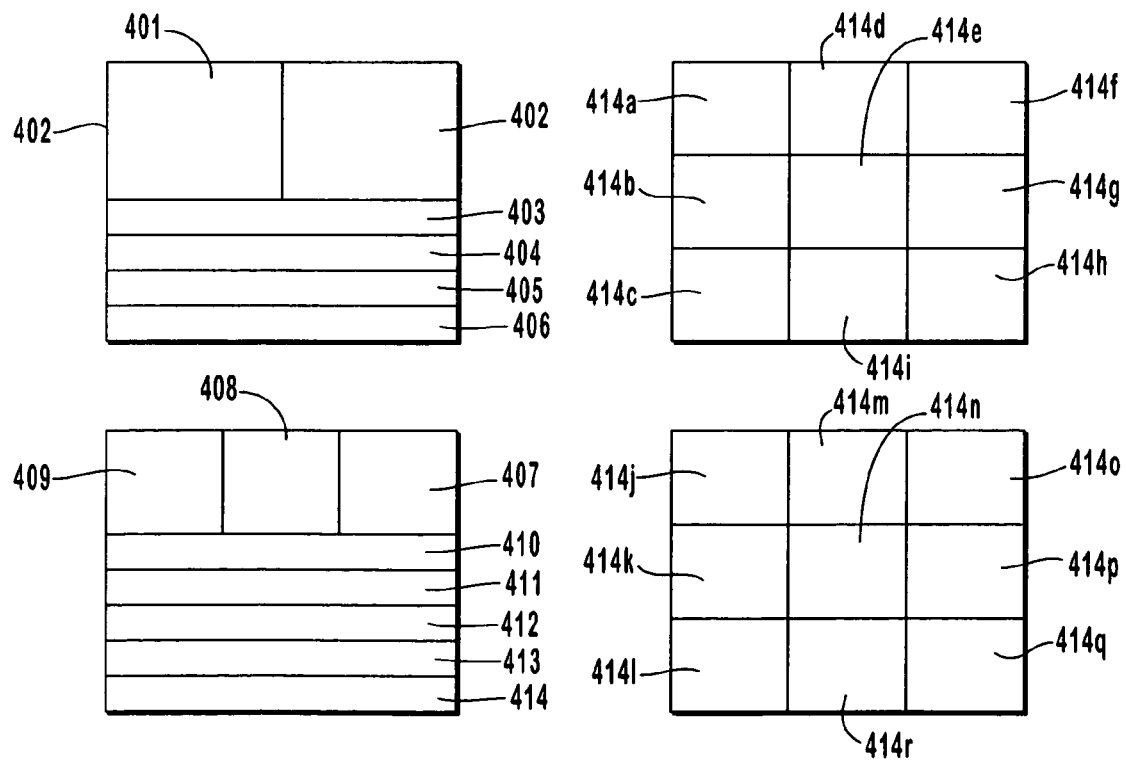
FIG. 4b is a view of the flip card embodiment showing the various sections of the flip card.

FIG. 4b shows a view of the sections of a typical flip card, as used in the flip card apparatus embodiment of the invention. The typical flip card 402 is divided into logical sections for ease of use and consistency. A key question section 405 is provided as a script to the dispatchers to ensure that all key questions are asked in a calm, consistent, systematic manner. After all key questions are asked from the key question section 405, typically the dispatcher determines the appropriate determinant level. Sections A-Alpha 410, B-Bravo 409, C-Charlie 408 and D-Delta 407 are provided to aid the dispatcher in making the determinant designation. Each determinant level may have one or more sublevels. Generally, the most critical call is given a determinant level of D-Delta and the least critical call is given a determinant level of A-Alpha. The more critical the determinant level assigned to a call, the more firefighter resources and urgency may be applied to provide help. For example, an A-Alpha call will typically be responded to by firefighters proceeding to the scene under the safest method reasonably possible, while a D-Delta call will typically be responded to by the closest firefighters and paramedics, all who will proceed under the most urgent method possible. Sublevels may not indicate the criticality of the call; rather sublevel designations indicate the type of call, information often especially important to the dispatched team of firefighters. After the determinant code is determined 407-410 the dispatcher is referred to the post-dispatch instructions section 406. The purpose of the post-dispatch instructions is to systematically prepare for and expedite the field personnel's job at the scene and prevent further harm to the individuals at the scene. Callers are also routinely advised to "call back if the situation worsens for further instructions." Pre-arrival instructions 311 are provided on alternative cards, shown in FIG. 5aq, subsectioned as shown in FIG. 4b as 311a-r. Sections 412 to 419 provide important information to the dispatcher for the dispatcher's use in providing more educated responses. Such information as is systematically provided to place the key questions of section 405, the determinant classifications of sections 407-410, and the post-dispatch instructions of section 406 into context for the dispatcher.

Figure 5A:
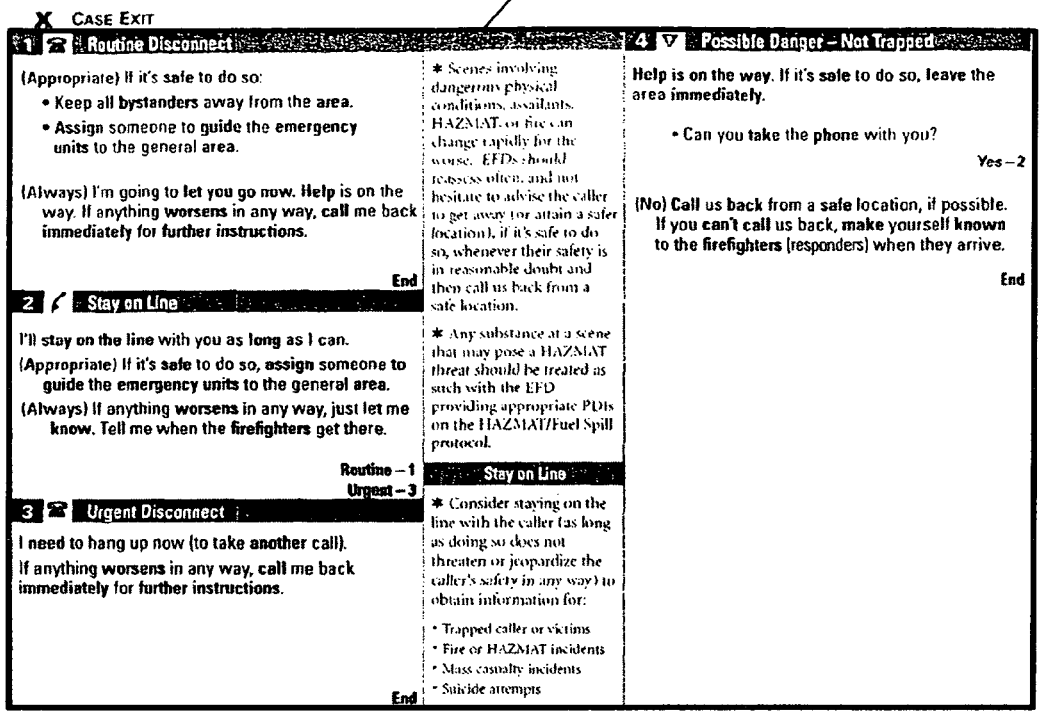
FIGS. 5a to 5at are detailed view of the preferred cards of the flip card embodiment of this invention.
Figure 5A:
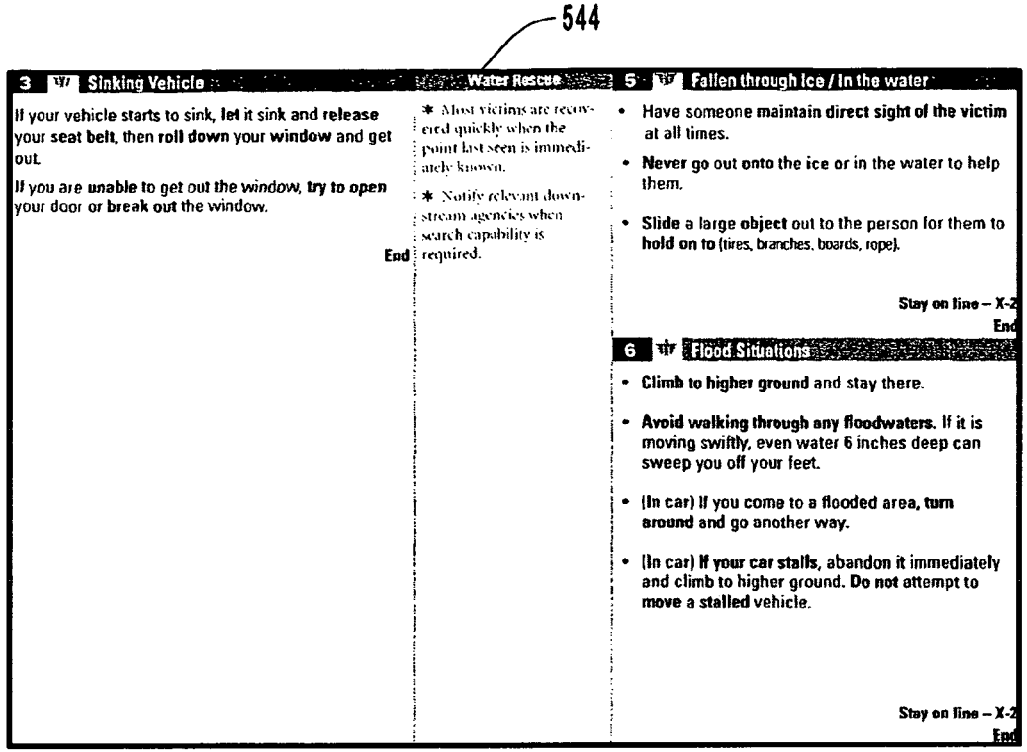
Figure 5A:
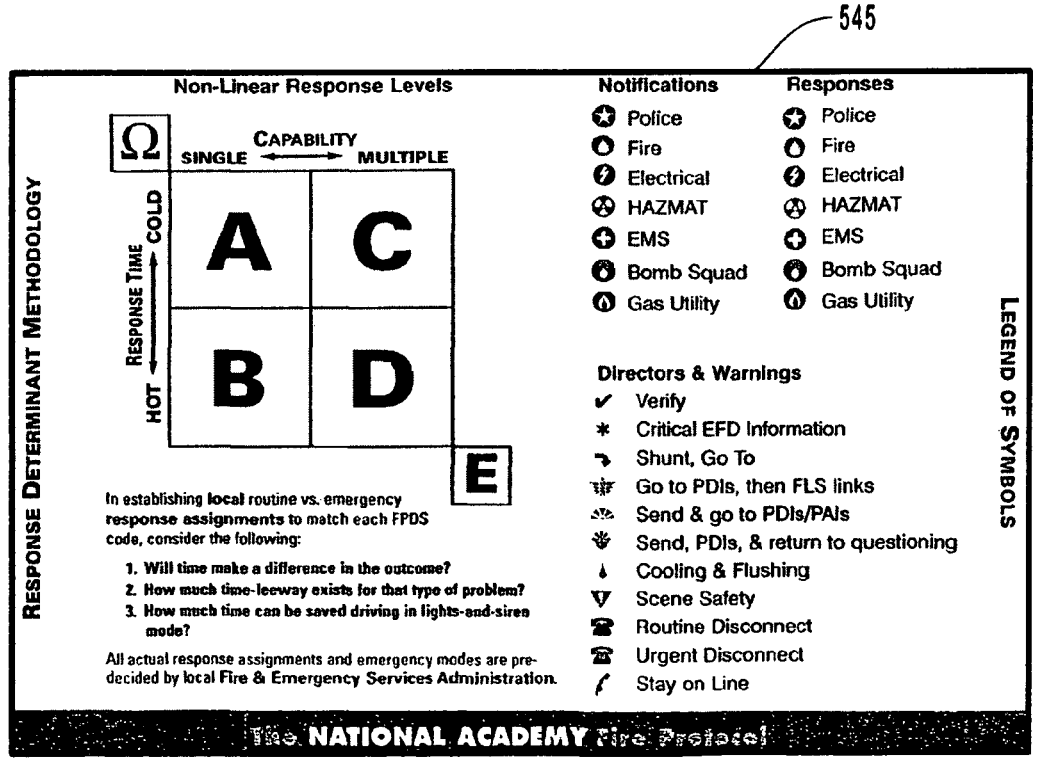

FIGS. 5a-5at are detailed views of the preferred cards of the flip card embodiment of this invention.

FIG. 5a depicts the preferred embodiment of the flip card 500 showing the steps of the entry questions section of this invention. Four major entry questions are shown. A "GO TO" column is provided to prompt emergency firefighter dispatchers to other relevant protocols. Post-Dispatch instructions are provided, guiding the dispatcher through emergency advice.

FIG. 5b shows the details card 501 of the entry questions and includes a definitions section, response coding section, a rules section, an axioms section and information sections. The rules section, axioms section, and information sections are provided to put the questions into context for the dispatchers.

FIG. 5c depicts the preferred embodiment of the flip card 502 showing the steps of the Aircraft Emergencies questions section of this invention. Four major inquiries are shown. A determinate levels and descriptions section is provided for determination calculation along with the assigned codes. Post-Dispatch instructions are provided, guiding the dispatcher through emergency advice.

FIG. 5d shows the details card 503 of the Aircraft Emergency questions and includes a definitions section, a rules section, an axioms section and information sections. The rules section, axioms section, and information sections are provided to put the questions into context for the dispatchers.

FIG. 5e depicts the preferred embodiment of the flip card 504 showing the steps of the Alarms Emergencies questions section of this invention. Seven major inquiries are shown. A determinate levels and descriptions section is provided for determination calculation along with the assigned codes. Post-Dispatch instructions are provided, guiding the dispatcher through emergency advice.

FIG. 5f shows the details card 505 of the Alarms Emergency questions and includes a definitions section, a rules section, an axioms section and information sections. The rules section, axioms section, and information sections are provided to put the questions into context for the dispatchers.

FIG. 5g depicts the preferred embodiment of the flip card 506 showing the steps of the Assist/Service Calls questions section of this invention. Five major inquiries are shown. A determinate levels and descriptions section is provided for determination calculation along with the assigned codes. Post-Dispatch instructions are provided, guiding the dispatcher through emergency advice.

FIG. 5h shows the details card 507 of the Assist/Service Calls questions and includes a definitions section, a rules section, an axioms section and information sections. The rules section, axioms section, and information sections are provided to put the questions into context for the dispatchers.

FIG. 5i depicts the preferred embodiment of the flip card 508 showing the steps of the Confined Space/Structure Collapse questions section of this invention. Seven major inquiries are shown. A determinate levels and descriptions section is provided for determination calculation along with the assigned codes. Post-Dispatch instructions are provided, guiding the dispatcher through emergency advice.

FIG. 5j shows the details card 509 of the Confined Space/ Structure Collapse questions and includes a definitions section, a rules section, an axioms section and information sections. The rules section, axioms section, and information sections are provided to put the questions into context for the dispatchers.

FIG. 5k depicts the preferred embodiment of the flip card 510 showing the steps of the Electrical Hazard questions section of this invention. Five major inquiries are shown. A determinate levels and descriptions section is provided for determination calculation along with the assigned codes. Post-Dispatch instructions are provided, guiding the dispatcher through emergency advice.

FIG. 5l shows the details card 511 of the Electrical Hazard questions and includes a definitions section, a rules section, an axioms section and information sections. The rules section, axioms section, and information sections are provided to put the questions into context for the dispatchers.

FIG. 5m depicts the preferred embodiment of the flip card 512 showing the steps of the Elevator/Escalator Rescue questions section of this invention. Seven major inquiries are shown. A determinate levels and descriptions section is provided for determination calculation along with the assigned codes. Post-Dispatch instructions are provided, guiding the dispatcher through emergency advice.

FIG. 5m shows the details card 513 of the Elevator/Escalator Rescue questions and includes a definitions section, a rules section, an axioms section and information sections. The rules section, axioms section, and information sections are provided to put the questions into context for the dispatchers.

FIG. 5o depicts the preferred embodiment of the flip card 514 showing the steps of the Explosions questions section of this invention. Six major inquiries are shown. A determinate levels and descriptions section is provided for determination calculation along with the assigned codes. Post-Dispatch instructions are provided, guiding the dispatcher through emergency advice.

FIG. 5p shows the details card 515 of the Explosions questions and includes a definitions section, a rules section, an axioms section and information sections. The rules section, axioms section, and information sections are provided to put the questions into context for the dispatchers.

FIG. 5q depicts the preferred embodiment of the flip card 516 showing the steps of the Extrication/Entrapped questions section of this invention. Six major inquiries are shown. A determinate levels and descriptions section is provided for determination calculation along with the assigned codes. Post-Dispatch instructions are provided, guiding the dispatcher through emergency advice.

FIG. 5r shows the details card 517 of the Extrication/Entrapped questions and includes a definitions section, a rules section, an axioms section and information sections. The rules section, axioms section, and information sections are provided to put the questions into context for the dispatchers.

FIG. 5s depicts the preferred embodiment of the flip card 518 showing the steps of the Gas Leaks questions section of this invention. Six major inquiries are shown. A determinate levels and descriptions section is provided for determination calculation along with the assigned codes. Post-Dispatch instructions are provided, guiding the dispatcher through emergency advice.

FIG. 5t shows the details card 519 of the Gas Leaks questions and includes a definitions section, a rules section, an axioms section and information sections. The rules section, axioms section, and information sections are provided to put the questions into context for the dispatchers.

FIG. 5u depicts the preferred embodiment of the flip card 520 showing the steps of the HAZMAT/Fuel Spill questions section of this invention. Seven major inquiries are shown. A determinate levels and descriptions section is provided for determination calculation along with the assigned codes. Post-Dispatch instructions are provided, guiding the dispatcher through emergency advice.

FIG. 5v shows the details card 521 of the HAZMAT/Fuel Spill questions and includes a definitions section, a rules section, an axioms section and information sections. The rules section, axioms section, and information sections are provided to put the questions into context for the dispatchers.

FIG. 5w depicts the preferred embodiment of the flip card 522 showing the steps of the High Angle Rescue questions section of this invention. Five major inquiries are shown. A determinate levels and descriptions section is provided for determination calculation along with the assigned codes. Post-Dispatch instructions are provided, guiding the dispatcher through emergency advice.

FIG. 5x shows the details card 523 of the High Angle Rescue questions and includes a definitions section, a rules section, an axioms section and information sections. The rules section, axioms section, and information sections are provided to put the questions into context for the dispatchers.

FIG. 5y depicts the preferred embodiment of the flip card 524 showing the steps of the Marine Fires questions section of this invention. Seven major inquiries are shown. A determinate levels and descriptions section is provided for determination calculation along with the assigned codes. Post-Dispatch instructions are provided, guiding the dispatcher through emergency advice.

FIG. 5z shows the details card 525 of the Marine Fires questions and includes a definitions section, a rules section, an axioms section and information sections. The rules section, axioms section, and information sections are provided to put the questions into context for the dispatchers.

FIG. 5aa depicts the preferred embodiment of the flip card 526 showing the steps of the Mutual Aid questions section of this invention. Seven major inquiries are shown. A determinate levels and descriptions section is provided for determination calculation along with the assigned codes. Post-Dispatch instructions are provided, guiding the dispatcher through emergency advice.

FIG. 5ab shows the details card 527 of the Mutual Aid questions and includes a definitions section, a rules section, an axioms section and information sections. The rules section, axioms section, and information sections are provided to put the questions into context for the dispatchers.

FIG. 5ac depicts the preferred embodiment of the flip card 528 showing the steps of the Odors questions section of this invention. Four major inquiries are shown. A determinate levels and descriptions section is provided for determination calculation along with the assigned codes. Post-Dispatch instructions are provided, guiding the dispatcher through emergency advice.

FIG. 5ad shows the details card 529 of the Odors questions and includes a definitions section, a rules section, an axioms section and information sections. The rules section, axioms section, and information sections are provided to put the questions into context for the dispatchers.

FIG. 5ae depicts the preferred embodiment of the flip card 530 showing the steps of the Outside Fire questions section of this invention. Seven major inquiries are shown. A determinate levels and descriptions section is provided for determination calculation along with the assigned codes. Post-Dispatch instructions are provided, guiding the dispatcher through emergency advice.

FIG. 5af shows the details card 531 of the Outside Fire questions and includes a definitions section, a rules section, an axioms section and information sections. The rules section, axioms section, and information sections are provided to put the questions into context for the dispatchers.

FIG. 5ag depicts the preferred embodiment of the flip card 532 showing the steps of the Smoke Investigation questions section of this invention. Four major inquiries are shown. A determinate levels and descriptions section is provided for determination calculation along with the assigned codes. Post-Dispatch instructions are provided, guiding the dispatcher through emergency advice.

FIG. 5ah shows the details card 533 of the Smoke Investigation questions and includes a definitions section, a rules section, an axioms section and information sections. The rules section, axioms section, and information sections are provided to put the questions into context for the dispatchers.

FIG. 5ai depicts the preferred embodiment of the flip card 534 showing the steps of the Structure Fire questions section of this invention. Five major inquiries are shown. A determinate levels and descriptions section is provided for determination calculation along with the assigned codes. Post-Dispatch instructions are provided, guiding the dispatcher through emergency advice.

FIG. 5aj shows the details card 535 of the Structure Fire questions and includes a definitions section, a rules section, an axioms section and information sections. The rules section, axioms section, and information sections are provided to put the questions into context for the dispatchers.

FIG. 5ak depicts the preferred embodiment of the flip card 536 showing the steps of the Train/Subway/Commuter Rail Incidents questions section of this invention. Eight major inquiries are shown. A determinate levels and descriptions section is provided for determination calculation along with the assigned codes. Post-Dispatch instructions are provided, guiding the dispatcher through emergency advice.

FIG. 5al shows the details card 537 of the Train/Subway/commuter Rail Incidents questions and includes a definitions section, a rules section, an axioms section and information sections. The rules section, axioms section, and information sections are provided to put the questions into context for the dispatchers.

FIG. 5am depicts the preferred embodiment of the flip card 538 showing the steps of the Vehicle Fire questions section of this invention. Six major inquiries are shown. A determinate levels and descriptions section is provided for determination calculation along with the assigned codes. Post-Dispatch instructions are provided, guiding the dispatcher through emergency advice.

FIG. 5an shows the details card 539 of the Vehicle Fire questions and includes a definitions section, a rules section, an axioms section and information sections. The rules section, axioms section, and information sections are provided to put the questions into context for the dispatchers.

FIG. 5ao depicts the preferred embodiment of the flip card 540 showing the steps of the Water Rescue questions section of this invention. Six major inquiries are shown. A determinate levels and descriptions section is provided for determination calculation along with the assigned codes. Post-Dispatch instructions are provided, guiding the dispatcher through emergency advice.

FIG. 5ap shows the details card 541 of the Water Rescue questions and includes a definitions section, a rules section, an axioms section and information sections. The rules section, axioms section, and information sections are provided to put the questions into context for the dispatchers.

FIG. 5aq depicts the preferred embodiment of the flip card 542 showing the steps of the Case Exit protocol of this invention. Four major sections are shown, and a center information section.

FIG. 5ar shows the details card 543 of the Pre-Arrival Instructions protocol of this invention. Four major sections are shown, and a center information section, are provided.

FIG. 5as shows the details card 544 of the Sinking Vehicle Instructions protocol of this invention. Three major sections are shown, and a center information section, are provided.

FIG. 5at shows the details card 545 showing the response determinate methodology of this invention along with symbology for notifications, responses, directors and warnings.

The previous described preferred embodiments of the invention are to be considered in all respects only as illustrative and not as restrictive. Although the embodiments shown describe particular components in particular connection configurations, the invention is not limited thereto. The scope of this invention is indicated by the appended claims rather than by the foregoing description. All systems and devices, which come directly within the claims or within the meaning and range of equivalency of the claims, are to be embraced as being within the scope of protection of this invention.

The invention claimed is:

1. A method for managing the process of dispatching firefighters in response to calls for assistance, comprising the steps of:
    providing instructions to a dispatcher on a medium readable by the dispatcher, said instructions adapted for use by the dispatcher in receiving a call from a caller for firefighter assistance regarding an incident, wherein said instructions comprise a logical tree comprising pre-scripted inquiries, and wherein said logical tree is traversable using caller responses to said pre-scripted inquiries;
    automatically assigning by a processor a determinate value to said incident by traversing said logical tree, wherein assigning said determine value comprises,
        automatically determining by the processor a type of said incident by traversing a first branch of said logical tree,
        automatically determining by the processor a criticality of said incident by traversing one of a plurality of second branches of said logical tree, wherein said second branch is selected based on said incident type,
    wherein said traversing of said first branch provides for automatically determining if the caller is in danger and, upon determining that the caller is in danger, traversing to a critical caller branch of said logical tree, wherein the critical caller branch comprises, pre-scripted instructions directing the dispatcher to,
        inquire if the caller is entrapped,
        inquire as to the location of the caller,
        instruct the caller to safety if safe to do so, and
        resume traversing said logical tree; and
    directing a dispatch of firefighter assistance based on said determine value.

2. A method, as recited in claim 1, wherein said critical caller branch comprises pre-scripted instructions to instruct said dispatcher to provide repetitive persistence directives to calm the caller.

3. A method, as recited in claim 1, wherein automatically assigning a determinate value further comprises:
    setting a value indicating most urgent response is required if said caller responses provided traversing said second branch indicate an immediate life threatening situation;
    setting a value indicating urgent response required if said caller responses provided traversing said second branch indicate a person in danger;

setting a value indicating a less urgent response if said caller responses provided traversing said branch indicate a hazard without an immediate threat to a person;

setting a value indicating a safest arrival method available response if said caller responses provided traversing said logical tree indicate a least serious call; and setting a value for referral if said caller responses provided traversing said logical tree indicate that no response is required.

4. A method, as recited in claim 1, wherein said second branch is related to an aircraft emergency.

5. A method, as recited in claim 1, wherein said second branch is related to an assistance request.

6. A method, as recited in claim 1, wherein said second branch is related to an alarm.

7. A method, as recited in claim 1, wherein said second branch is related to a confined space call.

8. A method, as recited in claim 1, wherein said second branch is related to an electrical hazard.

9. A method, as recited in claim 1, wherein said second branch is related to an elevator rescue.

10. A method, as recited in claim 1, wherein said second branch is related to an explosion.

11. A method, as recited in claim 1, wherein said second branch is related to an extraction.

12. A method, as recited in claim 1, wherein said second branch is related to a gas leak.

13. A method, as recited in claim 1, wherein said second branch is related to hazardous materials or a fuel spill.

14. A method, as recited in claim 1, wherein said second branch is related to a high angle rescue.

15. A method, as recited in claim 1, wherein said second branch is related to a marine fire.

16. A method, as recited in claim 1, wherein said second branch is related to mutual aid.

17. A method, as recited in claim 1, wherein said second branch is related to odors.

18. A method, as recited in claim 1, wherein said second branch is related to an outside fire.

19. A method, as recited in claim 1, wherein said second branch is related to a smoke investigation.

20. A method, as recited in claim 1, wherein said second branch is related to a train incident.

21. A method, as recited in claim 1, wherein said second branch is related to a vehicle fire.

22. A method, as recited in claim 1, wherein said second branch is related to a water rescue.

23. A method, as recited in claim 1, wherein the logical tree further comprises a post-dispatch branch comprising pre-scripted post-dispatch instructions.

24. A method for managing the process for responding to a call for firefighter assistance in a general purpose computer system comprising:

a central processing unit;
dynamic memory;
static memory;
a display device;
an input device;
an output device;
a mass storage device, which contains a logical tree configured to automatically assign a determinate value to an incident related to a call for firefighter assistance, the logical tree comprising:
a first branch comprising a plurality of pre-scripted inquiries, wherein said first branch is traversable using caller responses to said pre-scripted inquiries, and wherein said traversing of said first branch comprises determining an incident type,
a plurality of second branches, wherein each of said second branches comprises a plurality of pre-scripted instructions and is associated with a respective incident type, wherein each of said second branches is traversable using caller responses to said pre-scripted inquiries of said second branches, and wherein traversing a second branch comprises determining a criticality of an incident,
a critical caller branch comprising a plurality of pre-scripted instructions, the method comprising:
receiving a call from a caller for firefighter assistance regarding an incident;
assigning a determinate value to said call, wherein assigning the determinate value comprises,
traversing said first branch of said logical tree using caller responses to said pre-scripted inquiries of said first branch, wherein traversing said first branch comprises determining an incident type, and wherein traversing the first branch further comprises determining if the caller is in danger and upon determining that the caller is in danger, the first branch traversing to said critical caller branch, said critical caller branch comprising pre-scripted instructions directing the dispatcher to,
inquire if the caller is entrapped,
inquire as to the location of the caller,
instruct the caller to safety if safe to do so, and
resume traversing said logical tree,
selecting one of said plurality of second branches based on said incident type,
traversing said selected second branch using caller responses to said pre-scripted inquiries of said selected second branch, wherein traversing said second branch comprises determining a criticality of said incident,
assigning said determinate value using said incident type and said incident criticality, and
directing a dispatch of firefighter assistance based on said determinate value.

25. A method as recited in claim 1, wherein said logical tree comprises a plurality of post-dispatch branches each comprising a plurality of pre-scripted instructions, the method further comprising selecting one of the plurality of post-dispatch branches using the determinate value.

* * * * *